(12) United States Patent
Obama et al.

(10) Patent No.: US 9,523,843 B2
(45) Date of Patent: Dec. 20, 2016

(54) ZOOM LENS, OPTICAL APPARATUS, AND METHOD FOR MANUFACTURING ZOOM LENS

(75) Inventors: Akihiko Obama, Tokyo (JP); Norikazu Yokoi, Yokohama (JP); Issei Tanaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 446 days.

(21) Appl. No.: 13/194,890

(22) Filed: Jul. 29, 2011

(65) Prior Publication Data
US 2012/0105966 A1  May 3, 2012

(30) Foreign Application Priority Data

| Jul. 30, 2010 | (JP) | 2010-171323 |
| Jul. 30, 2010 | (JP) | 2010-171324 |
| Jul. 30, 2010 | (JP) | 2010-171336 |
| Apr. 25, 2011 | (JP) | 2011-097333 |
| Jul. 8, 2011 | (JP) | 2011-151892 |
| Jul. 8, 2011 | (JP) | 2011-151899 |
| Jul. 8, 2011 | (JP) | 2011-151906 |

(51) Int. Cl.
*G02B 15/14* (2006.01)
*G02B 15/173* (2006.01)

(52) U.S. Cl.
CPC .......... *G02B 15/173* (2013.01); *Y10T 29/4984* (2015.01)

(58) Field of Classification Search
CPC .......................... G02B 15/173; Y10T 29/4984
USPC .................................. 359/690, 684, 683, 676
See application file for complete search history.

(56) References Cited

U.S. PATENT DOCUMENTS

| 6,010,537 A | 1/2000 | Konno et al. |
| 7,187,504 B2 | 3/2007 | Horiuchi |
| 7,199,942 B2 | 4/2007 | Miyazawa |
| 7,471,460 B2 | 12/2008 | Saruwatari |
| 7,532,412 B2 | 5/2009 | Hatada |
| 7,589,908 B2 | 9/2009 | Kimura |
| 7,746,563 B2 | 6/2010 | Muramatsu et al. |
| 7,813,051 B2 | 10/2010 | Saori |
| 7,880,975 B2 | 2/2011 | Kusaka |
| 8,000,024 B2 | 8/2011 | Ori |
| 2006/0245077 A1 | 11/2006 | Miyazawa |
| 2006/0279850 A1 | 12/2006 | Horiuchi |

(Continued)

FOREIGN PATENT DOCUMENTS

| JP | 11-064728 A | 3/1999 |
| JP | 2000-356704 A | 12/2000 |

(Continued)

*Primary Examiner* — Alicia M Harrington
(74) *Attorney, Agent, or Firm* — Shapiro, Gabor and Rosenberger, PLLC

(57) ABSTRACT

A zoom lens includes, in order from an object side along an optical axis, a first lens group G1 having positive refractive power, a second lens group G2 having negative refractive power, and a third lens group G3 having positive refractive power. Upon zooming from a wide-angle end state W to a telephoto end state T, a distance between the first lens group G1 and the second lens group G2 increases, and a distance between the second lens group G2 and the third lens group G3 decreases. Given conditions are satisfied. Accordingly, a zoom lens having high optical performance with suppressing variations in aberrations, an optical apparatus equipped therewith, and a method for manufacturing the zoom lens are provided.

35 Claims, 26 Drawing Sheets

(56) References Cited

U.S. PATENT DOCUMENTS

| | | | |
|---|---|---|---|
| 2007/0297067 A1 | 12/2007 | Muramatsu et al. | |
| 2008/0002259 A1* | 1/2008 | Ishizawa et al. | 359/581 |
| 2008/0212206 A1 | 9/2008 | Hatada | |
| 2008/0291547 A1 | 11/2008 | Saruwatari | |
| 2009/0116121 A1* | 5/2009 | Take | 359/687 |
| 2009/0168196 A1 | 7/2009 | Kimura | |
| 2009/0310226 A1* | 12/2009 | Sato | 359/676 |
| 2009/0323198 A1 | 12/2009 | Kusaka | |
| 2010/0033838 A1 | 2/2010 | Saori | |
| 2010/0134900 A1 | 6/2010 | Ori | |
| 2011/0273776 A1 | 11/2011 | Obama et al. | |

FOREIGN PATENT DOCUMENTS

| | | |
|---|---|---|
| JP | 2004-264459 A | 9/2004 |
| JP | 2005-249974 A | 9/2005 |
| JP | 2006-301193 A | 11/2006 |
| JP | 2006-337745 A | 12/2006 |
| JP | 2008-003195 A | 1/2008 |
| JP | 2008-292733 A | 4/2008 |
| JP | 2008-216440 A | 9/2008 |
| JP | 2009-162862 A | 7/2009 |
| JP | 2009-175324 A | 8/2009 |
| JP | 2009-294513 A | 12/2009 |
| JP | 2010-039426 A | 2/2010 |
| JP | 2010-078803 A | 4/2010 |
| JP | 2010-134108 A | 6/2010 |
| JP | 2010-139724 A | 6/2010 |
| JP | 2010-160240 A | 7/2010 |
| JP | 2010-271362 A | 12/2010 |

* cited by examiner

FIG. 1
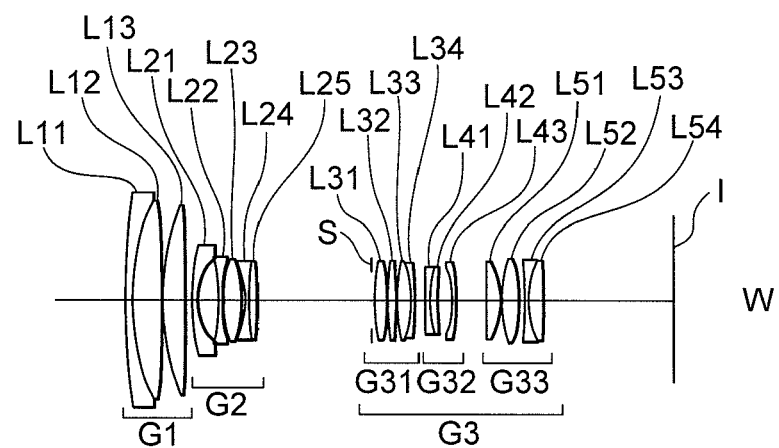
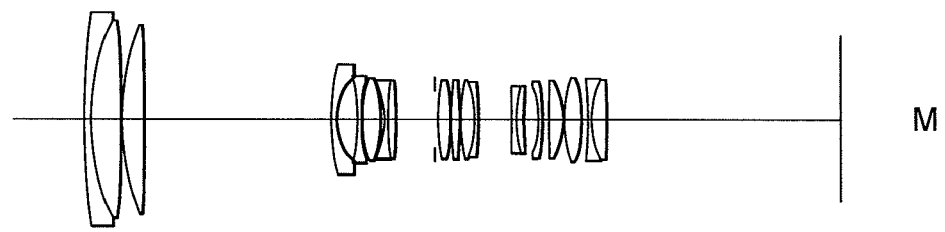
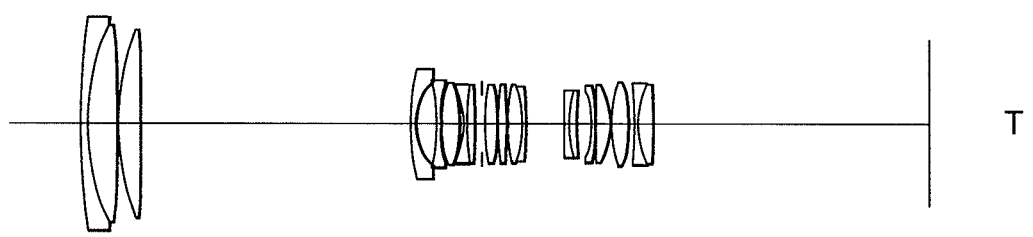

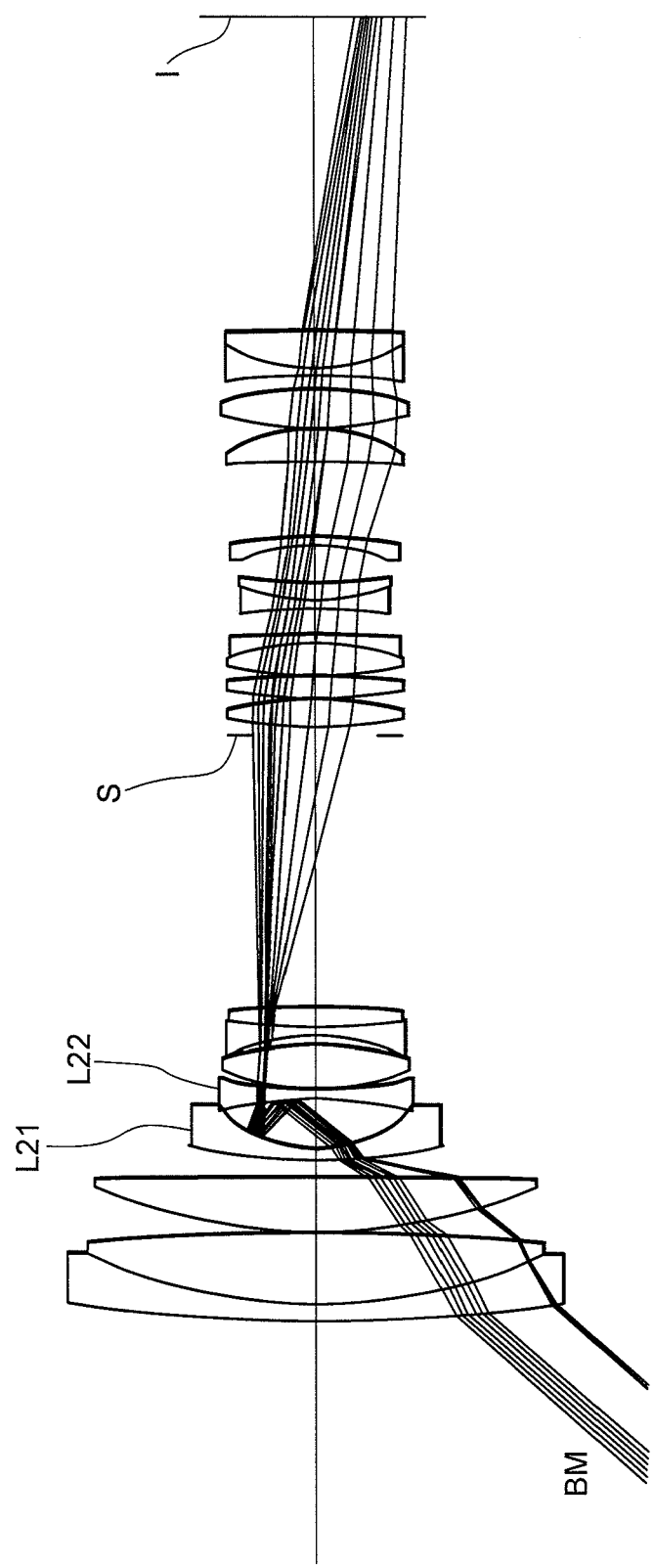

FIG. 4
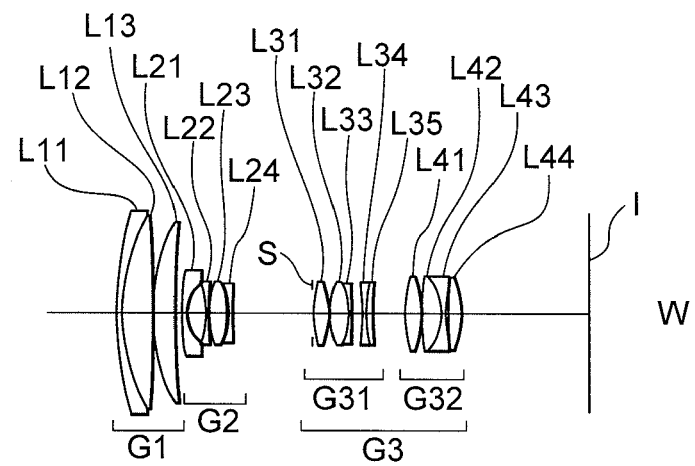
W
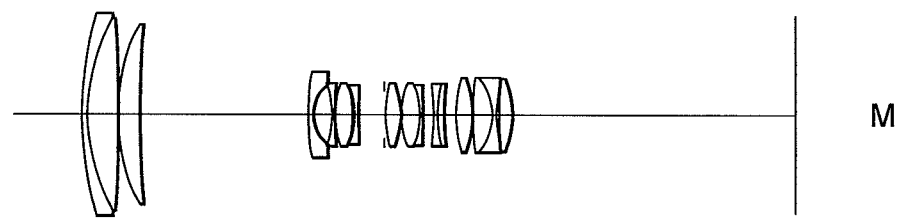
M
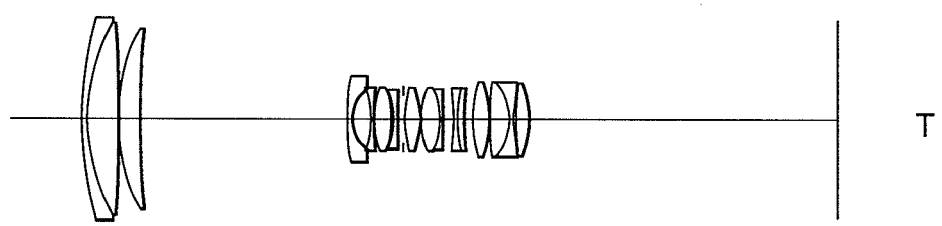
T

FIG. 8
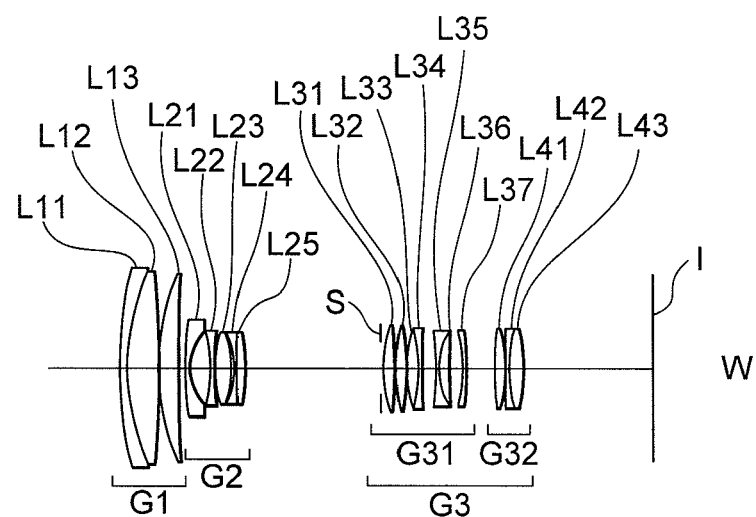
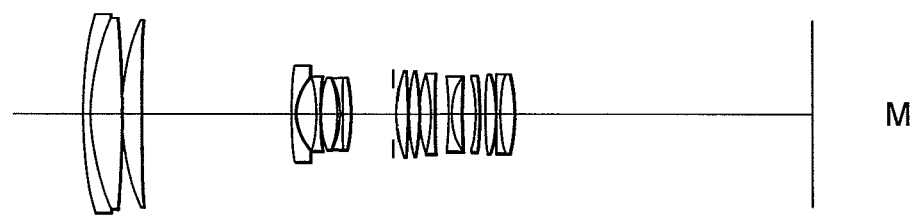
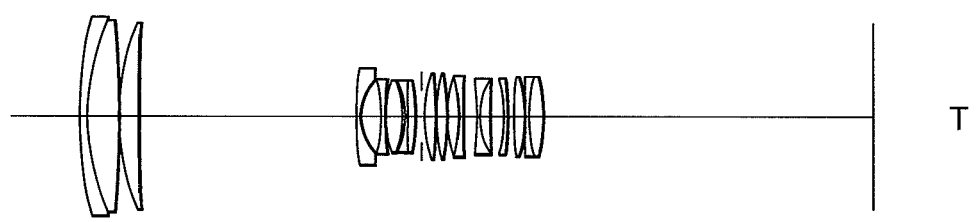

FIG. 10
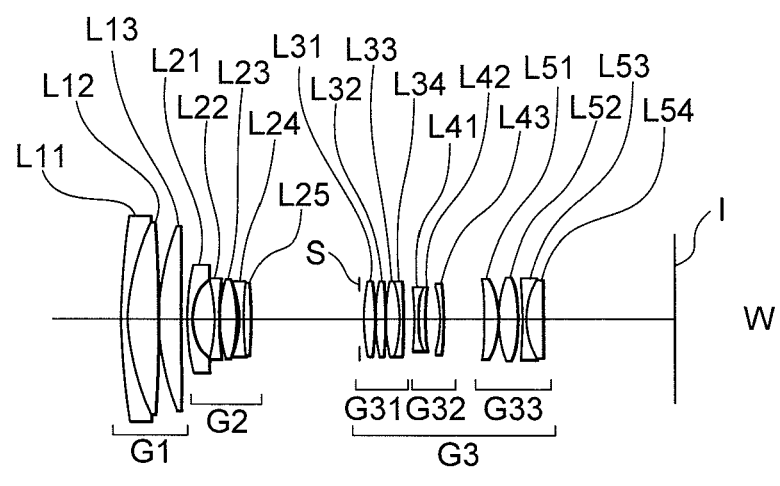
W
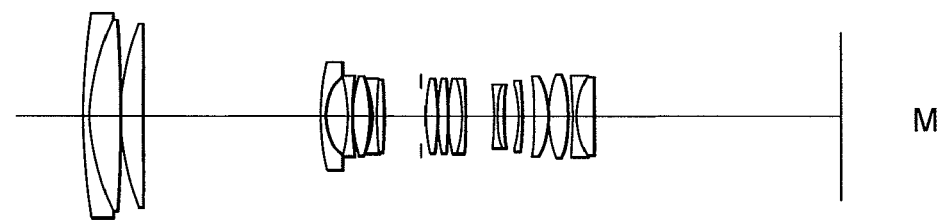
M
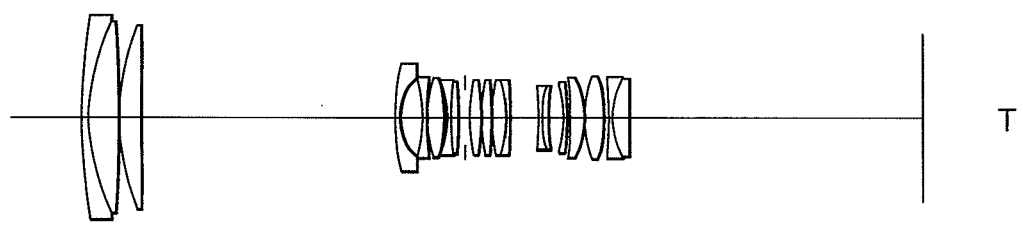
T

FIG. 12
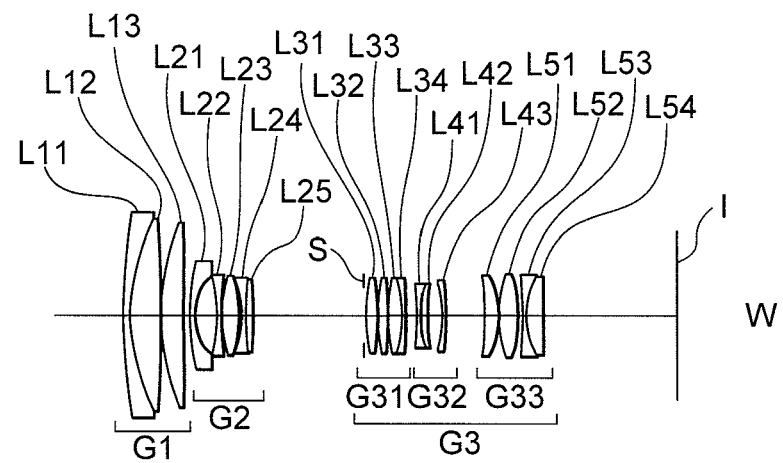
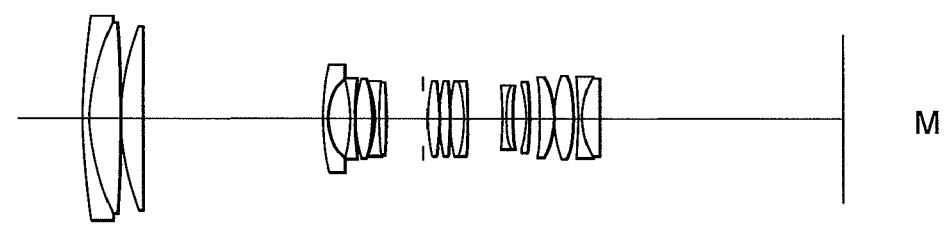
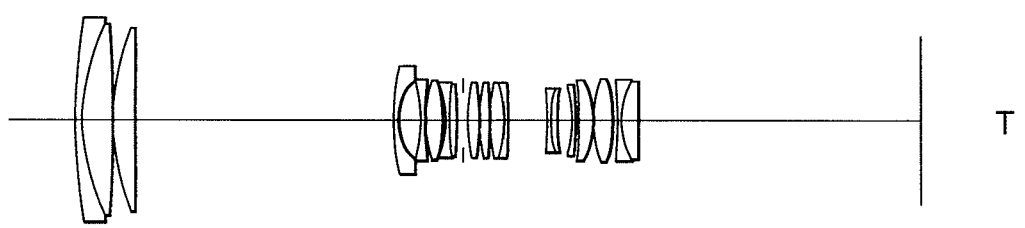

FIG. 15
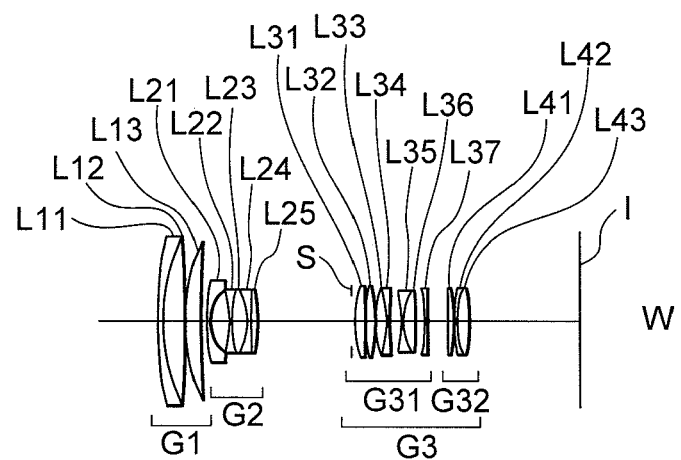
W
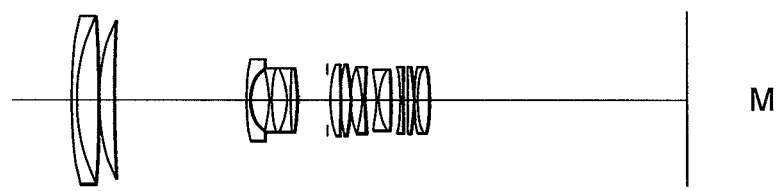
M
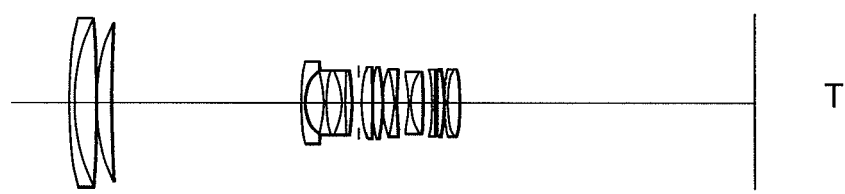
T

ZOOM LENS, OPTICAL APPARATUS, AND METHOD FOR MANUFACTURING ZOOM LENS

This application claims priority to the following applications:

Japanese Patent Application No. 2010-171323 filed on Jul. 30, 2010;
Japanese Patent Application No. 2010-171324 filed on Jul. 30, 2010;
Japanese Patent Application No. 2010-171336 filed on Jul. 30, 2010;
Japanese Patent Application No. 2011-097333 filed on Apr. 25, 2011;
Japanese Patent Application No. 2011-151892 filed on Jul. 8, 2011;
Japanese Patent Application No. 2011-151899 filed on Jul. 8, 2011; and
Japanese Patent Application No. 2011-151906 filed on Jul. 8, 2011.

BACKGROUND OF THE INVENTION

Field of the Invention

The present invention relates to a zoom lens, an optical apparatus equipped therewith, and a method for manufacturing the zoom lens.

Related Background Art

A lot of zoom lenses having a lens group with a positive refractive power disposed to the most object side have been proposed (for example, see Japanese Patent Application Laid-Open No. 2008-003195). Regarding such a zoom lens, request for suppressing ghost images and flare, which deteriorate optical performance, and aberrations become increasingly strong. Accordingly, a higher optical performance is required to antireflection coatings applied to a lens surface, so that in order to meet such request, multilayer design technology and multilayer coating technology are continuously progressing (for example, see Japanese Patent Application Laid-Open No. 2000-356704).

When a conventional zoom lens is forcibly made to have a higher zoom ratio, variation in aberrations increases, so that sufficiently high optical performance cannot be obtained. In addition, there is a problem that reflection light producing ghost images and flare is liable to be generated from optical surfaces in such a zoom lens.

SUMMARY OF THE INVENTION

The present invention is made in view of the above-described problems, and has an object to provide a zoom lens having excellent optical performance with suppressing variations in various aberrations, and ghost images and flare, an optical apparatus equipped therewith, and a method for manufacturing the zoom lens.

According to a first aspect of the present invention, there is provided a zoom lens comprising, in order from an object along an optical axis: a first lens group having positive refractive power; a second lens group having negative refractive power; and a third lens group having positive refractive power, upon zooming from a wide-angle end state to a telephoto end state, a distance between the first lens group and the second lens group increasing, and a distance between the second lens group and third lens group decreasing, the first lens group including a positive lens A that satisfies the following conditional expression (1):

$$85.0 < vdA \tag{1}$$

where vdA denotes an Abbe number at d-line of a material of the positive lens A in the first lens group, and
the following conditional expression (2) being satisfied:

$$3.90 < f1/fw < 11.00 \tag{2}$$

where fw denotes a focal length of the zoom lens in the wide-angle end state, and f1 denotes a focal length of the first lens group.

According to a second aspect of the present invention, there is provided an optical apparatus equipped with the zoom lens according to the first aspect.

According to a third aspect of the present invention, there is provided a zoom lens comprising, in order from an object along an optical axis: a first lens group having positive refractive power; a second lens group having negative refractive power; and a third lens group having positive refractive power, upon zooming from a wide-angle end state to a telephoto end state, a distance between the first lens group and the second lens group increasing, and a distance between the second lens group and third lens group decreasing, the zoom lens including a positive lens A' that satisfies the following conditional expressions (14) and (15):

$$1.540 < ndA' \tag{14}$$

$$66.5 < vdA' \tag{15}$$

where ndA' denotes a refractive index of a material of the positive lens A', and vdA' denotes an Abbe number of the material of the positive lens A', and the following conditional expression (2) being satisfied:

$$3.90 < f1/fw < 11.00 \tag{2}$$

where fw denotes a focal length of the zoom lens in the wide-angle end state, and f1 denotes a focal length of the first lens group.

According to a fourth aspect of the present invention, there is provided an optical apparatus equipped with the zoom lens according to the third aspect.

zoom lens comprising, in order from an object along an optical axis: a first lens group having positive refractive power; a second lens group having negative refractive power; and a third lens group having positive refractive power, upon zooming from a wide-angle end state to a telephoto end state, a distance between the first lens group and the second lens group increasing, and a distance between the second lens group and third lens group decreasing, the first lens group including a plurality of positive lenses A" that satisfies the following conditional expression (22):

$$66.5 < vdA'' \text{ when } 1.540 \leq ndA''$$

$$75.0 < vdA'' \text{ when } ndA'' < 1.540 \tag{22}$$

where ndA" denotes a refractive index at d-line of a material of each of a plurality of positive lenses in the first lens group, vdA" denotes an Abbe number at d-line of a material of each of the plurality of positive lenses in the first lens group, and
the following conditional expressions (23) and (3) being satisfied:

$$4.75 < f1/fw < 11.0 \tag{23}$$

$$0.28 < f1/ft < 0.52 \tag{3}$$

where fw denotes a focal length of the zoom lens in the wide-angle end state, ft denotes a focal length of the zoom lens in the telephoto end state, and f1 denotes a focal length of the first lens group.

According to a sixth aspect of the present invention, there is provided an optical apparatus equipped with the zoom lens according to the fifth aspect.

According to a seventh aspect of the present invention, there is provided a method for manufacturing a zoom lens including, in order from an object side along an optical axis, a first lens group having positive refractive power, a second lens group having negative refractive power, and a third lens group having positive refractive power, the method comprising steps of: disposing the first lens group, the second lens group and the third lens group movably such that a distance between the first lens group and the second lens group increases, and a distance between the second lens group and the third lens group decreases; disposing a positive lens A satisfying the following conditional expression (1):

$$85.0 < vdA \quad (1)$$

where vdA denotes an Abbe number at d-line of a material of the positive lens A in the first lens group; and disposing each lens with satisfying the following conditional expression (2):

$$3.90 < f1/fw < 11.00 \quad (2)$$

where fw denotes a focal length of the zoom lens in the wide-angle end state, and f1 denotes a focal length of the first lens group.

According to a eighth aspect of the present invention, there is provided a method for manufacturing a zoom lens including, in order from an object side along an optical axis, a first lens group having positive refractive power, a second lens group having negative refractive power, and a third lens group having positive refractive power, the method comprising steps of: disposing the first lens group, the second lens group and the third lens group movably such that a distance between the first lens group and the second lens group increases, and a distance between the second lens group and the third lens group decreases; disposing a positive lens A' satisfying the following conditional expressions (14) and (15):

$$1.540 < ndA' \quad (14)$$

$$66.5 < vdA' \quad (15)$$

where ndA' denotes a refractive index of a material of the positive lens A', and vdA' denotes an Abbe number of the material of the positive lens A', and disposing each lens with satisfying the following conditional expression (2):

$$3.90 < f1/fw < 11.00 \quad (2)$$

where fw denotes a focal length of the zoom lens in the wide-angle end state, and f1 denotes a focal length of the first lens group.

According to a ninth aspect of the present invention, there is provided a method for manufacturing a zoom lens including, in order from an object side along an optical axis, a first lens group having positive refractive power, a second lens group having negative refractive power, and a third lens group having positive refractive power, the method comprising steps of: disposing the first lens group, the second lens group and the third lens group movably such that a distance between the first lens group and the second lens group increases, and a distance between the second lens group and the third lens group decreases; disposing a plurality of positive lenses A" satisfying the following conditional expression (22):

$$66.5 < vdA'' \text{ when } 1.540 \leq ndA''$$

$$75.0 < vdA'' \text{ when } ndA'' < 1.540 \quad (22)$$

where ndA" denotes a refractive index at d-line of a material of each of the plurality of positive lenses in the first lens group, vdA" denotes an Abbe number at d-line of a material of each of the plurality of positive lenses in the first lens group, and disposing each lens with satisfying the following conditional expressions (23) and (3):

$$4.75 < f1/fw < 11.00 \quad (23)$$

$$0.28 < f1/ft < 0.52 \quad (3)$$

where fw denotes a focal length of the zoom lens in the wide-angle end state, ft denotes a focal length of the zoom lens in the telephoto end state, and f1 denotes a focal length of the first lens group.

The present invention makes it possible to provide a zoom lens having excellent optical performance with suppressing variations in various aberrations and ghost images and flare, an optical apparatus equipped therewith, and a method for manufacturing the zoom lens.

BRIEF DESCRIPTION OF THE DRAWINGS

FIG. 1 is a sectional view showing a lens configuration of a zoom lens according to Example 1 of a first embodiment, and Example 4 of a second embodiment of the present application.

FIGS. 2A, 2B and 2C are graphs showing various aberrations of the zoom lens according to Example 1 of the first embodiment, and Example 4 of the second embodiment upon focusing on an infinitely distant object, in which FIG. 2A is a wide-angle end state, FIG. 2B is an intermediate focal length state, and FIG. 2C is a telephoto end state.

FIG. 3 is a sectional view showing the lens configuration of the lens system according to Example 1 of the first embodiment, and Example 4 of the second embodiment and is an explanatory view, in which light rays reflected from a first-ghost-generating surface are reflected by a second-ghost-generating surface.

FIG. 4 is a sectional view showing a lens configuration of a zoom lens according to Example 2 of the first embodiment of the present application.

FIGS. 5A, 5B and 5C are graphs showing various aberrations of the zoom lens according to Example 2 of the first embodiment upon focusing on an infinitely distant object, in which FIG. 5A is a wide-angle end state, FIG. 5B is an intermediate focal length state, and FIG. 5C is a telephoto end state.

FIGS. 7A, 7B and 7C are graphs showing various aberrations of the zoom lens according to Example 3 of the first embodiment, and Example 8 of the second embodiment upon focusing on an infinitely distant object, in which FIG. 7A is a wide-angle end state, FIG. 7B is an intermediate focal length state, and FIG. 7C is a telephoto end state.

FIG. 8 is a sectional view showing a lens configuration of a zoom lens according to Example 5 of the second embodiment, and Example 10 of a third embodiment of the present application.

FIGS. 9A, 9B and 9C are graphs showing various aberrations of the zoom lens according to Example 5 of the second embodiment, and Example 10 of the third embodiment upon focusing on an infinitely distant object, in which FIG. 9A is a wide-angle end state, FIG. 9B is an intermediate focal length state, and FIG. 9C is a telephoto end state.

FIG. 10 is a sectional view showing a lens configuration of a zoom lens according to Example 6 of the second embodiment, and Example 11 of the third embodiment of the present application.

FIGS. 11A, 11B and 11C are graphs showing various aberrations of the zoom lens according to Example 6 of the second embodiment, and Example 11 of the third embodiment upon focusing on an infinitely distant object, in which FIG. 11A is a wide-angle end state, FIG. 11B is an intermediate focal length state, and FIG. 11C is a telephoto end state.

FIG. 12 is a sectional view showing a lens configuration of a zoom lens according to Example 7 of the second embodiment, and Example 9 of the third embodiment of the present application.

FIGS. 13A, 13B and 13C are graphs showing various aberrations of the zoom lens according to Example 7 of the second embodiment, and Example 9 of the third embodiment upon focusing on an infinitely distant object, in which FIG. 13A is a wide-angle end state, FIG. 13B is an intermediate focal length state, and FIG. 13C is a telephoto end state.

FIG. 15 is a sectional view showing a lens configuration of a zoom lens according to Example 12 of the third embodiment of the present application.

FIGS. 16A, 16B and 16C are graphs showing various aberrations of the zoom lens according to Example 12 of the third embodiment upon focusing on an infinitely distant object, in which FIG. 16A is a wide-angle end state, FIG. 16B is an intermediate focal length state, and FIG. 16C is a telephoto end state.

DESCRIPTION OF THE MOST PREFERRED EMBODIMENT

First Embodiment

Figure 2A:
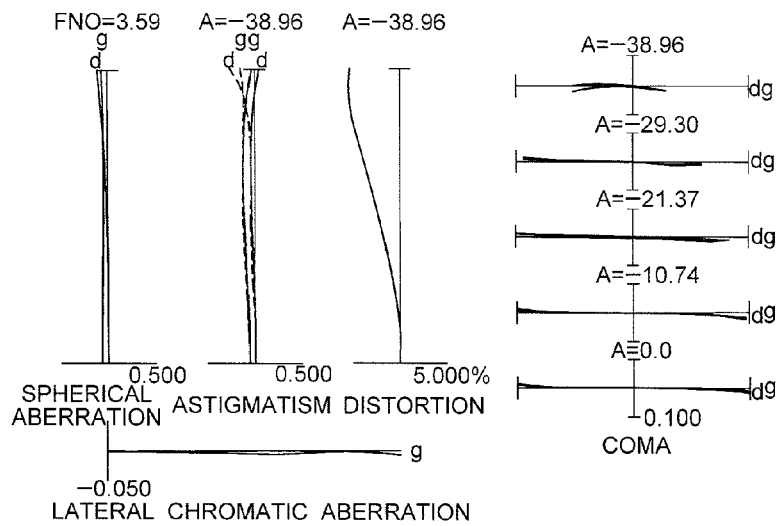

A zoom lens according to a first embodiment of the present application is explained below.

The zoom lens according to the first embodiment of the present application includes, in order from an object side along an optical axis, a first lens group having positive refractive power, a second lens group having negative refractive power, and a third lens group having positive refractive power. Upon zooming from a wide-angle end state to a telephoto end state, a distance between the first lens group and the second lens group increases, and a distance between the second lens group and the third lens group decreases. With this configuration, it becomes possible to realize an optical system capable of zooming, and, at the same time, suppress variation in distortion generated upon zooming.

In a zoom lens according to the first embodiment, the first lens group includes a positive lens A, which satisfies the following conditional expression (1), and the following conditional expression (2) is satisfied:

$$85.0 < vdA \tag{1}$$

$$3.90 < f1/fw < 11.00 \tag{2}$$

where vdA denotes an Abbe number at d-line (wavelength λ=587.6 nm) of the positive lens A in the first lens group, fw denotes a focal length of the zoom lens in the wide-angle end state, and f1 denotes a focal length of the first lens group.

Conditional expression (1) defines an optimum Abbe number of the positive lens A in the first lens group, and is for realizing high optical performance with suppressing variation in chromatic aberration generated upon zooming from the wide-angle end state to the telephoto end state.

When the value vdA is equal to or falls below the lower limit of conditional expression (1), it becomes difficult to suppress variations in longitudinal chromatic aberration and lateral chromatic aberration. The material becomes a one having small anomalous dispersion, so that variation in secondary order of chromatic aberration becomes difficult to be suppressed. In addition, longitudinal chromatic aberration and lateral chromatic aberration in visible light range become large in the telephoto end state, so that high optical performance cannot be obtained.

Conditional expression (2) defines an appropriate range of the focal length of the first lens group, and is for realizing high optical performance with suppressing variations in chromatic aberration and off-axis aberrations generated upon zooming from the wide-angle end state to the telephoto end state.

When the ratio f1/fw is equal to or falls below the lower limit of conditional expression (2), refractive power of the first lens group becomes strong, so that it becomes difficult to suppress variations in lateral chromatic aberration and off-axis aberrations, in particular, astigmatism. Accordingly, high optical performance cannot be obtained.

On the other hand, when the ratio f1/fw is equal to or exceeds the upper limit of conditional expression (2), refractive power of the first lens group becomes weak, so that in order to obtain a given zoom ratio a moving amount of the first lens group with respect to an image plane has to increase. As a result, variation in a height from the optical axis of the off-axis ray passing through the first lens group becomes large, so that it becomes difficult to suppress variations in lateral chromatic aberration and off-axis aberrations, in particular, astigmatism. Accordingly, high optical performance cannot be obtained.

In order to secure the effect of the present embodiment, it is preferable to set the lower limit of conditional expression (2) to 4.75. In order to further secure the effect of the present embodiment, it is most preferable to set the lower limit of conditional expression (2) to 5.10.

In order to secure the effect of the present embodiment, it is preferable to set the upper limit of conditional expression (2) to 8.80. In order to further secure the effect of the present embodiment, it is most preferable to set the upper limit of conditional expression (2) to 7.60.

In a zoom lens according to the first embodiment, the following conditional expression (3) is preferably satisfied:

$$0.28 < f1/ft < 0.52 \qquad (3)$$

where ft denotes a focal length of the zoom lens in the telephoto end state.

Conditional expression (3) defines an appropriate range of an optimum focal length of the first lens group, and is for realizing high optical performance with suppressing variations in chromatic aberration and off-axis aberrations generated upon zooming from the wide-angle end state to the telephoto end state.

When the ratio f1/ft is equal to or falls below the lower limit of conditional expression (3), refractive power of the first lens group becomes strong, so that it becomes difficult to suppress variations in longitudinal chromatic aberration and spherical aberration. Accordingly, high optical performance cannot be obtained.

On the other hand, when the ratio f1/ft is equal to or exceeds the upper limit of conditional expression (3), refractive power of the first lens group becomes weak, in order to obtain a given zoom ratio, a moving amount of the first lens group with respect to the image plane has to increase. As a result, variation in a height from the optical axis of the off-axis ray passing through the first lens group becomes large, so that it becomes difficult to suppress variations in lateral chromatic aberration and off-axis aberrations, in particular, astigmatism. Accordingly, high optical performance cannot be obtained.

In order to secure the effect of the present embodiment, it is preferable to set the lower limit of conditional expression (3) to 0.31.

In order to secure the effect of the present embodiment, it is preferable to set the upper limit of conditional expression (3) to 0.48. In order to further secure the effect of the present embodiment, it is most preferable to set the upper limit of conditional expression (3) to 0.44.

In a zoom lens according to the first embodiment, the following conditional expression (4) is preferably satisfied:

$$0.25 < \Delta 1/f1 < 1.10 \qquad (4)$$

where $\Delta 1$ denotes a moving amount of the first lens group with respect to the image plane upon zooming from the wide-angle end state to the telephoto end state.

Conditional expression (4) defines an optimum moving amount of the first lens group with respect to the image plane upon zooming from the wide-angle end state to the telephoto end state, and is for realizing high optical performance with suppressing variations in chromatic aberration and off-axis aberrations generated upon zooming.

When the ratio $\Delta 1/f1$ is equal to or falls below the lower limit of conditional expression (4), the moving amount of the first lens group with respect to the image plane becomes small, so that in order to obtain a given zoom ratio, refractive power of the first lens group has to be large. As a result, upon zooming from the wide-angle end state to the telephoto end state, variation in refractive power according to variation in the height from the optical axis of the off-axis ray passing through the first lens group becomes large, so that it becomes difficult to suppress variations in lateral chromatic aberration and off-axis aberrations, in particular, astigmatism. Accordingly, high optical performance cannot be obtained.

On the other hand, when the ratio $\Delta 1/f1$ is equal to or exceeds the upper limit of conditional expression (4), the moving amount of the first lens group with respect to the image plane becomes large, so that upon zooming from the wide-angle end state to the telephoto end state, variation in the height from the optical axis of the off-axis ray passing through the first lens group becomes large. As a result, it becomes difficult to suppress variations in lateral chromatic aberration and off-axis aberrations, in particular, astigmatism. Accordingly, high optical performance cannot be obtained.

In order to secure the effect of the present embodiment, it is preferable to set the lower limit of conditional expression (4) to 0.36. In order to further secure the effect of the present embodiment, it is most preferable to set the lower limit of conditional expression (4) to 0.48.

In order to secure the effect of the present embodiment, it is preferable to set the upper limit of conditional expression (4) to 0.95.

In a zoom lens according to the first embodiment, the following conditional expression (5) is preferably satisfied:

$$0.65 < f1A/f1 < 1.75 \qquad (5)$$

where f1A denotes a focal length of the positive lens A in the first lens group.

Conditional expression (5) defines an optimum focal length of the positive lens A in the first lens group, and is for realizing high optical performance with suppressing variations in chromatic aberration and off-axis aberrations generated upon zooming.

When the ration f1A/f1 is equal to or falls below the lower limit of conditional expression (5), refractive power of the positive lens A becomes strong, so that upon zooming from the wide-angle end state to the telephoto end state, variation in refractive power in accordance with variation in the height of the off-axis ray passing through the positive lens A becomes large. As a result, it becomes difficult to suppress variations in lateral chromatic aberration and off-axis aberrations, in particular, astigmatism, so that high optical performance cannot be obtained.

On the other hand, when the ration f1A/f1 is equal to or exceeds the upper limit of conditional expression (5), refractive power of the positive lens A becomes weak, positive refractive power other than the positive lens A in the first lens group becomes strong, so that upon zooming from the wide-angle end state to the telephoto end state, variation in refractive power in accordance with variation in the height of the off-axis ray passing through the positive lens A becomes large. As a result, it becomes difficult to suppress variations in lateral chromatic aberration and off-axis aberrations, in particular, astigmatism, so that high optical performance cannot be obtained.

In order to secure the effect of the present embodiment, it is preferable to set the lower limit of conditional expression (5) to 0.80.

In order to secure the effect of the present embodiment, it is preferable to set the upper limit of conditional expression (5) to 1.35.

In a zoom lens according to the first embodiment, the following conditional expression (6) is preferably satisfied:

$$1.75 < \phi 1A/fw < 4.50 \tag{6}$$

where $\phi 1A$ denotes an effective diameter of the positive lens A in the first lens group.

Conditional expression (6) defines an optimum effective diameter of the positive lens A in the first lens group, and is for realizing high optical performance with suppressing variations in chromatic aberration and off-axis aberrations generated upon zooming.

When the ratio $\phi 1A/fw$ is equal to or falls below the lower limit of conditional expression (6), upon zooming from the wide-angle end state to the telephoto end state, variation in the height from the optical axis of the off-axis ray passing through the positive lens A in the first lens group becomes small. As a result, it becomes difficult to suppress variations in off-axis aberrations, in particular, astigmatism, so that high optical performance cannot be obtained.

On the other hand, when the ratio $\phi 1A/fw$ is equal to or exceeds the upper limit of conditional expression (6), upon zooming from the wide-angle end state to the telephoto end state, variation in the height from the optical axis of the off-axis ray passing through the positive lens A in the first lens group becomes large. As a result, it becomes difficult to suppress variations in lateral chromatic aberration and off-axis aberrations, in particular, astigmatism, so that high optical performance cannot be obtained.

In order to secure the effect of the present embodiment, it is preferable to set the lower limit of conditional expression (6) to 2.45.

In order to secure the effect of the present embodiment, it is preferable to set the upper limit of conditional expression (6) to 3.80.

In a zoom lens according to the first embodiment, the first lens group preferably includes a positive lens B, which satisfies the following conditional expression (7):

$$1.580 < ndB \tag{7}$$

where $ndB$ denotes a refractive index at d-line (wavelength $\lambda=587.6$ nm) of a material of the positive lens B in the first lens group.

Conditional expression (7) defines an optimum refractive index of the material of the positive lens B in the first lens group, and is for realizing high optical performance with suppressing variations in off-axis aberrations generated upon zooming.

When the value $ndB$ is equal to or falls below the lower limit of conditional expression (7), curvature of the surface of the positive lens B becomes strong, so that upon zooming from the wide-angle end state to the telephoto end state, variation in the deviation angle in accordance with variation in the height from the optical axis of the off-axis ray passing through the positive lens B becomes large. As a result, it becomes difficult to suppress variations in off-axis aberrations, in particular, astigmatism, so that high optical performance cannot be obtained.

In a zoom lens according to the first embodiment, the first lens group preferably includes a positive lens B, which satisfies the following conditional expression (8):

$$40.0 < vdB < 66.5 \tag{8}$$

where $vdB$ denotes an Abbe number at d-line (wavelength $\lambda=587.6$ nm) of a material of the positive lens B in the first lens group.

Conditional expression (8) defines an optimum Abbe number of the material of the positive lens B in the first lens group, and is for realizing high optical performance with suppressing variation in chromatic aberration generated upon zooming.

When the value $vdB$ is equal to or falls below the lower limit of conditional expression (8), dispersion of the material of the positive lens B becomes large, so that upon zooming from the wide-angle end state to the telephoto end state, variation in dispersion in accordance with variation in the height from the optical axis of the off-axis ray passing through the positive lens B becomes large. As a result, it becomes difficult to suppress variation in lateral chromatic aberration, so that high optical performance cannot be obtained.

On the other hand, when the value $vdB$ is equal to or exceeds the upper limit of conditional expression (8), dispersion of the material of the positive lens B becomes small, so that when a negative lens is included in the first lens group, correction of chromatic aberration becomes excessive. As a result, it becomes difficult to suppress variation in lateral chromatic aberration. When a negative lens is not included in the first lens group, since chromatic aberration remains, variation in chromatic aberration becomes difficult to suppress, so that high optical performance cannot be obtained. Accordingly, in either case, high optical performance cannot be realized.

In order to secure the effect of the present embodiment, it is preferable to set the lower limit of conditional expression (8) to 49.0.

In a zoom lens according to the first embodiment, the following conditional expression (9) is preferably satisfied:

$$0.65 < f1B/f1 < 1.75 \tag{9}$$

where $f1B$ denotes a focal length of the positive lens B in the first lens group.

Conditional expression (9) defines an optimum focal length of the positive lens B in the first lens group.

When the ratio $f1B/f1$ is equal to or falls below the lower limit of conditional expression (9), refractive power of the positive lens B becomes strong, so that upon zooming from the wide-angle end state to the telephoto end state, variation in refractive power in accordance with variation in the height from the optical axis of the off-axis ray passing through the positive lens B becomes large. As a result, it becomes difficult to suppress variations in lateral chromatic aberration and off-axis aberrations, in particular, astigmatism, so that high optical performance cannot be realized.

On the other hand, when the ratio $f1B/f1$ is equal to or exceeds the upper limit of conditional expression (9), refractive power of the positive lens B becomes weak, so that refractive power of the positive lens other than the positive lens B in the first lens group becomes strong. As a result, upon zooming from the wide-angle end state to the telephoto end state, variation in refractive power in accordance with variation in the height from the optical axis of the off-axis ray passing through the positive lens B becomes large. Accordingly, it becomes difficult to suppress variations in lateral chromatic aberration and off-axis aberrations, in particular, astigmatism, so that high optical performance cannot be realized.

In order to secure the effect of the present embodiment, it is preferable to set the lower limit of conditional expression (9) to 0.77.

In order to secure the effect of the present embodiment, it is preferable to set the upper limit of conditional expression (9) to 1.42.

In a zoom lens according to the first embodiment, the following conditional expression (10) is preferably satisfied:

$$1.75 < \phi 1B/fw < 4.50 \qquad (10)$$

where $\phi 1B$ denotes an effective diameter of the positive lens B in the first lens group.

Conditional expression (10) defines an optimum diameter of the positive lens B in the first lens group, and is for realizing high optical performance with suppressing variations in chromatic aberration and off-axis aberrations generated upon zooming.

When the ratio $\phi 1B/fw$ is equal to or falls below the lower limit of conditional expression (10), upon zooming from the wide-angle end state to the telephoto end state, variation in the height from the optical axis of the off-axis ray passing through the positive lens B in the first lens group becomes small, so that it becomes difficult to suppress variations in off-axis aberrations, in particular, astigmatism. Accordingly, high optical performance cannot be realized.

On the other hand, when the ratio $\phi 1B/fw$ is equal to or exceeds the upper limit of conditional expression (10), upon zooming from the wide-angle end state to the telephoto end state, variation in the height from the optical axis of the off-axis ray passing through the positive lens B in the first lens group becomes large, so that it becomes difficult to suppress variations in lateral chromatic aberration and off-axis aberrations, in particular, astigmatism. Accordingly, high optical performance cannot be realized.

In order to secure the effect of the present embodiment, it is preferable to set the lower limit of conditional expression (10) to 2.45.

In order to secure the effect of the present embodiment, it is preferable to set the upper limit of conditional expression (10) to 3.80.

In a zoom lens according to the first embodiment, the first lens group preferably includes a negative lens which satisfies the following conditional expressions (11) and (12):

$$1.750 < ndN \qquad (11)$$

$$28.0 < vdN < 50.0 \qquad (12)$$

where ndN denotes a refractive index at d-line (wavelength $\lambda=587.6$ nm) of a material of a negative lens in the first lens group, and vdN denotes an Abbe number at d-line (wavelength $\lambda=587.6$ nm) of the material of the negative lens in the first lens group.

Conditional expression (11) defines an optimum range of the refractive index in the negative lens in the first lens group, and is for realizing high optical performance with suppressing variations in off-axis aberrations generated upon zooming from the wide-angle end state to the telephoto end state.

When the value vdN is equal to or falls below the lower limit of conditional expression (11), curvature of the surface of the negative lens in the first lens group becomes large, so that upon zooming from the wide-angle end state to the telephoto end state, variations in off-axis aberrations, in particular, astigmatism in accordance with variation in the height from the optical axis of the off-axis ray passing through the negative lens become difficult to be suppressed. Accordingly, high optical performance cannot be realized.

In order to secure the effect of the present embodiment, it is preferable to set the lower limit of conditional expression (11) to 1.780.

Conditional expression (12) defines an optimum Abbe number of the material of the negative lens in the first lens group, and is for realizing high optical performance with suppressing variation in chromatic aberration generated upon zooming from the wide-angle end state to the telephoto end state.

When the value vdN is equal to or falls below the lower limit of conditional expression (12), it becomes difficult to suppress variation in second order chromatic aberration generated upon zooming from the wide-angle end state to the telephoto end state, so that high optical performance cannot be realized.

On the other hand, when the value vdN is equal to or exceeds the upper limit of conditional expression (12), and when a given achromatization is to be carried out in the first lens group, refractive power of each of the positive lens and the negative lens becomes large. As a result, variations in off-axis aberrations, in particular, astigmatism in accordance with variation in the height from the optical axis of the off-axis ray passing through the negative lens upon zooming from the wide-angle end state to the telephoto end state become difficult to be suppressed, so that high optical performance cannot be realized.

In order to secure the effect of the present embodiment, it is preferable to set the upper limit of conditional expression (12) to 43.0.

In a zoom lens according to the first embodiment, the first lens group is preferably composed of one negative lens and two positive lenses.

With this configuration, the thickness of the first lens group can be suppressed. Accordingly, upon zooming from the wide-angle end state to the telephoto end state, variation in the height from the optical axis of the off-axis ray passing through the most object side surface of the first lens group can be suppressed, so that variations in off-axis aberrations, in particular, astigmatism can be suppressed. As a result, high optical performance can be realized.

In a zoom lens according to the first embodiment, the third lens group preferably includes a positive lens, which satisfies the following conditional expression (13):

$$65.5 < vd3 \text{ when } 1.540 \leq nd3$$

$$75.0 < vd3 \text{ when } nd3 < 1.540 \qquad (13)$$

where nd3 denotes a refractive index at d-line (wavelength $\lambda=587.6$ nm) of a material of a positive lens in the third lens group, and vd3 denotes an Abbe number at d-line (wavelength $\lambda=587.6$ nm) of the material of the positive lens in the third lens group.

Conditional expression (13) defines an optimum Abbe number of the material of the positive lens in the third lens group, and is for realizing high optical performance with suppressing variation in chromatic aberration generated upon zooming from the wide-angle end state to the telephoto end state.

When the value vd3 is equal to or falls below the lower limit of conditional expression (13), it becomes difficult to suppress variations in longitudinal chromatic aberration and lateral chromatic aberration. The material becomes a one having small anomalous dispersion, so that variation in secondary order of chromatic aberration becomes difficult to be suppressed. In addition, longitudinal chromatic aberration and lateral chromatic aberration in visible light range become large in the telephoto end state, so that high optical performance cannot be obtained.

In order to secure the effect of the present embodiment, it is preferable to set the lower limit of conditional expression (13) to 67.5 when $1.540 \leq nd3$. In order to secure the effect of the present embodiment, it is preferable to set the lower limit of conditional expression (13) to 80.5 when $nd3 < 1.540$.

In a zoom lens according to the first embodiment, it is preferable that the third lens group includes, in order from the object side, a front lens group having positive refractive power and a rear lens group having positive refractive power, and a distance between the front lens group and the rear lens group decreases upon zooming from the wide-angle end state to the telephoto end state.

With this configuration, zooming efficiency of the third lens group can be enhanced better than a configuration that the third lens group is moved in a body upon zooming. Moreover, high optical performance can be realized with suppressing variations in spherical aberration, coma and astigmatism.

In a zoom lens according to the first embodiment, it is preferable that the third lens group includes, in order from the object side, a front lens group having positive refractive power, a middle lens group having negative refractive power, and a rear lens group having positive refractive power, and a distance between the front lens group and the middle lens group varies, and a distance between the middle lens group and the rear lens group varies upon zooming from the wide-angle end state to the telephoto end state.

With this configuration, variations in aberrations generated in the third lens group can be suppressed better than a configuration that the third lens group is moved in a body upon zooming, so that high optical performance can be realized with suppressing in particular spherical aberration, coma and astigmatism.

In a zoom lens according to the first embodiment, it is preferable that a distance between the front lens group and the middle lens group increases, and a distance between the middle lens group and the rear lens group decreases.

With this configuration, zooming efficiency of the third lens group can be enhanced, so that high optical performance can be realized with suppressing variations in spherical aberration, coma and astigmatism.

Then, a zoom lens seen from another point of view according to the first embodiment of the present application includes, in order from an object side along an optical axis, a first lens group having positive refractive power, a second lens group having negative refractive power, and a third lens group having positive refractive power. Upon zooming from a wide-angle end state to a telephoto end state, a distance between the first lens group and the second lens group increases, and a distance between the second lens group and the third lens group decreases, thereby realizing an optical system capable of zooming and, at the same time, suppressing variation in distortion upon zooming.

In a zoom lens seen from another point of view according to the first embodiment, the first lens group includes a positive lens A, which satisfies the following conditional expression (1), and satisfies the following conditional expression (2):

$$85.0 < vdA \quad (1)$$

$$3.90 < f1/fw < 11.00 \quad (2)$$

where vdA denotes an Abbe number at d-line (wavelength λ=587.6 nm) of a material of the positive lens A in the first lens group, fw denotes a focal length of the zoom lens in the wide-angle end state, and f1 denotes a focal length of the first lens group.

Conditional expression (1) defines an optimum Abbe number of the positive lens A in the first lens group, and is for realizing high optical performance with suppressing variation in chromatic aberration generated upon zooming from the wide-angle end state to the telephoto end state. However, conditional expression (1) has already been explained above, so that duplicated explanations are omitted.

Conditional expression (2) defines an appropriate range of the focal length of the first lens group, and is for realizing high optical performance with suppressing variations in chromatic aberration and off-axis aberrations generated upon zooming from the wide-angle end state to the telephoto end state. However, conditional expression (2) has already been explained above, so that duplicated explanations are omitted.

In a zoom lens seen from another point of view according to the first embodiment of the present application, at least one optical surface among the first lens group and the second lens group is applied with an antireflection coating, and the antireflection coating includes at least one layer that is formed by a wet process. With this configuration, a zoom lens seen from another point of view according to the first embodiment of the present application makes it possible to suppress ghost images and flare generated by the light rays from the object reflected from the optical surfaces, thereby realizing excellent optical performance.

Moreover, in a zoom lens seen from another point of view according to the first embodiment of the present application, the antireflection coating is a multilayer film, and the layer formed by the wet process is preferably the outermost layer among the layers composing the multilayer film. With this configuration, since difference in refractive index with respect to the air can be small, reflection of light can be small, so that ghost images and flare can further be suppressed.

In a zoom lens seen from another point of view according to the first embodiment of the present application, when a refractive index at d-line of the layer formed by the wet process is denoted by nd, the refractive index nd is preferably 1.30 or less. With this configuration, since difference in refractive index with respect to the air can be small, reflection of light can be small, so that ghost images and flare can further be suppressed.

Moreover, in a zoom lens seen from another point of view according to the first embodiment of the present application, the optical surface on which the antireflection coating is formed is preferably a concave surface seen from an aperture stop. Since reflection light rays are liable to be generated on a concave surface seen from the aperture stop among optical surfaces in the first lens group and the second lens group, with applying the antireflection coating on such an optical surface, ghost images and flare can effectively be suppressed.

In a zoom lens seen from another point of view according to the first embodiment, it is desirable that, the concave surface on which the antireflection coating is applied as seen from the aperture stop is an image side lens surface. Since the image side concave surface as seen from the aperture stop among optical surfaces in the first lens group and the second lens group tends to generate reflection light, with applying the antireflection coating on such an optical surface, ghost images and flare can effectively be suppressed.

In a zoom lens seen from another point of view according to the first embodiment, it is desirable that, the concave surface on which the antireflection coating is applied as seen from the aperture stop is an object side lens surface. Since the object side concave surface as seen from the aperture stop among optical surfaces in the first lens group and the second lens group tends to generate reflection light, with applying the antireflection coating on such an optical surface, ghost images and flare can effectively be suppressed.

Moreover, in a zoom lens seen from another point of view according to the first embodiment of the present application, the optical surface on which the antireflection coating is formed is preferably a concave surface seen from an object. Since reflection light rays are liable to be generated on a concave surface seen from the object among optical surfaces in the first lens group and the second lens group, with applying the antireflection coating on such an optical surface, ghost images and flare can effectively be suppressed.

Moreover, in a zoom lens seen from another point of view according to the first embodiment of the present application, the concave optical surface seen from the object on which the antireflection coating is formed is preferably an image side lens surface of the image side second lens from the most object side lens in the first lens group. Since reflection light rays are liable to be generated on the image side lens surface of the image side second lens from the most object side lens in the first lens group, with applying the antireflection coating on such an optical surface, ghost images and flare can effectively be suppressed.

Moreover, in a zoom lens seen from another point of view according to the first embodiment of the present application, the concave optical surface seen from the object on which the antireflection coating is formed is preferably an object side lens surface of the image side second lens from the most object side lens in the second lens group. Since reflection light rays are liable to be generated on the object side lens surface of the image side second lens from the most object side lens in the second lens group, with applying the antireflection coating on such an optical surface, ghost images and flare can effectively be suppressed.

Moreover, in a zoom lens seen from another point of view according to the first embodiment of the present application, the concave optical surface seen from the object on which the antireflection coating is formed is preferably an image side lens surface of the image side third lens from the most object side lens in the second lens group. Since reflection light rays are liable to be generated on the image side lens surface of the image side third lens from the most object side lens in the second lens group, with applying the antireflection coating on such an optical surface, ghost images and flare can effectively be suppressed.

Moreover, in a zoom lens seen from another point of view according to the first embodiment of the present application, the concave optical surface seen from the object on which the antireflection coating is formed is preferably an object side lens surface of the image side fourth lens from the most object side lens in the second lens group. Since reflection light rays are liable to be generated on the object side lens surface of the image side fourth lens from the most object side lens in the second lens group, with applying the antireflection coating on such an optical surface, ghost images and flare can effectively be suppressed.

In a zoom lens seen from another point of view according to the first embodiment, the antireflection coating may also be formed by a dry process etc without being limited to the wet process. On this occasion, it is preferable that the antireflection coating contains at least one layer of which the refractive index is equal to 1.30 or less. Thus, the same effects as in the case of using the wet process can be obtained by forming the antireflection coating based on the dry process etc. Note that at this time the layer of which the refractive index is equal to 1.30 or less is preferably the layer of the outermost surface of the layers composing the multi layer film.

In a zoom lens seen from another point of view according to the first embodiment, the following conditional expression (3) is preferably satisfied:

$$0.28 < f1/ft < 0.52 \quad (3)$$

where ft denotes a focal length of the zoom lens in the telephoto end state.

Conditional expression (3) defines an appropriate range of an optimum focal length of the first lens group, and is for realizing high optical performance with suppressing variations in chromatic aberration and off-axis aberrations generated upon zooming from the wide-angle end state to the telephoto end state. However, conditional expression (3) has already been explained above, so that duplicated explanations are omitted.

In a zoom lens seen from another point of view according to the first embodiment, the following conditional expression (4) is preferably satisfied:

$$0.25 < \Delta 1/f1 < 1.10 \quad (4)$$

where $\Delta 1$ denotes a moving amount of the first lens group with respect to the image plane upon zooming from the wide-angle end state to the telephoto end state.

Conditional expression (4) defines an optimum moving amount of the first lens group with respect to the image plane upon zooming from the wide-angle end state to the telephoto end state. However, conditional expression (4) has already been explained above, so that duplicated explanations are omitted.

In a zoom lens seen from another point of view according to the first embodiment, the following conditional expression (5) is preferably satisfied:

$$0.65 < f1A/f1 < 1.75 \quad (5)$$

where f1A denotes a focal length of the positive lens A in the first lens group.

Conditional expression (5) defines an optimum focal length of the positive lens A in the first lens group, and is for realizing high optical performance with suppressing variations in chromatic aberration and off-axis aberrations generated upon zooming. However, conditional expression (5) has already been explained above, so that duplicated explanations are omitted.

In a zoom lens seen from another point of view according to the first embodiment, the following conditional expression (6) is preferably satisfied:

$$1.75 < \phi 1A/fw < 4.50 \quad (6)$$

where $\phi 1A$ denotes an effective diameter of the positive lens A in the first lens group.

Conditional expression (6) defines an optimum effective diameter of the positive lens A in the first lens group, and is for realizing high optical performance with suppressing variations in chromatic aberration and off-axis aberrations generated upon zooming. However, conditional expression (6) has already been explained above, so that duplicated explanations are omitted.

In a zoom lens seen from another point of view according to the first embodiment, the first lens group preferably includes a positive lens B, which satisfies the following conditional expression (7):

$$1.580 < ndB \quad (7)$$

where ndB denotes a refractive index at d-line (wavelength $\lambda=587.6$ nm) of a material of the positive lens B in the first lens group.

Conditional expression (7) defines an optimum refractive index of the material of the positive lens B in the first lens group, and is for realizing high optical performance with suppressing variations in off-axis aberrations generated upon zooming. However, conditional expression (7) has already been explained above, so that duplicated explanations are omitted.

In a zoom lens seen from another point of view according to the first embodiment, the first lens group preferably includes a positive lens B, which satisfies the following conditional expression (8):

$$40.0 < vdB < 66.5 \quad (8)$$

where vdB denotes an Abbe number at d-line (wavelength λ=587.6 nm) of a material of the positive lens B in the first lens group.

Conditional expression (8) defines an optimum Abbe number of the material of the positive lens B in the first lens group, and is for realizing high optical performance with suppressing variation in chromatic aberration generated upon zooming. However, conditional expression (8) has already been explained above, so that duplicated explanations are omitted.

In a zoom lens seen from another point of view according to the first embodiment, the following conditional expression (9) is preferably satisfied:

$$0.65 < f1B/f1 < 1.75 \quad (9)$$

where f1B denotes a focal length of the positive lens B in the first lens group.

Conditional expression (9) defines an optimum focal length of the positive lens B in the first lens group. However, conditional expression (9) has already been explained above, so that duplicated explanations are omitted.

In a zoom lens seen from another point of view according to the first embodiment, the following conditional expression (10) is preferably satisfied:

$$1.75 < \phi 1B/fw < 4.50 \quad (10)$$

where φ1B denotes an effective diameter of the positive lens B in the first lens group.

Conditional expression (10) defines an optimum diameter of the positive lens B in the first lens group, and is for realizing high optical performance with suppressing variations in chromatic aberration and off-axis aberrations generated upon zooming. However, conditional expression (10) has already been explained above, so that duplicated explanations are omitted.

In a zoom lens seen from another point of view according to the first embodiment, the first lens group preferably includes a negative lens, which satisfies the following conditional expressions (11) and (12):

$$1.750 < ndN \quad (11)$$

$$28.0 < vdN < 50.0 \quad (12)$$

where ndN denotes a refractive index at d-line (wavelength λ=587.6 nm) of a material of a negative lens in the first lens group, and vdN denotes an Abbe number at d-line (wavelength λ=587.6 nm) of the material of the negative lens in the first lens group.

Conditional expression (11) defines an optimum range of the refractive index in the negative lens in the first lens group, and is for realizing high optical performance with suppressing variations in off-axis aberrations generated upon zooming from the wide-angle end state to the telephoto end state. However, conditional expression (11) has already been explained above, so that duplicated explanations are omitted.

Conditional expression (12) defines an optimum Abbe number of the material of the negative lens in the first lens group, and is for realizing high optical performance with suppressing variation in chromatic aberration generated upon zooming from the wide-angle end state to the telephoto end state. However, conditional expression (12) has already been explained above, so that duplicated explanations are omitted.

In a zoom lens seen from another point of view according to the first embodiment, the first lens group is preferably composed of one negative lens and two positive lenses.

With this configuration, the thickness of the first lens group can be suppressed. Accordingly, upon zooming from the wide-angle end state to the telephoto end state, variation in the height from the optical axis of the off-axis ray passing through the most object side surface of the first lens group can be suppressed, so that variations in off-axis aberrations, in particular, astigmatism can be suppressed. As a result, high optical performance can be realized.

In a zoom lens seen from another point of view according to the first embodiment, the third lens group preferably includes a positive lens, which satisfies the following conditional expression (13):

$$65.5 < vd3 \text{ when } 1.540 \leq nd3$$

$$75.0 < vd3 \text{ when } nd3 < 1.540 \quad (13)$$

where nd3 denotes a refractive index at d-line (wavelength λ=587.6 nm) of a material of a positive lens in the third lens group, and vd3 denotes an Abbe number at d-line (wavelength λ=587.6 nm) of the material of the positive lens in the third lens group.

Conditional expression (13) defines an optimum Abbe number of the material of the positive lens in the third lens group, and is for realizing high optical performance with suppressing variation in chromatic aberration generated upon zooming from the wide-angle end state to the telephoto end state. However, conditional expression (13) has already been explained above, so that duplicated explanations are omitted.

In a zoom lens seen from another point of view according to the first embodiment, it is preferable that the third lens group includes, in order from the object side, a front lens group having positive refractive power and a rear lens group having positive refractive power, and a distance between the front lens group and the rear lens group decreases upon zooming from the wide-angle end state to the telephoto end state.

With this configuration, zooming efficiency of the third lens group can be enhanced better than a configuration that the third lens group is moved in a body upon zooming. Moreover, high optical performance can be realized with suppressing variations in spherical aberration, coma and astigmatism.

In a zoom lens seen from another point of view according to the first embodiment, it is preferable that the third lens group includes, in order from the object side, a front lens group having positive refractive power, a middle lens group having negative refractive power, and a rear lens group having positive refractive power, and a distance between the front lens group and the middle lens group varies, and a distance between the middle lens group and the rear lens group varies upon zooming from the wide-angle end state to the telephoto end state.

With this configuration, variations in aberrations generated in the third lens group can be suppressed better than a configuration that the third lens group is moved in a body upon zooming, so that high optical performance can be realized with suppressing in particular spherical aberration, coma and astigmatism.

In a zoom lens seen from another point of view according to the first embodiment, it is preferable that a distance between the front lens group and the middle lens group increases, and a distance between the middle lens group and the rear lens group decreases.

With this configuration, zooming efficiency of the third lens group can be enhanced, so that high optical performance can be realized with suppressing variations in spherical aberration, coma and astigmatism.

Then, a zoom lens according to each Example of the first embodiment is explained below with reference to accompanying drawings. Incidentally, detailed explanation of an antireflection coating will be explained separately after Example 12 of a third embodiment.

Example 1

FIG. 1 is a sectional view showing a lens configuration of a zoom lens according to Example 1 of a first embodiment of the present application.

As shown in FIG. 1, the zoom lens according to Example 1 of the first embodiment is composed of, in order from an object side along an optical axis, a first lens group G1 having positive refractive power, a second lens group G2 having negative refractive power, and a third lens group G3 having positive refractive power. The third lens group G3 is composed of, in order from the object side along the optical axis, a front lens group G31 having positive refractive power, a middle lens group G32 having negative refractive power, and a rear lens group G33 having positive refractive power.

Upon zooming from a wide-angle end state to a telephoto end state, the first lens group G1 is moved monotonously to the object side, the second lens group G2 is moved at first to the image side and then to the object side, and the third lens group G3 is moved monotonously to the object side with respect to the image plane I such that a distance between the first lens group G1 and the second lens group G2 increases, and a distance between the second lens group G2 and the third lens group G3 decreases. Moreover, the front lens group G31, the middle lens group G32 and the rear lens group G33 are moved monotonously to the object side with respect to the image plane I such that a distance between the front lens group G31 and the middle lens group G32 increases, and a distance between the middle lens group G32 and the rear lens group G33 decreases. Moreover, the front lens group G31 and the rear lens group G33 are moved in a body with respect to the image plane I.

An aperture stop S is disposed to the most object side of the third lens group G3, which is disposed to the image side of the second lens group G2, and formed in a body with the front lens group G31.

The first lens group G1 is composed of, in order from the object side along the optical axis, a cemented lens constructed by a negative meniscus lens L11 having a convex surface facing the object side cemented with a double convex positive lens L12, and a double convex positive lens L13.

The second lens group G2 is composed of, in order from the object side along the optical axis, a negative meniscus lens L21 having a convex surface facing the object side, a double concave negative lens L22, a double convex positive lens L23, and a cemented lens constructed by a double concave negative lens L24 cemented with a double convex positive lens L25. The negative meniscus lens L21 disposed to the most object side of the second lens group G2 is a compound type aspherical lens whose object side lens surface is formed as an aspherical surface by applying a resin layer.

The front lens group G31 is composed of, in order from the object side along the optical axis, a double convex positive lens L31, a double convex positive lens L32, and a cemented lens constructed by a double convex positive lens L33 cemented with a negative meniscus lens L34 having a concave surface facing the object side.

The middle lens group G32 is composed of, in order from the object side along the optical axis, a cemented lens constructed by a double concave negative lens L41 cemented with a positive meniscus lens L42 having a convex surface facing the object side, and a negative meniscus lens L43 having a concave surface facing the object side. The double concave negative lens L41 disposed to the most object side of the middle lens group G32 is a glass mold type aspherical lens whose object side lens surface is an aspherical surface.

The rear lens group G33 is composed of, in order from the object side along the optical axis, a positive meniscus lens L51 having a concave surface facing the object side, a double convex positive lens L52, and a cemented lens constructed by a double concave negative lens L53 cemented with a double convex positive lens L54. The positive meniscus lens L51 disposed to the most object side of the rear lens group G33 is a glass mold type aspherical lens whose object side lens surface is an aspherical surface. Light rays come out from the double convex positive lens L54 form an image on the image plane I.

The image plane I is formed on an unillustrated imaging device. The imaging device is constructed by a CCD, CMOS, and the like. This is the same in the following Examples.

In the zoom lens seen from another point of view according to Example 1 of the first embodiment, an antireflection coating described later is applied to the image plane side lens surface of the negative meniscus lens L21 in the second lens group G2 and the object side lens surface of the double concave negative lens L22 in the second lens group G2.

Various values associated with the zoom lens according to Example 1 of the first embodiment are listed in Table 1.

In (Specifications), W denotes a wide-angle end state, M denotes an intermediate focal length state, T denotes a telephoto end state, f denotes a focal length of the zoom lens, FNO denotes an f-number, ω denotes a half angle of view (unit: degree), Y denotes an image height, TL denotes a total lens length that is a distance from the most object side lens surface of the first lens group G1 and the image plane I upon focusing on infinity, and Bf denotes a back focal length.

In (Lens Data), "OP" denotes an object plane, "I" denotes an image plane, the left most column "i" shows optical surface number, the second column "r" shows a radius of curvature of each optical surface, the third column "d" shows a surface distance, the fourth column "nd" shows a refractive index at d-line (wavelength λ=587.6 nm), and the fifth column "vd" shows an Abbe number at d-line (wavelength λ=587.6 nm). In the fifth column "nd" refractive index of the air nd=1.000000 is omitted. In the second column "r", r=∞ indicates a plane surface.

An aspherical surface is expressed by the following expression when y is a height in the direction vertical to the optical axis, X(y) is a distance (sag amount) along the optical axis from a tangent plane of a vertex of each aspherical surface at the height y up to each aspherical surface, r is a radius of curvature (paraxial radius of curvature) of a reference sphere, k is a conical coefficient and Cn is an n-th order aspherical surface coefficient. Note that [E-n] represents [×10$^{-n}$] in the subsequent Examples:

$$X(y)=(y^2/r)/[1+(1-k\times y^2/r^2)^{1/2}]+A4\times y^4+A6\times y^6+A8\times y^8+A10\times y^{10}.$$

In (Aspherical Surface Data), "E-n" denotes "×10$^{-n}$", in which "n" is an integer, and for example "1.234E-05" denotes "1.234×10$^{-5}$". Each aspherical surface is expressed in (Lens Data) by attaching "*" to the right side of the surface number.

In (Variable Distances), di ("i" a surface number) denotes a variable distance, and Bf denotes a back focal length.

In (Lens Group Data), a start surface number "ST" of each lens group, and a focal length of each lens group are shown. In (Values for Conditional Expressions), values for respective conditional expressions are shown.

In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples including Examples in the second and third embodiments.

TABLE 1

(Specifications)
zoom ratio = 15.709

|  | W | M | T |
|---|---|---|---|
| f = | 18.56080 | 104.15546 | 291.57422 |
| FNO = | 3.60018 | 5.60084 | 5.87404 |
| ω = | 38.95554 | 7.45367 | 2.71157 |
| Y = | 14.20 | 14.20 | 14.20 |
| TL = | 163.29692 | 225.59510 | 252.97281 |
| Bf = | 39.15242 | 70.61280 | 82.77641 |

(Lens Data)

| i | r | d | nd | νd |
|---|---|---|---|---|
| OP | ∞ | ∞ |  |  |
| 1 | 205.09180 | 2.00000 | 1.882997 | 40.76 |
| 2 | 67.52420 | 9.07190 | 1.456000 | 91.20 |
| 3 | −361.42710 | 0.10000 |  |  |
| 4 | 70.10040 | 6.86700 | 1.603001 | 65.46 |
| 5 | −2470.83790 | (d5) |  |  |
| 6* | 84.76870 | 0.15000 | 1.553890 | 38.09 |
| 7 | 73.93750 | 1.20000 | 1.834807 | 42.72 |
| 8 | 17.03670 | 6.46970 |  |  |
| 9 | −49.48220 | 1.00000 | 1.816000 | 46.62 |
| 10 | 52.14060 | 0.15000 |  |  |
| 11 | 31.61490 | 5.45080 | 1.761820 | 26.56 |
| 12 | −44.44820 | 1.19350 |  |  |
| 13 | −25.13580 | 1.00000 | 1.816000 | 46.62 |
| 14 | 64.50360 | 2.42190 | 1.808090 | 22.79 |
| 15 | −166.54310 | (d15) |  |  |
| 16 | ∞ | 1.00000 | Aperture Stop S | |
| 17 | 63.10220 | 3.49130 | 1.593190 | 67.87 |
| 18 | −50.22150 | 0.10000 |  |  |
| 19 | 58.68260 | 2.72200 | 1.487490 | 70.41 |
| 20 | −121.43450 | 0.10000 |  |  |
| 21 | 48.64320 | 4.10420 | 1.487490 | 70.41 |
| 22 | −34.50080 | 1.00000 | 1.808090 | 22.79 |
| 23 | −205.15990 | (d23) |  |  |
| 24* | −66.96860 | 1.00000 | 1.693501 | 53.20 |
| 25 | 26.57120 | 2.15810 | 1.761820 | 26.56 |
| 26 | 63.33840 | 4.78730 |  |  |
| 27 | −24.70410 | 1.00000 | 1.729157 | 54.66 |
| 28 | −74.86360 | (d28) |  |  |
| 29* | −569.79420 | 3.96090 | 1.589130 | 61.16 |
| 30 | −23.53500 | 0.10000 |  |  |

TABLE 1-continued (Specifications)
zoom ratio = 15.709

| 31 | 37.14850 | 5.00600 | 1.487490 | 70.41 |
|---|---|---|---|---|
| 32 | −45.19690 | 1.71640 |  |  |
| 33 | −107.03630 | 1.00000 | 1.882997 | 40.76 |
| 34 | 23.36210 | 4.50160 | 1.548141 | 45.79 |
| 35 | −637.55850 | (Bf) |  |  |
| I | ∞ |  |  |  |

(Aspherical Surface Data)

Surface Number = 6

κ = 1.0000      A4 = 3.61880E−06
A6 = −6.10680E−09      A8 = −4.67380E−12
A10 = 5.77660E−14

Surface Number = 24

κ = 1.0000      A4 = 3.81940E−06
A6 = −1.72450E−09      A8 = 0.00000E+00
A10 = 0.00000E+00

Surface Number = 29

κ = 1.0000      A4 = −1.63630E−05
A6 = 8.94380E−09      A8 = −2.98150E−11
A10 = 2.87630E−14

(Variable Distances)

|  | W | M | T |
|---|---|---|---|
| d5 = | 2.14670 | 55.86030 | 80.53690 |
| d15 = | 34.33830 | 11.46250 | 2.00000 |
| d23 = | 3.38750 | 10.66930 | 11.83690 |
| d28 = | 9.44940 | 2.16760 | 1.00000 |
| Bf = | 39.15242 | 70.61280 | 82.77641 |

(Lens Group Data)

| Group | ST | Focal Length |
|---|---|---|
| 1 | 1 | 122.10406 |
| 2 | 6 | −15.86654 |
| 3 | 16 | 39.50539 (W) |
|  |  | 33.18380 (M) |
|  |  | 31.88175 (T) |
| 31 | 16 | 26.56694 |
| 32 | 24 | −24.00147 |
| 33 | 29 | 33.81791 |

(Values for Conditional Expressions)

(1) νdA = 91.20 (L12)
(2) f1/fw = 6.579
(3) f1/ft = 0.419
(4) Δ1/f1 = 0.734
(5) f1A/f1 = 1.029 (L12)
(6) φ1A/fw = 3.007 (φ1A = 55.81)(L12)
(7) ndB = 1.603001 (L13)
(8) νdB = 65.46 (L13)
(9) f1B/f1 = 0.927 (L13)
(10) φ1B/fw = 2.909 (φ1B = 54.00)(L13)
(11) ndN = 1.882997 (L11)
(12) νdN = 40.76 (L11)
(13) nd3 = 1.593190 (L31)
     νd3 = 67.87 (L31)

Figure 2B:
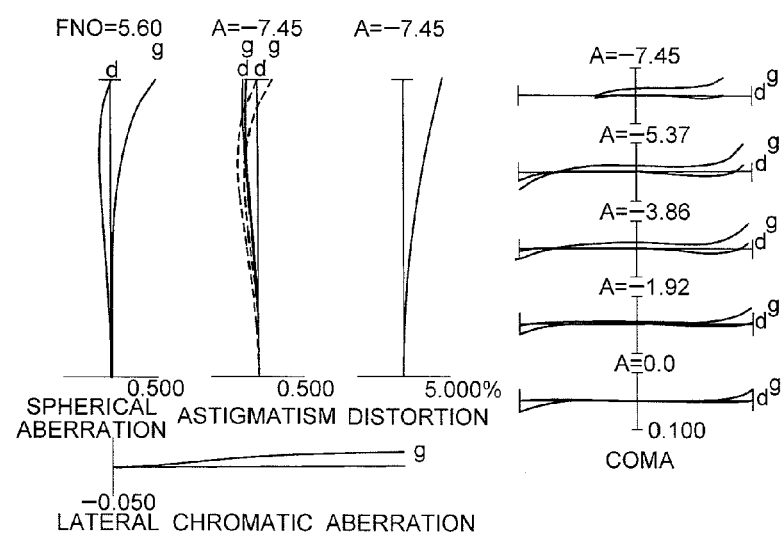
Figure 2C:
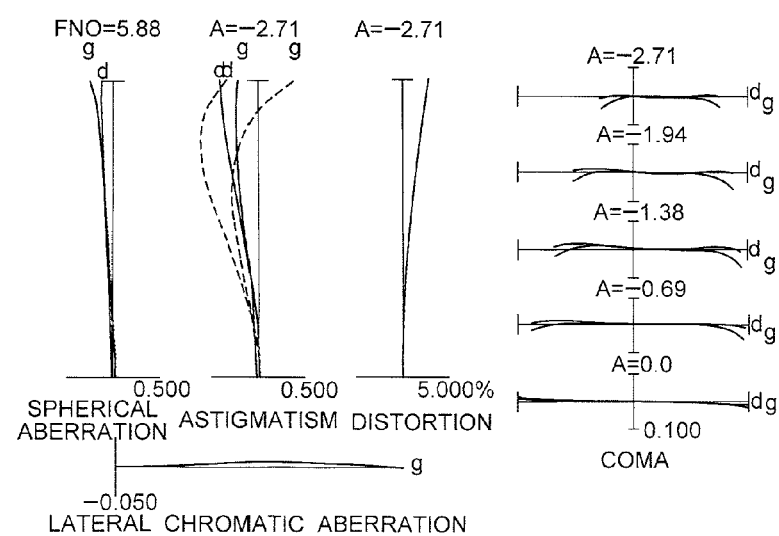

FIGS. 2A, 2B and 2C are graphs showing various aberrations of the zoom lens according to Example 1 of the first embodiment upon focusing on an infinitely distant object, in which FIG. 2A is a wide-angle end state, FIG. 2B is an intermediate focal length state, and FIG. 2C is a telephoto end state.

In respective graphs, FNO denotes an f-number, A denotes a half angle of view (unit: degree), d denotes an aberration curve at d-line (wavelength λ=587.6 nm), and g denotes an aberration curve at g-line (wavelength λ=435.8 nm). Aberration curve with out specified is an aberration curve with respect to d-line. In graphs showing astigmatism, a solid line indicates a sagittal image plane, and a broken line indicates a meridional image plane. The explanations of reference symbols are the same in the other Examples including Examples in the second and third embodiments.

As is apparent from various graphs, the zoom lens according to Example 1 of the first embodiment shows superb optical performance as a result of good corrections to various aberrations.

FIG. 3 is a sectional view showing the lens configuration of the lens system according to Example 1 of the first embodiment and is an explanatory view, in which light rays reflected from a first-ghost-generating surface are reflected by a second-ghost-generating surface.

As shown in FIG. 3, when light rays BM from an object are incident on the zoom lens, the rays are reflected by the object side lens surface (a first-ghost-generating surface whose surface number is 9) of the double concave negative lens L22, and the reflected light rays are reflected again by the image plane I side lens surface (a second-ghost-generating surface whose surface number is 8) of the negative meniscus lens L21 to reach the image plane I with generating ghost images. Incidentally, the first-ghost-generating surface 9 is a concave surface seen from the object side, and the second-ghost-generating surface 8 is a concave surface seen from the aperture stop S. With forming an antireflection coating corresponding to a broad wavelength range to such lens surfaces, it becomes possible to effectively suppress ghost images and flare.

Example 2

FIG. 4 is a sectional view showing a lens configuration of a zoom lens according to Example 2 of the first embodiment of the present application.

As shown in FIG. 4, the zoom lens according to Example 2 of the first embodiment is composed of, in order from an object side along an optical axis, a first lens group G1 having positive refractive power, a second lens group G2 having negative refractive power, and a third lens group G3 having positive refractive power. The third lens group G3 is composed of, in order from the object side along the optical axis, a front lens group G31 having positive refractive power, and a rear lens group G32 having positive refractive power.

Upon zooming from a wide-angle end state to a telephoto end state, the first lens group G1 is moved monotonously to the object side, the second lens group G2 is moved monotonously to the object side, and the third lens group G3 is moved monotonously to the object side with respect to the image plane I such that a distance between the first lens group G1 and the second lens group G2 increases, and a distance between the second lens group G2 and the third lens group G3 decreases. Moreover, the front lens group G31, and the rear lens group G32 are moved monotonously to the object side with respect to the image plane I such that a distance between the front lens group G31 and the rear lens group G32 decreases.

An aperture stop S is disposed to the most object side of the third lens group G3, which is disposed to the image side of the second lens group G2, and formed in a body with the front lens group G31.

The first lens group G1 is composed of, in order from the object side along the optical axis, a cemented lens constructed by a negative meniscus lens L11 having a convex surface facing the object side cemented with a double convex positive lens L12, and a positive meniscus lens L13 having a convex surface facing the object side.

The second lens group G2 is composed of, in order from the object side along the optical axis, a negative meniscus lens L21 having a convex surface facing the object side, a double concave negative lens L22, a double convex positive lens L23, and a double concave negative lens L24. The negative meniscus lens L21 disposed to the most object side of the second lens group G2 is a compound type aspherical lens whose object side lens surface is formed as an aspherical surface by applying a resin layer.

The front lens group G31 is composed of, in order from the object side along the optical axis, a double convex positive lens L31, a cemented lens constructed by a double convex positive lens L32 cemented with a negative meniscus lens L33 having a concave surface facing the object side, and a cemented lens constructed by a double concave negative lens L34 cemented with a positive meniscus lens L35 having a convex surface facing the object side. The double concave negative lens L34 is a compound type aspherical lens whose object side lens surface is formed as an aspherical surface by applying a resin layer.

The rear lens group G32 is composed of, in order from the object side along the optical axis, a double convex positive lens L41, a cemented lens constructed by a double convex positive lens L42 cemented with a double concave negative lens L43, and a double convex positive lens L44. The double convex positive lens L41 disposed to the most object side of the rear lens group G32 is a glass mold type aspherical lens whose object side lens surface is an aspherical surface. Light rays come out from the double convex positive lens L44 form an image on the image plane I.

In the zoom lens seen from another point of view according to Example 2 of the first embodiment, an antireflection coating described later is applied to the object side lens surface of the positive meniscus lens L13 in the first lens group G1 and the image side lens surface of the double convex positive lens L23 in the second lens group G2.

Various values associated with the zoom lens according to Example 2 of the first embodiment are listed in Table 2.

TABLE 2

(Specifications)
zoom ratio = 15.666

|   | W | M | T |
|---|---|---|---|
| f = | 18.57581 | 134.79308 | 291.01598 |
| FNO = | 3.58467 | 6.30198 | 6.35739 |
| ω = | 38.75301 | 5.90773 | 2.74550 |
| Y = | 14.20 | 14.20 | 14.20 |
| TL = | 141.06118 | 214.13726 | 227.18745 |
| Bf = | 38.02328 | 85.33826 | 92.60805 |

(Lens Data)

| i | r | d | nd | vd |
|---|---|---|---|---|
| OP | ∞ | ∞ | | |
| 1 | 107.02060 | 1.80000 | 1.903658 | 31.31 |
| 2 | 61.29680 | 9.01320 | 1.456500 | 90.27 |
| 3 | −505.77970 | 0.10000 | | |
| 4 | 56.57080 | 6.56600 | 1.603001 | 65.44 |
| 5 | 263.14480 | (d5) | | |
| 6* | 107.66330 | 0.15000 | 1.553890 | 38.09 |
| 7 | 79.43570 | 1.20000 | 1.816000 | 46.62 |
| 8 | 12.54980 | 5.89610 | | |
| 9 | −28.13610 | 1.00000 | 1.816000 | 46.62 |
| 10 | 76.81030 | 0.10000 | | |
| 11 | 29.03300 | 5.08050 | 1.846660 | 23.78 |
| 12 | −28.29410 | 0.70210 | | |

TABLE 2-continued (Specifications)
zoom ratio = 15.666

| | | | | |
|---|---|---|---|---|
| 13 | −20.32340 | 1.00000 | 1.788001 | 47.37 |
| 14 | 328.32220 | (d14) | | |
| 15 | ∞ | 0.50000 | Aperture Stop S | |
| 16 | 38.51440 | 4.38040 | 1.527510 | 66.72 |
| 17 | −31.08680 | 0.10000 | | |
| 18 | 24.82780 | 5.70920 | 1.497000 | 81.64 |
| 19 | −22.48490 | 1.00000 | 1.850260 | 32.35 |
| 20 | −1199.41670 | 3.00000 | | |
| 21* | −52.55750 | 0.10000 | 1.553890 | 38.09 |
| 22 | −56.77690 | 1.00000 | 1.772499 | 49.60 |
| 23 | 32.93540 | 1.94820 | 1.805181 | 25.42 |
| 24 | 83.42590 | (d24) | | |
| 25* | 38.17010 | 5.15170 | 1.677900 | 54.89 |
| 26 | −30.30750 | 0.10000 | | |
| 27 | 119.12160 | 5.79370 | 1.511790 | 49.72 |
| 28 | −16.92620 | 1.00000 | 1.878780 | 41.73 |
| 29 | 40.26250 | 0.79940 | | |
| 30 | 88.76870 | 4.01880 | 1.497970 | 53.26 |
| 31 | −31.87250 | (Bf) | | |
| I | ∞ | | | |

(Aspherical Surface Data)

Surface Number = 6

κ = 1.0000  A4 = 8.23600E−06
A6 = 2.68070E−08  A8 = −2.85680E−10
A10 = 8.96110E−13

Surface Number = 21

κ = 1.0000  A4 = 8.39680E−06
A6 = 4.90050E−09  A8 = 0.00000E+00
A10 = 0.00000E+00

Surface Number = 25

κ = 1.0000  A4 = −1.05940E−05
A6 = 2.60370E−08  A8 = 0.00000E+00
A10 = 0.00000E+00

(Variable Distances)

| | W | M | T |
|---|---|---|---|
| d5 = | 2.12080 | 50.67230 | 62.67010 |
| d14 = | 23.69130 | 7.80730 | 1.80000 |
| d24 = | 10.01650 | 3.11010 | 2.90000 |
| Bf = | 38.02328 | 85.33826 | 92.60805 |

(Lens Group Data)

| Group | ST | Focal Length |
|---|---|---|
| 1 | 1 | 95.68946 |
| 2 | 6 | −11.46195 |
| 3 | 15 | 31.13029 (W) |
| | | 27.66506 (M) |
| | | 27.57169 (T) |
| 31 | 15 | 42.77504 |
| 32 | 25 | 40.12768 |

(Values for Conditional Expressions)

(1) vdA = 90.27 (L12)
(2) f1/fw = 5.151
(3) f1/ft = 0.329
(4) A1/f1 = 0.900
(5) f1A/f1 = 1.258 (L12)
(6) φ1A/fw = 2.998 (φ1A = 55.69)(L12)
(7) ndB = 1.603001 (L13)
(8) vdB = 65.44 (L13)
(9) f1B/f1 = 1.234 (L13)
(10) φ1B/fw = 2.799 (φ1B = 52.00)(L13)
(11) ndN = 1.903658 (L11)
(12) vdN = 31.31 (L11)
(13) nd3 = 1.497000 (L32)
vd3 = 81.64 (L32)

Figure 5A:
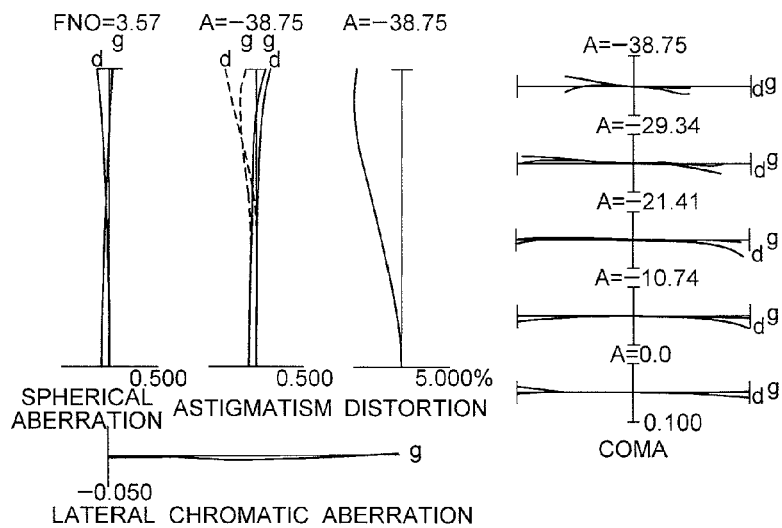
Figure 5B:
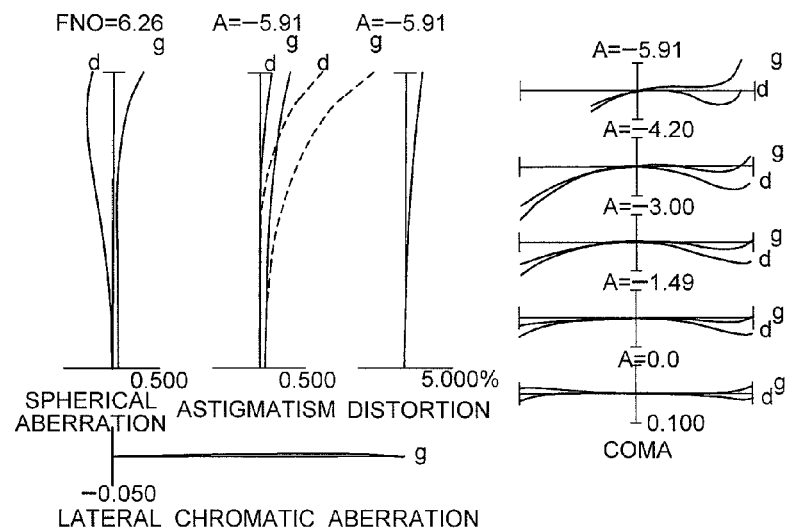
Figure 5C:
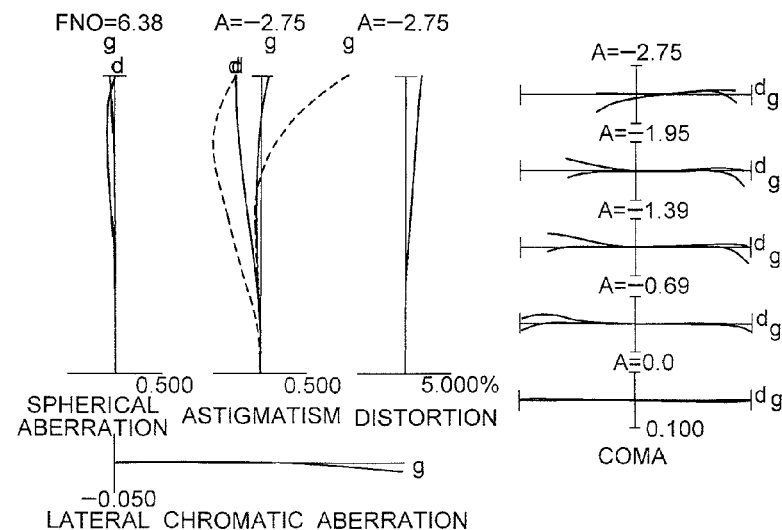

FIGS. 5A, 5B and 5C are graphs showing various aberrations of the zoom lens according to Example 2 of the first embodiment upon focusing on an infinitely distant object, in which FIG. 5A is a wide-angle end state, FIG. 5B is an intermediate focal length state, and FIG. 5C is a telephoto end state.

As is apparent from various graphs, the zoom lens according to Example 2 of the first embodiment shows superb optical performance as a result of good corrections to various aberrations.

Example 3

Figure 6:
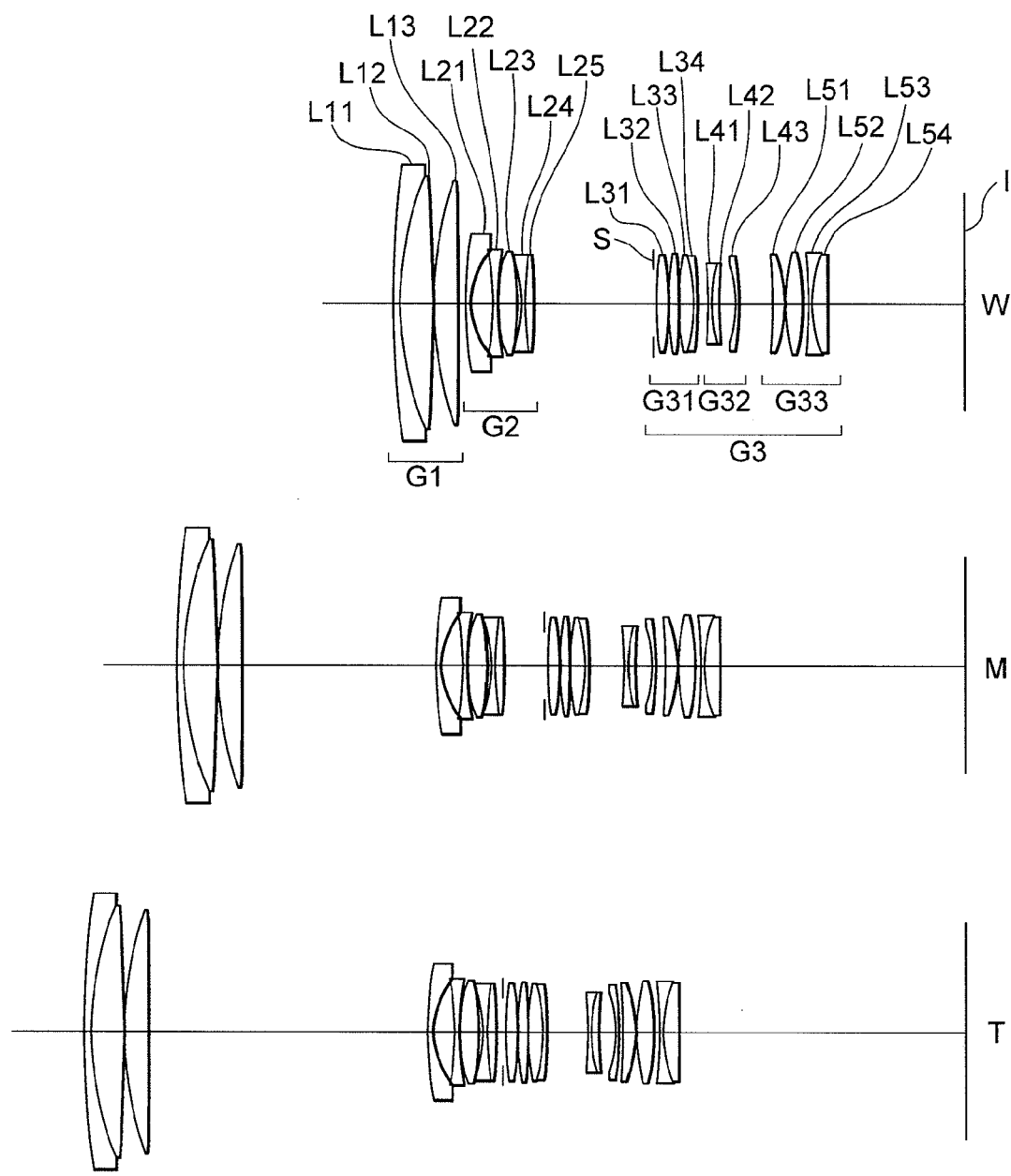
FIG. 6 is a sectional view showing a lens configuration of a zoom lens according to Example 3 of the first embodiment, and Example 8 of the second embodiment of the present application.

FIG. 6 is a sectional view showing a lens configuration of a zoom lens according to Example 3 of a first embodiment of the present application.

As shown in FIG. 6, the zoom lens according to Example 3 of the first embodiment is composed of, in order from an object side along an optical axis, a first lens group G1 having positive refractive power, a second lens group G2 having negative refractive power, and a third lens group G3 having positive refractive power. The third lens group G3 is composed of, in order from the object side along the optical axis, a front lens group G31 having positive refractive power, a middle lens group G32 having negative refractive power, and a rear lens group G33 having positive refractive power.

Upon zooming from a wide-angle end state W to a telephoto end state T, the first lens group G1 is moved monotonously to the object side, the second lens group G2 is moved at first to the image side and then to the object side, and the third lens group G3 is moved monotonously to the object side with respect to the image plane I such that a distance between the first lens group G1 and the second lens group G2 increases, and a distance between the second lens group G2 and the third lens group G3 decreases. Moreover, the front lens group G31, the middle lens group G32 and the rear lens group G33 are moved monotonously to the object side with respect to the image plane I such that a distance between the front lens group G31 and the middle lens group G32 increases, and a distance between the middle lens group G32 and the rear lens group G33 decreases.

An aperture stop S is disposed to the most object side of the third lens group G3, which is disposed to the image side of the second lens group G2, and formed in a body with the front lens group G31.

The first lens group G1 is composed of, in order from the object side along the optical axis, a cemented lens constructed by a negative meniscus lens L11 having a convex surface facing the object side cemented with a double convex positive lens L12, and a double convex positive lens L13.

The second lens group G2 is composed of, in order from the object side along the optical axis, a negative meniscus lens L21 having a convex surface facing the object side, a double concave negative lens L22, a double convex positive lens L23, and a cemented lens constructed by a double concave negative lens L24 cemented with a double convex positive lens L25. The negative meniscus lens L21 disposed to the most object side of the second lens group G2 is a compound type aspherical lens whose object side lens surface is formed as an aspherical surface by applying a resin layer.

The front lens group G31 is composed of, in order from the object side along the optical axis, a double convex positive lens L31, a double convex positive lens L32, and a cemented lens constructed by a double convex positive lens L33 cemented with a negative meniscus lens L34 having a concave surface facing the object side.

The middle lens group G32 is composed of, in order from the object side along the optical axis, a cemented lens constructed by a double concave negative lens L41 cemented with a positive meniscus lens L42 having a convex surface facing the object side, and a negative meniscus lens L43 having a concave surface facing the object side. The double concave negative lens L41 disposed to the most object side of the middle lens group G32 is a glass mold type aspherical lens whose object side lens surface is an aspherical surface.

The rear lens group G33 is composed of, in order from the object side along the optical axis, a positive meniscus lens L51 having a concave surface facing the object side, a double convex positive lens L52, and a cemented lens constructed by a double concave negative lens L53 cemented with a double convex positive lens L54. The positive meniscus lens L51 disposed to the most object side of the rear lens group G33 is a glass mold type aspherical lens whose object side lens surface is an aspherical surface. Light rays come out from the double convex positive lens L54 form an image on the image plane I.

In the zoom lens seen from another point of view according to Example 3 of the first embodiment, an antireflection coating described later is applied to the image side lens surface of the double convex positive lens L12 in the first lens group G1 and the object side lens surface of the double concave negative lens L24 in the second lens group G2.

Various values associated with the zoom lens according to Example 3 of the first embodiment are listed in Table 3.

TABLE 3

(Specifications)
zoom ratio = 15.714

| | W | M | T |
|---|---|---|---|
| f = | 18.55566 | 103.95947 | 291.57591 |
| FNO = | 3.63338 | 5.62730 | 5.88308 |
| ω = | 38.94112 | 7.46798 | 2.71133 |
| Y = | 14.20 | 14.20 | 14.20 |
| TL = | 163.38092 | 225.17861 | 252.25324 |
| Bf = | 39.17162 | 70.49651 | 82.47674 |

(Lens Data)

| i | r | d | nd | vd |
|---|---|---|---|---|
| OP | ∞ | ∞ | | |
| 1 | 193.38060 | 2.00000 | 1.883000 | 40.77 |
| 2 | 66.83560 | 9.23080 | 1.437000 | 95.00 |
| 3 | −341.14920 | 0.10000 | | |
| 4 | 68.78950 | 6.98760 | 1.603000 | 65.47 |
| 5 | −2649.89320 | (d5) | | |
| 6* | 84.76870 | 0.15000 | 1.553890 | 38.09 |
| 7 | 73.93750 | 1.20000 | 1.834810 | 42.72 |
| 8 | 16.94820 | 6.42970 | | |
| 9 | −53.17850 | 1.00000 | 1.816000 | 46.63 |
| 10 | 46.70940 | 0.15000 | | |
| 11 | 30.63920 | 5.37880 | 1.761820 | 26.56 |
| 12 | −48.96880 | 1.39690 | | |
| 13 | −24.42250 | 1.00000 | 1.816000 | 46.63 |
| 14 | 69.10450 | 2.52380 | 1.808090 | 22.79 |
| 15 | −121.94360 | (d15) | | |
| 16 | ∞ | 1.00000 | Aperture Stop S | |
| 17 | 66.08180 | 3.43590 | 1.592820 | 68.69 |
| 18 | −50.37120 | 0.10000 | | |
| 19 | 59.42650 | 2.78060 | 1.487490 | 70.45 |
| 20 | −108.47870 | 0.10000 | | |
| 21 | 49.67940 | 4.11660 | 1.487490 | 70.45 |
| 22 | −33.83640 | 1.00000 | 1.808090 | 22.79 |
| 23 | −167.67900 | (d23) | | |
| 24* | −64.89240 | 1.00000 | 1.693500 | 53.22 |
| 25 | 27.12400 | 2.14440 | 1.761820 | 26.56 |
| 26 | 65.84410 | 4.73170 | | |
| 27 | −25.14850 | 1.00000 | 1.729160 | 54.66 |
| 28 | −73.72860 | (d28) | | |
| 29* | −448.31420 | 3.90050 | 1.589130 | 61.18 |
| 30 | −23.64180 | 0.10000 | | |
| 31 | 37.43750 | 4.98090 | 1.487490 | 70.45 |
| 32 | −44.96410 | 1.73250 | | |
| 33 | −102.62990 | 1.00000 | 1.883000 | 40.77 |
| 34 | 23.17730 | 4.51170 | 1.548140 | 45.79 |
| 35 | −619.02620 | (Bf) | | |
| I | ∞ | | | |

(Aspherical Surface Data)

Surface Number = 6

κ = 1.0000   A4 = 4.16398E−06
A6 = −7.55222E−09   A8 = −2.91689E−12
A10 = 5.62106E−14

Surface Number = 24

κ = 1.0000   A4 = 3.83569E−06
A6 = −1.03578E−09   A8 = 0.00000E+00
A10 = 0.00000E+00

Surface Number = 29

κ = 1.0000   A4 = −1.60868E−05
A6 = 8.16360E−09   A8 = −3.55020E−11
A10 = 7.60058E−14

(Variable Distances)

| | W | M | T |
|---|---|---|---|
| d5 = | 2.12700 | 55.32280 | 79.77200 |
| d15 = | 34.07780 | 11.35470 | 2.00000 |
| d23 = | 3.36200 | 10.67670 | 11.82210 |
| d28 = | 9.46010 | 2.14550 | 1.00000 |
| Bf = | 39.17162 | 70.49651 | 82.47674 |

(Lens Group Data)

| Group | ST | Focal Length |
|---|---|---|
| 1 | 1 | 120.77885 |
| 2 | 6 | −15.59572 |
| 3 | 16 | 39.12629 (W) |
| | | 32.72813 (M) |
| | | 31.47773 (T) |
| 31 | 16 | 26.38558 |
| 32 | 24 | −24.49396 |
| 33 | 29 | 34.76717 |

(Values for Conditional Expressions)

(1) vdA = 95.00 (L12)
(2) f1/fw = 6.509
(3) f1/ft = 0.414
(4) Δ1/f1 = 0.736
(5) f1A/f1 = 1.066 (L12)
(6) φ1A/fw = 3.043 (φ1A = 56.47)(L12)
(7) ndB = 1.603000 (L13)
(8) vdB = 65.47 (L13)
(9) f1B/f1 = 0.922 (L13)
(10) φ1B/fw = 2.910 (φ1B = 54.00)(L13)
(11) ndN = 1.883000 (L11)
(12) vdN = 40.77 (L11)
(13) nd3 = 1.592820 (L31)
    vd3 = 68.69 (L31)

Figure 7A:
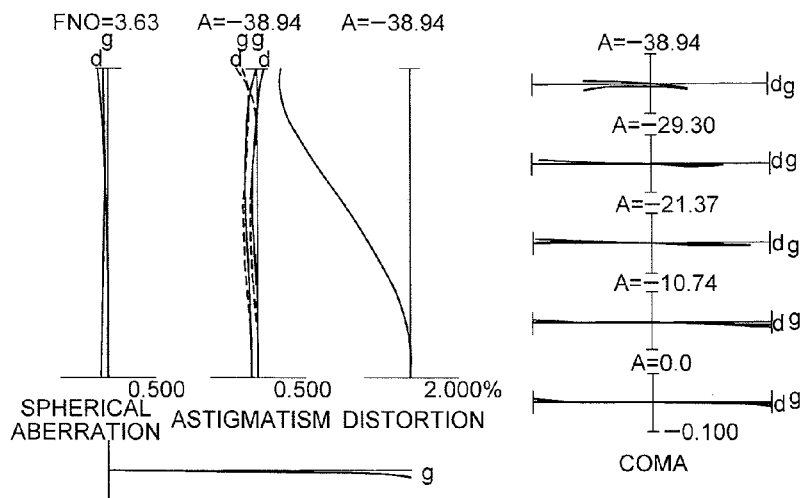
Figure 7B:
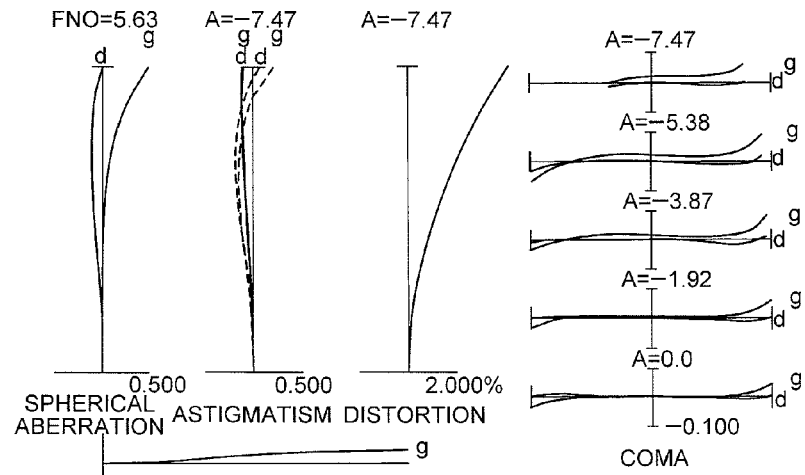
Figure 7C:
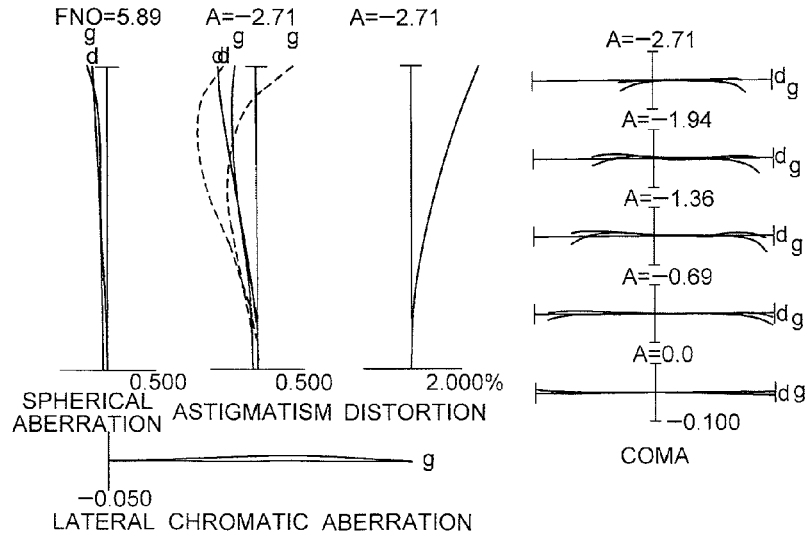

FIGS. 7A, 7B and 7C are graphs showing various aberrations of the zoom lens according to Example 3 of the first embodiment upon focusing on an infinitely distant object, in which FIG. 7A is a wide-angle end state, FIG. 7B is an intermediate focal length state, and FIG. 7C is a telephoto end state.

As is apparent from various graphs, the zoom lens according to Example 3 of the first embodiment shows superb optical performance as a result of good corrections to various aberrations.

Then, an outline of a method for manufacturing a zoom lens according to the first embodiment is explained.

Figure 24:
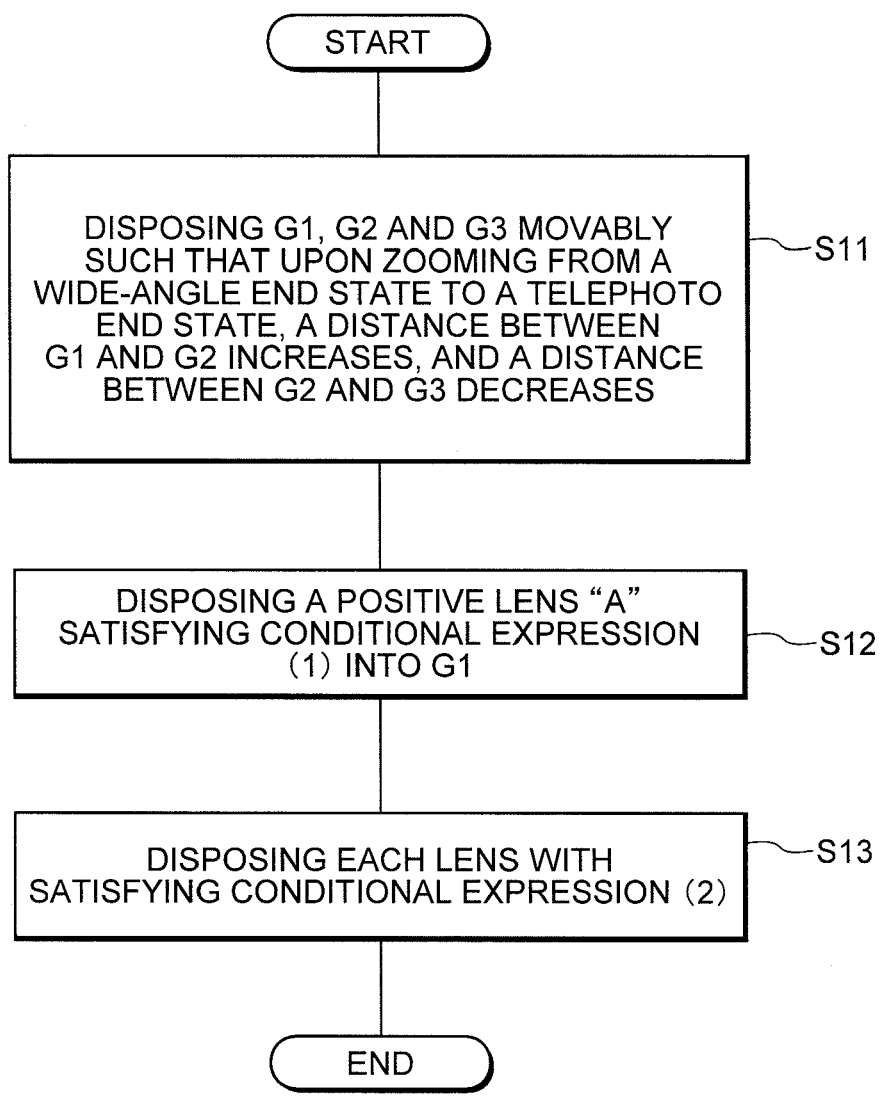
FIG. 24 is a flowchart schematically explaining a method for manufacturing the zoom lens according to the first embodiment.

FIG. 24 is a flowchart schematically explaining a method for manufacturing the zoom lens according to the first embodiment.

The method for manufacturing a zoom lens according to the first embodiment is a method for manufacturing a zoom lens including, in order from an object side along an optical axis, a first lens group having positive refractive power, a second lens group having negative refractive power, and a third lens group having positive refractive power, and being constructed such that at least one optical surface in the first lens group and the second lens group is applied with an antireflection coating, and the antireflection coating includes at least one layer that is formed by a wet process, the method including steps S11 through S13.

Step S11: disposing the first lens group, the second lens group and the third lens group movably such that upon zooming from a wide-angle end state to a telephoto end state, a distance between the first lens group and the second lens group increases, and a distance between the second lens group and the third lens group decreases.

Step S12: disposing a positive lens A satisfying the following conditional expression (1) into the first lens group:

$$85.0 < vdA \qquad (1)$$

where vdA denotes an Abbe number at d-line (wavelength λ=587.6 nm) of the positive lens A in the first lens group.

Step S13: disposing each lens with satisfying conditional expression (2):

$$3.90 < f1/fw < 11.00 \qquad (2)$$

where fw denotes a focal length of the zoom lens in the wide-angle end state, and f1 denotes a focal length of the first lens group.

With this method for manufacturing a zoom lens according to the first embodiment, it becomes possible to manufacture a zoom lens having excellent optical performance with suppressing variations in aberrations and ghost images and flare.

Second Embodiment

A zoom lens according to a second embodiment of the present application is explained below.

A zoom lens according to the second embodiment of the present application includes, in order from an object side along an optical axis, a first lens group having positive refractive power, a second lens group having negative refractive power, and a third lens group having positive refractive power. Upon zooming from a wide-angle end state to a telephoto end state, a distance between the first lens group and the second lens group increases, and a distance between the second lens group and the third lens group decreases. With this configuration, it becomes possible to realize a zoom lens, and, at the same time, suppress variation in distortion generated upon zooming.

A zoom lens according to the second embodiment includes a positive lens A' that satisfies the following conditional expressions (14) and (15), and satisfies the following conditional expression (2):

$$1.540 < ndA' \qquad (14)$$

$$66.5 < vdA' \qquad (15)$$

$$3.90 < f1/fw < 11.00 \qquad (2)$$

where ndA' denotes a refractive index at d-line (wavelength λ=587.6 nm) of a material of the positive lens A', vdA' denotes an Abbe number at d-line (wavelength λ=587.6 nm) of a material of the positive lens A', fw denotes a focal length of the zoom lens in the wide-angle end state, and f1 denotes a focal length of the first lens group.

Conditional expression (14) defines an optimum refractive index of the material of the positive lens A', and is for realizing high optical performance with suppressing variations in spherical aberration and curvature of field generated upon zooming from the wide-angle end state to the telephoto end state.

When the value ndA' is equal to or falls below the lower limit of conditional expression (14), it becomes difficult to suppress variations in spherical aberration and curvature of field, so that high optical performance cannot be realized.

In order to secure the effect of the second embodiment, it is preferable to set the lower limit of conditional expression (14) to 1.550.

Conditional expression (15) defines an optimum Abbe number of the material of the positive lens A', and is for realizing high optical performance with suppressing variation in chromatic aberration generated upon zooming from the wide-angle end state to the telephoto end state.

When the value vdA' is equal to or falls below the lower limit of conditional expression (15), it becomes difficult to suppress variations in longitudinal chromatic aberration and lateral chromatic aberration. The material becomes a one having small anomalous dispersion, so that variation in secondary order of chromatic aberration becomes difficult to be suppressed. In addition, longitudinal chromatic aberration and lateral chromatic aberration in visible light range become large in the telephoto end state, so that high optical performance cannot be obtained.

In order to secure the effect of the second embodiment, it is preferable to set the lower limit of conditional expression (15) to 67.5.

Conditional expression (2) defines an appropriate range of the focal length of the first lens group, and is for realizing high optical performance with suppressing variations in chromatic aberration and off-axis aberrations generated upon zooming from the wide-angle end state to the telephoto end state. However, conditional expression (2) has already been explained above, so that duplicated explanations are omitted.

In a zoom lens according to the second embodiment, the following conditional expression (3) is preferably satisfied:

$$0.28 < f1/ft < 0.52 \qquad (3)$$

where ft denotes a focal length of the zoom lens in the telephoto end state.

Conditional expression (3) defines an appropriate range of an optimum focal length of the first lens group, and is for realizing high optical performance with suppressing variations in chromatic aberration and off-axis aberrations generated upon zooming from the wide-angle end state to the telephoto end state. However, conditional expression (3) has already been explained above, so that duplicated explanations are omitted.

In a zoom lens according to the second embodiment, the following conditional expression (4) is preferably satisfied:

$$0.25 < \Delta 1/f1 < 1.10 \quad (4)$$

where Δ1 denotes a moving amount of the first lens group with respect to the image plane upon zooming from the wide-angle end state to the telephoto end state.

Conditional expression (4) defines an optimum moving amount of the first lens group with respect to the image plane upon zooming from the wide-angle end state to the telephoto end state. However, conditional expression (4) has already been explained above, so that duplicated explanations are omitted.

In a zoom lens according to the second embodiment, the third lens group preferably includes a positive lens A'.

With this configuration, it becomes possible to suppress variations in longitudinal chromatic aberration and spherical aberration generated upon zooming from the wide-angle end state to the telephoto end state, so that high optical performance can be realized.

In a zoom lens according to the second embodiment, the following conditional expression (16) is preferably satisfied:

$$0.75 < f3A'/f3 < 2.25 \quad (16)$$

where f3 denotes a focal length of the third lens group, and f3A' denoted a focal length of the positive lens A' in the third lens group.

Conditional expression (16) defines an optimum focal length of the positive lens A' in the third lens group, and is for realizing high optical performance with suppressing variations in chromatic aberration and on-axis aberrations generated upon zooming.

When the ratio f3A'/f3 is equal to or falls below the lower limit of conditional expression (16), refractive power of the positive lens A' becomes strong, so that upon zooming from the wide-angle end state to the telephoto end state, variation in refractive power in accordance with variation in the height from the optical axis of the on axis ray passing through the positive lens A' becomes large. As a result, it becomes difficult to suppress variations in longitudinal chromatic aberration and spherical aberration, so that high optical performance cannot be realized.

On the other hand, when the ratio f3A'/f3 is equal to or exceeds the upper limit of conditional expression (16), refractive power of the positive lens A' becomes small, so that refractive power of the positive lens other than the positive lens A' in the third lens group becomes strong. As a result, upon zooming from the wide-angle end state to the telephoto end state, variation in refractive power in accordance with variation in the height from the optical axis of the off-axis ray passing through the positive lens A' becomes large, so that it becomes difficult to suppress variations in longitudinal chromatic aberration and spherical aberration. Accordingly, high optical performance cannot be realized.

In order to secure the effect of the second embodiment, it is preferable to set the lower limit of conditional expression (16) to 0.90.

In order to secure the effect of the second embodiment, it is preferable to set the upper limit of conditional expression (16) to 1.95.

In a zoom lens according to the second embodiment, the first lens group preferably includes the positive lens A'.

With this configuration, it becomes possible to suppress variations in longitudinal chromatic aberration generated upon zooming from the wide-angle end state to the telephoto end state, so that high optical performance can be realized.

In a zoom lens according to the second embodiment, the following conditional expression (17) is preferably satisfied:

$$0.65 < f1A'/f1 < 1.75 \quad (17)$$

where f1A' denotes a focal length of the positive lens A' in the first lens group.

Conditional expression (17) defines an optimum focal length of the positive lens A' in the first lens group, and is for realizing high optical performance with suppressing variations in chromatic aberration and off-axis aberrations generated upon zooming.

When the ratio f1A'/f1 is equal to or falls below the lower limit of conditional expression (17), refractive power of the positive lens A' becomes strong, variation in refractive power in accordance with variation in the height from the optical axis of the off-axis ray upon zooming from the wide-angle end state to the telephoto end state becomes large. As a result, it becomes difficult to suppress variations in lateral chromatic aberration and off-axis aberrations, in particular, astigmatism, so that high optical performance cannot be realized.

On the other hand, when the ratio f1A'/f1 is equal to or exceeds the upper limit of conditional expression (17), refractive power of the positive lens A' becomes weak, so that refractive power of the positive lens other the positive lens A' in the first lens group becomes strong. As a result, upon zooming from the wide-angle end state to the telephoto end state, variation in refractive power in accordance with variation in the height from the optical axis of the off-axis ray passing through the positive lens A' becomes large, so that it becomes difficult to suppress variations in lateral chromatic aberration and off-axis aberrations, in particular, astigmatism. Accordingly, high optical performance cannot be realized.

In order to secure the effect of the second embodiment, it is preferable to set the lower limit of conditional expression (17) to 0.80.

In order to secure the effect of the second embodiment, it is preferable to set the upper limit of conditional expression (17) to 1.35.

In a zoom lens according to the second embodiment, the following conditional expression (18) is preferably satisfied:

$$1.75 < \phi 1A'/fw < 4.50 \quad (18)$$

where φ1A' denotes an effective diameter of the positive lens A' in the first lens group.

Conditional expression (18) defines an optimum effective diameter of the positive lens A' in the first lens group, and is for realizing high optical performance with suppressing variations in chromatic aberration and off-axis aberrations generated upon zooming.

When the ratio φ1A'/fw is equal to or falls below the lower limit of conditional expression (18), upon zooming from the wide-angle end state to the telephoto end state, variation in the height from the optical axis of the off-axis ray passing through the positive lens A' in the first lens group becomes small, so that it becomes difficult to suppress variations in off-axis aberrations, in particular, astigmatism. As a result, high optical performance cannot be realized.

On the other hand, when the ratio φ1A'/fw is equal to or exceeds the upper limit of conditional expression (18), upon zooming from the wide-angle end state to the telephoto end state, variation in the height from the optical axis of the off-axis ray passing through the positive lens A' in the first lens group becomes large, so that it becomes difficult to suppress variations in lateral chromatic aberration and off-axis aberrations, in particular, astigmatism. As a result, high optical performance cannot be realized.

In order to secure the effect of the second embodiment, it is preferable to set the lower limit of conditional expression (18) to 2.45.

In order to secure the effect of the second embodiment, it is preferable to set the upper limit of conditional expression (18) to 3.80.

In a zoom lens according to the second embodiment, the following conditional expression (19) is preferably satisfied:

$$0.055 < \phi 1A'/ft < 0.420 \tag{19}$$

where ft denotes a focal length of the zoom lens in the telephoto end state, and $\phi 1A'$ denotes an effective diameter of the positive lens A' in the first lens group.

Conditional expression (19) defines an optimum effective diameter of the positive lens A' in the first lens group, and is for realizing high optical performance with suppressing variations in chromatic aberration and off-axis aberrations generated upon zooming.

When the ratio $\phi 1A'/ft$ is equal to or falls below the lower limit of conditional expression (19), upon zooming from the wide-angle end state to the telephoto end state, variation in the height from the optical axis of the off-axis ray passing through the positive lens A' in the first lens group becomes small, so that it becomes difficult to suppress variations in off-axis aberrations, in particular, astigmatism. As a result, high optical performance cannot be realized.

On the other hand, when the ratio $\phi 1A'/ft$ is equal to or exceeds the upper limit of conditional expression (19), upon zooming from the wide-angle end state to the telephoto end state, variation in the height from the optical axis of the off-axis ray passing through the positive lens A' in the first lens group becomes large, so that it becomes difficult to suppress variations in lateral chromatic aberration and off-axis aberrations, in particular, astigmatism. As a result, high optical performance cannot be realized.

In order to secure the effect of the second embodiment, it is preferable to set the lower limit of conditional expression (19) to 0.080.

In order to secure the effect of the second embodiment, it is preferable to set the upper limit of conditional expression (19) to 0.350.

In a zoom lens according to the second embodiment, the first lens group preferably includes two positive lenses.

With this configuration, the thickness of the first lens group can be suppressed, so that upon zooming from the wide-angle end state to the telephoto end state, variation in the height from the optical axis of the off-axis ray passing through the most object side lens surface of the first lens group can be suppressed. As a result, variations in off-axis aberrations, in particular, astigmatism can be suppressed, so that high optical performance can be realized.

In a zoom lens according to the second embodiment, the following conditional expressions (11) and (12) are preferably satisfied:

$$1.750 < ndN \tag{11}$$

$$28.0 < vdN < 50.0 \tag{12}$$

where ndN denotes a refractive index at d-line (wavelength $\lambda=587.6$ nm) of a material of a negative lens in the first lens group, and vdN denotes an Abbe number at d-line (wavelength $\lambda=587.6$ nm) of the material of the negative lens in the first lens group.

Conditional expression (11) defines an optimum range of the refractive index in the negative lens in the first lens group, and is for realizing high optical performance with suppressing variations in off-axis aberrations generated upon zooming from the wide-angle end state to the telephoto end state. However, conditional expression (11) has already been explained above, so that duplicated explanations are omitted.

Conditional expression (12) defines an optimum Abbe number of the material of the negative lens in the first lens group, and is for realizing high optical performance with suppressing variation in chromatic aberration generated upon zooming from the wide-angle end state to the telephoto end state. However, conditional expression (12) has already been explained above, so that duplicated explanations are omitted.

In a zoom lens according to the second embodiment, the first lens group preferably has only one negative lens.

With this configuration, the thickness of the first lens group can be suppressed, so that upon zooming from the wide-angle end state to the telephoto end state, variation in the height from the optical axis of the off-axis ray passing through the most object side lens surface of the first lens group can be suppressed. As a result, variations in off-axis aberrations, in particular, astigmatism can be suppressed, so that high optical performance can be realized.

In a zoom lens according to the second embodiment, the following conditional expression (20) is preferably satisfied:

$$75.0 < vdB' \tag{20}$$

where vdB' denotes an Abbe number at d-line (wavelength $\lambda=587.6$ nm) of a material of the positive lens B' in the first lens group.

Conditional expression (20) defines an optimum Abbe number of the material of the positive lens B', and is for realizing high optical performance with suppressing variation in chromatic aberration generated upon zooming from the wide-angle end state to the telephoto end state.

When the value vdB' is equal to or falls below the lower limit of conditional expression (20), it becomes difficult to suppress variations in longitudinal chromatic aberration and lateral chromatic aberration. The material becomes a one having small anomalous dispersion, so that variation in secondary order of chromatic aberration becomes difficult to be suppressed. In addition, longitudinal chromatic aberration and lateral chromatic aberration in visible light range become large in the telephoto end state, so that high optical performance cannot be obtained.

In a zoom lens according to the second embodiment, it is preferable that the third lens group includes, in order from the object side, a front lens group having positive refractive power and a rear lens group having positive refractive power, and a distance between the front lens group and the rear lens group decreases upon zooming from the wide-angle end state to the telephoto end state.

With this configuration, zooming efficiency of the third lens group can be enhanced better than a configuration that the third lens group is moved in a body upon zooming. Moreover, high optical performance can be realized with suppressing variations in spherical aberration, coma and astigmatism.

In a zoom lens according to the second embodiment, it is preferable that the third lens group includes, in order from the object side, a front lens group having positive refractive power, a middle lens group having negative refractive power, and a rear lens group having positive refractive power, and a distance between the front lens group and the middle lens group varies, and a distance between the middle lens group and the rear lens group varies upon zooming from the wide-angle end state to the telephoto end state.

With this configuration, variations in aberrations generated in the third lens group can be suppressed better than a configuration that the third lens group is moved in a body upon zooming, so that high optical performance can be realized with suppressing in particular spherical aberration, coma and astigmatism.

In a zoom lens according to the second embodiment, it is preferable that a distance between the front lens group and the middle lens group increases, and a distance between the middle lens group and the rear lens group decreases.

With this configuration, zooming efficiency of the third lens group can be enhanced, so that high optical performance can be realized with suppressing variations in spherical aberration, coma and astigmatism.

In a zoom lens according to the second embodiment, the front lens group preferably includes a positive lens A'.

With this configuration, it becomes possible to suppress variations in longitudinal chromatic aberration and spherical aberration generated upon zooming from the wide-angle end state to the telephoto end state, so that high optical performance can be realized.

In a zoom lens according to the second embodiment, the following conditional expression (21) is preferably satisfied:

$$0.55 < f31A'/f31 < 2.45 \quad (21)$$

where f31 denotes a focal length of the front lens group, and f31A' denotes a focal length of the positive lens A' in the front lens group.

Conditional expression (21) defines an optimum focal length of the positive lens A' in the front lens group, and is for realizing high optical performance with suppressing variations in chromatic aberration and on-axis aberrations generated upon zooming.

When the ratio f31A'/f31 is equal to or falls below the lower limit of conditional expression (21), refractive power of the positive lens A' becomes strong, so that upon zooming from the wide-angle end state to the telephoto end state, variation in refractive power in accordance with variation in the height of the on-axis ray passing through the positive lens A' becomes large. As a result, it becomes difficult to suppress variations in longitudinal chromatic aberration and spherical aberration, so that high optical performance cannot be obtained.

On the other hand, when the ratio f31A'/f31 is equal to or exceeds the upper limit of conditional expression (21), refractive power of the positive lens A' becomes weak, positive refractive power other than the positive lens A' in the front lens group becomes strong, so that upon zooming from the wide-angle end state to the telephoto end state, variation in refractive power in accordance with variation in the height of the off-axis ray passing through the positive lens A' becomes large. As a result, it becomes difficult to suppress variations in longitudinal chromatic aberration and spherical aberration, so that high optical performance cannot be obtained.

In order to secure the effect of the second embodiment, it is preferable to set the lower limit of conditional expression (21) to 0.73.

In order to secure the effect of the second embodiment, it is preferable to set the upper limit of conditional expression (21) to 1.95.

Then, a zoom lens seen from another point of view according to the second embodiment of the present application includes, in order from an object side along an optical axis, a first lens group having positive refractive power, a second lens group having negative refractive power, and a third lens group having positive refractive power. Upon zooming from a wide-angle end state to a telephoto end state, a distance between the first lens group and the second lens group increases, and a distance between the second lens group and the third lens group decreases. With this configuration, it becomes possible to realize a zoom lens, and, at the same time, suppress variation in distortion generated upon zooming.

A zoom lens seen from another point of view according to the second embodiment includes a positive lens A' that satisfies the following conditional expressions (14) and (15), and satisfies the following conditional expression (2):

$$1.540 < ndA' \quad (14)$$

$$66.5 < vdA' \quad (15)$$

$$3.90 < f1/fw < 11.00 \quad (2)$$

where ndA' denotes a refractive index at d-line (wavelength λ=587.6 nm) of a material of the positive lens A', vdA' denotes an Abbe number at d-line (wavelength λ=587.6 nm) of a material of the positive lens A', fw denotes a focal length of the zoom lens in the wide-angle end state, and f1 denotes a focal length of the first lens group.

Conditional expression (14) defines an optimum refractive index of the material of the positive lens A', and is for realizing high optical performance with suppressing variations in spherical aberration and curvature of field generated upon zooming from the wide-angle end state to the telephoto end state. However, conditional expression (14) has already been explained, so that duplicated explanations are omitted.

Conditional expression (15) defines an optimum Abbe number of the material of the positive lens A', and is for realizing high optical performance with suppressing variation in chromatic aberration generated upon zooming from the wide-angle end state to the telephoto end state. However, conditional expression (15) has already been explained, so that duplicated explanations are omitted.

Conditional expression (2) defines an appropriate range of the focal length of the first lens group, and is for realizing high optical performance with suppressing variations in chromatic aberration and off-axis aberrations generated upon zooming from the wide-angle end state to the telephoto end state. However, conditional expression (2) has already been explained above, so that duplicated explanations are omitted.

In a zoom lens seen from another point of view according to the second embodiment of the present application, at least one optical surface among the first lens group and the second lens group is applied with an antireflection coating, and the antireflection coating includes at least one layer that is formed by a wet process. With this configuration, a zoom lens seen from another point of view according to the second embodiment of the present application makes it possible to suppress ghost images and flare generated by the light rays from the object reflected from the optical surfaces, thereby realizing excellent optical performance.

Moreover, in a zoom lens seen from another point of view according to the second embodiment of the present application, the antireflection coating is a multilayer film, and the layer formed by the wet process is preferably the outermost layer among the layers composing the multilayer film. With this configuration, since difference in refractive index with respect to the air can be small, reflection of light can be small, so that ghost images and flare can further be suppressed.

In a zoom lens seen from another point of view according to the second embodiment of the present application, when a refractive index at d-line of the layer formed by the wet process is denoted by nd, the refractive index nd is preferably 1.30 or less. With this configuration, since difference in refractive index with respect to the air can be small, reflection of light can be small, so that ghost images and flare can further be suppressed.

Moreover, in a zoom lens seen from another point of view according to the second embodiment of the present application, the optical surface on which the antireflection coating is formed is preferably a concave surface seen from an aperture stop. Since reflection light rays are liable to be generated on a concave surface seen from the aperture stop among optical surfaces in the first lens group and the second lens group, with applying the antireflection coating on such an optical surface, ghost images and flare can effectively be suppressed.

In a zoom lens seen from another point of view according to the second embodiment, it is desirable that, the concave surface on which the antireflection coating is applied as seen from the aperture stop is an image side lens surface. Since the image side concave surface as seen from the aperture stop among optical surfaces in the first lens group and the second lens group tends to generate reflection light, with applying the antireflection coating on such an optical surface, ghost images and flare can effectively be suppressed.

In a zoom lens seen from another point of view according to the second embodiment, it is desirable that, the concave surface on which the antireflection coating is applied as seen from the aperture stop is an object side lens surface. Since the object side concave surface as seen from the aperture stop among optical surfaces in the first lens group and the second lens group tends to generate reflection light, with applying the antireflection coating on such an optical surface, ghost images and flare can effectively be suppressed.

Moreover, in a zoom lens seen from another point of view according to the second embodiment of the present application, the optical surface on which the antireflection coating is formed is preferably a concave surface seen from an object side. Since reflection light rays are liable to be generated on a concave surface seen from the object among optical surfaces in the first lens group and the second lens group, with applying the antireflection coating on such an optical surface, ghost images and flare can effectively be suppressed.

Moreover, in a zoom lens seen from another point of view according to the second embodiment of the present application, the concave optical surface seen from the object on which the antireflection coating is formed is preferably an image side lens surface of the image side second lens from the most object side lens in the first lens group. Since reflection light rays are liable to be generated on the image side lens surface of the image side second lens from the most object side lens in the first lens group, with applying the antireflection coating on such an optical surface, ghost images and flare can effectively be suppressed.

Moreover, in a zoom lens seen from another point of view according to the second embodiment of the present application, the concave optical surface seen from the object on which the antireflection coating is formed is preferably an object side lens surface of the image side second lens from the most object side lens in the second lens group. Since reflection light rays are liable to be generated on the object side lens surface of the image side second lens from the most object side lens in the second lens group, with applying the antireflection coating on such an optical surface, ghost images and flare can effectively be suppressed.

Moreover, in a zoom lens seen from another point of view according to the second embodiment of the present application, the concave optical surface seen from the object on which the antireflection coating is formed is preferably an image side lens surface of the image side third lens from the most object side lens in the second lens group. Since reflection light rays are liable to be generated on the image side lens surface of the image side third lens from the most object side lens in the second lens group, with applying the antireflection coating on such an optical surface, ghost images and flare can effectively be suppressed.

Moreover, in a zoom lens seen from another point of view according to the second embodiment of the present application, the concave optical surface seen from the object on which the antireflection coating is formed is preferably an object side lens surface of the image side fourth lens from the most object side lens in the second lens group. Since reflection light rays are liable to be generated on the object side lens surface of the image side fourth lens from the most object side lens in the second lens group, with applying the antireflection coating on such an optical surface, ghost images and flare can effectively be suppressed.

In a zoom lens seen from another point of view according to the second embodiment, the antireflection coating may also be formed by a dry process etc without being limited to the wet process. On this occasion, it is preferable that the antireflection coating contains at least one layer of which the refractive index is equal to 1.30 or less. Thus, the same effects as in the case of using the wet process can be obtained by forming the antireflection coating based on the dry process etc. Note that at this time the layer of which the refractive index is equal to 1.30 or less is preferably the layer of the outermost surface of the layers composing the multi layer film.

In a zoom lens seen from another point of view according to the second embodiment, the following conditional expression (3) is preferably satisfied:

$$0.28 < f1/ft < 0.52 \qquad (3)$$

where ft denotes a focal length of the zoom lens in the telephoto end state.

Conditional expression (3) defines an appropriate range of an optimum focal length of the first lens group, and is for realizing high optical performance with suppressing variations in chromatic aberration and off-axis aberrations generated upon zooming from the wide-angle end state to the telephoto end state. However, conditional expression (3) has already been explained above, so that duplicated explanations are omitted.

In a zoom lens seen from another point of view according to the second embodiment, the following conditional expression (4) is preferably satisfied:

$$0.25 < \Delta 1/f1 < 1.10 \qquad (4)$$

where $\Delta 1$ denotes a moving amount of the first lens group with respect to the image plane upon zooming from the wide-angle end state to the telephoto end state.

Conditional expression (4) defines an optimum moving amount of the first lens group with respect to the image plane upon zooming from the wide-angle end state to the telephoto end state. However, conditional expression (4) has already been explained above, so that duplicated explanations are omitted.

In a zoom lens seen from another point of view according to the second embodiment, the third lens group preferably includes a positive lens A'.

With this configuration, it becomes possible to suppress variations in longitudinal chromatic aberration and spherical aberration generated upon zooming from the wide-angle end state to the telephoto end state, so that high optical performance can be realized.

In a zoom lens seen from another point of view according to the second embodiment, the following conditional expression (16) is preferably satisfied:

$$0.75 < f3A'/f3 < 2.25 \quad (16)$$

where f3 denotes a focal length of the third lens group, and f3A' denotes a focal length of the positive lens A' in the third lens group.

Conditional expression (16) defines an optimum focal length of the positive lens A' in the third lens group, and is for realizing high optical performance with suppressing variations in chromatic aberration and on-axis aberrations generated upon zooming. However, conditional expression (16) has already been explained above, so that duplicated explanations are omitted.

In a zoom lens seen from another point of view according to the second embodiment, the first lens group preferably includes the positive lens A'.

With this configuration, it becomes possible to suppress variations in longitudinal chromatic aberration generated upon zooming from the wide-angle end state to the telephoto end state, so that high optical performance can be realized.

In a zoom lens seen from another point of view according to the second embodiment, the following conditional expression (17) is preferably satisfied:

$$0.65 < f1A'/f1 < 1.75 \quad (17)$$

where f1A' denotes a focal length of the positive lens A' in the first lens group.

Conditional expression (17) defines an optimum focal length of the positive lens A' in the first lens group, and is for realizing high optical performance with suppressing variations in chromatic aberration and off-axis aberrations generated upon zooming. However, conditional expression (17) has already been explained above, so that duplicated explanations are omitted.

In a zoom lens seen from another point of view according to the second embodiment, the following conditional expression (18) is preferably satisfied:

$$1.75 < \phi 1A'/fw < 4.50 \quad (18)$$

where $\phi 1A'$ denotes an effective diameter of the positive lens A' in the first lens group.

Conditional expression (18) defines an optimum effective diameter of the positive lens A' in the first lens group, and is for realizing high optical performance with suppressing variations in chromatic aberration and off-axis aberrations generated upon zooming. However, conditional expression (18) has already been explained above, so that duplicated explanations are omitted.

In a zoom lens seen from another point of view according to the second embodiment, the following conditional expression (19) is preferably satisfied:

$$0.055 < \phi 1A'/ft < 0.420 \quad (19)$$

where ft denotes a focal length of the zoom lens in the telephoto end state, and $\phi 1A'$ denotes an effective diameter of the positive lens A' in the first lens group.

Conditional expression (19) defines an optimum effective diameter of the positive lens A' in the first lens group, and is for realizing high optical performance with suppressing variations in chromatic aberration and off-axis aberrations generated upon zooming. However, conditional expression (19) has already been explained above, so that duplicated explanations are omitted.

In a zoom lens seen from another point of view according to the second embodiment, the first lens group preferably includes two positive lenses.

With this configuration, the thickness of the first lens group can be suppressed, so that upon zooming from the wide-angle end state to the telephoto end state, variation in the height from the optical axis of the off-axis ray passing through the most object side lens surface of the first lens group can be suppressed. As a result, variations in off-axis aberrations, in particular, astigmatism can be suppressed, so that high optical performance can be realized.

In a zoom lens seen from another point of view according to the second embodiment, the following conditional expressions (11) and (12) are preferably satisfied:

$$1.750 < ndN \quad (11)$$

$$28.0 < vdN < 50.0 \quad (12)$$

where ndN denotes a refractive index at d-line (wavelength λ=587.6 nm) of a material of a negative lens in the first lens group, and vdN denotes an Abbe number at d-line (wavelength λ=587.6 nm) of the material of the negative lens in the first lens group.

Conditional expression (11) defines an optimum range of the refractive index in the negative lens in the first lens group, and is for realizing high optical performance with suppressing variations in off-axis aberrations generated upon zooming from the wide-angle end state to the telephoto end state. However, conditional expression (11) has already been explained above, so that duplicated explanations are omitted.

Conditional expression (12) defines an optimum Abbe number of the material of the negative lens in the first lens group, and is for realizing high optical performance with suppressing variation in chromatic aberration generated upon zooming from the wide-angle end state to the telephoto end state. However, conditional expression (12) has already been explained above, so that duplicated explanations are omitted.

In a zoom lens seen from another point of view according to the second embodiment, the first lens group preferably has only one negative lens.

With this configuration, the thickness of the first lens group can be suppressed, so that upon zooming from the wide-angle end state to the telephoto end state, variation in the height from the optical axis of the off-axis ray passing through the most object side lens surface of the first lens group can be suppressed. As a result, variations in off-axis aberrations, in particular, astigmatism can be suppressed, so that high optical performance can be realized.

In a zoom lens seen from another point of view according to the second embodiment, the following conditional expression (20) is preferably satisfied:

$$75.0 < vdB' \quad (20)$$

where vdB' denotes an Abbe number at d-line (wavelength λ=587.6 nm) of a material of the positive lens B' in the first lens group.

Conditional expression (20) defines an optimum Abbe number of the material of the positive lens B', and is for realizing high optical performance with suppressing variation in chromatic aberration generated upon zooming from the wide-angle end state to the telephoto end state. However, conditional expression (20) has already been explained above, so that duplicated explanations are omitted.

In a zoom lens seen from another point of view according to the second embodiment, it is preferable that the third lens group includes, in order from the object side, a front lens group having positive refractive power and a rear lens group having positive refractive power, and a distance between the front lens group and the rear lens group decreases upon zooming from the wide-angle end state to the telephoto end state.

With this configuration, zooming efficiency of the third lens group can be enhanced better than a configuration that the third lens group is moved in a body upon zooming. Moreover, high optical performance can be realized with suppressing variations in spherical aberration, coma and astigmatism.

In a zoom lens seen from another point of view according to the second embodiment, it is preferable that the third lens group includes, in order from the object side, a front lens group having positive refractive power, a middle lens group having negative refractive power, and a rear lens group having positive refractive power, and a distance between the front lens group and the middle lens group varies, and a distance between the middle lens group and the rear lens group varies upon zooming from the wide-angle end state to the telephoto end state.

With this configuration, variations in aberrations generated in the third lens group can be suppressed better than a configuration that the third lens group is moved in a body upon zooming, so that high optical performance can be realized with suppressing in particular spherical aberration, coma and astigmatism.

In a zoom lens seen from another point of view according to the second embodiment, it is preferable that a distance between the front lens group and the middle lens group increases, and a distance between the middle lens group and the rear lens group decreases.

With this configuration, zooming efficiency of the third lens group can be enhanced, so that high optical performance can be realized with suppressing variations in spherical aberration, coma and astigmatism.

In a zoom lens seen from another point of view according to the second embodiment, the following conditional expression (21) is preferably satisfied:

$$0.55 < f31A'/f31 < 2.45 \qquad (21)$$

where f31 denotes a focal length of the front lens group, and f31A' denotes a focal length of the positive lens A' in the front lens group.

Conditional expression (21) defines an optimum focal length of the positive lens A' in the front lens group, and is for realizing high optical performance with suppressing variations in chromatic aberration and on-axis aberrations generated upon zooming. However, conditional expression (21) has already been explained above, so that duplicated explanations are omitted.

Then, a zoom lens according to each Example of the second embodiment is explained below with reference to accompanying drawings. Incidentally, detailed explanation of an antireflection coating will be explained separately after Example 12 of a third embodiment.

Example 4

FIG. 1 is a sectional view showing a lens configuration of a zoom lens according to Example 4 of the second embodiment of the present application.

As shown in FIG. 1, the zoom lens according to Example 4 of the second embodiment is composed of, in order from an object side along an optical axis, a first lens group G1 having positive refractive power, a second lens group G2 having negative refractive power, and a third lens group G3 having positive refractive power. The third lens group G3 is composed of, in order from the object side along the optical axis, a front lens group G31 having positive refractive power, a middle lens group G32 having negative refractive power, and a rear lens group G33 having positive refractive power.

Upon zooming from a wide-angle end state to a telephoto end state, the first lens group G1 is moved monotonously to the object side, the second lens group G2 is moved at first to the image side and then to the object side, and the third lens group G3 is moved monotonously to the object side with respect to the image plane I such that a distance between the first lens group G1 and the second lens group G2 increases, and a distance between the second lens group G2 and the third lens group G3 decreases. Moreover, the front lens group G31, the middle lens group G32 and the rear lens group G33 are moved monotonously to the object side with respect to the image plane I such that a distance between the front lens group G31 and the middle lens group G32 increases, and a distance between the middle lens group G32 and the rear lens group G33 decreases. Moreover, the front lens group G31 and the rear lens group G33 are moved in a body with respect to the image plane I.

An aperture stop S is disposed to the most object side of the third lens group G3, which is disposed to the image side of the second lens group G2, and formed in a body with the front lens group G31.

The first lens group G1 is composed of, in order from the object side along the optical axis, a cemented lens constructed by a negative meniscus lens L11 having a convex surface facing the object side cemented with a double convex positive lens L12, and a double convex positive lens L13.

The second lens group G2 is composed of, in order from the object side along the optical axis, a negative meniscus lens L21 having a convex surface facing the object side, a double concave negative lens L22, a double convex positive lens L23, and a cemented lens constructed by a double concave negative lens L24 cemented with a double convex positive lens L25. The negative meniscus lens L21 disposed to the most object side of the second lens group G2 is a compound type aspherical lens whose object side lens surface is formed as an aspherical surface by applying a resin layer.

The front lens group G31 is composed of, in order from the object side along the optical axis, a double convex positive lens L31, a double convex positive lens L32, and a cemented lens constructed by a double convex positive lens L33 cemented with a negative meniscus lens L34 having a concave surface facing the object side. The double convex positive lens L31 is the positive lens A' satisfying conditional expressions (14) and (15).

The middle lens group G32 is composed of, in order from the object side along the optical axis, a cemented lens constructed by a double concave negative lens L41 cemented with a positive meniscus lens L42 having a convex surface facing the object side, and a negative meniscus lens L43 having a concave surface facing the object side.

The double concave negative lens L41 disposed to the most object side of the middle lens group G32 is a glass mold type aspherical lens whose object side lens surface is an aspherical surface.

The rear lens group G33 is composed of, in order from the object side along the optical axis, a positive meniscus lens L51 having a concave surface facing the object side, a double convex positive lens L52, and a cemented lens constructed by a double concave negative lens L53 cemented with a double convex positive lens L54. The positive meniscus lens L51 disposed to the most object side of the rear lens group G33 is a glass mold type aspherical lens whose object side lens surface is an aspherical surface.

Light rays come out from the double convex positive lens L54 form an image on the image plane I.

In the zoom lens seen from another point of view according to Example 4 of the second embodiment, an antireflection coating described later is applied to the image plane side lens surface of the negative meniscus lens L21 in the second lens group G2 and the object side lens surface of the double concave negative lens L22 in the second lens group G2.

Various values associated with the zoom lens according to Example 4 of the second embodiment are listed in Table 4.

TABLE 4

| (Specifications) | | |
|---|---|---|
| zoom ratio = 15.709 | | |

| | W | M | T |
|---|---|---|---|
| f = | 18.56080 | 104.15546 | 291.57422 |
| FNO = | 3.60018 | 5.60084 | 5.87404 |
| ω = | 38.95554 | 7.45367 | 2.71157 |
| Y = | 14.20 | 14.20 | 14.20 |
| TL = | 163.29692 | 225.59510 | 252.97281 |
| Bf = | 39.15242 | 70.61280 | 82.77641 |

(Lens Data)

| i | r | d | nd | νd |
|---|---|---|---|---|
| OP | ∞ | ∞ | | |
| 1 | 205.09180 | 2.00000 | 1.882997 | 40.76 |
| 2 | 67.52420 | 9.07190 | 1.456000 | 91.20 |
| 3 | −361.42710 | 0.10000 | | |
| 4 | 70.10040 | 6.86700 | 1.603001 | 65.46 |
| 5 | −2470.83790 | (d5) | | |
| 6* | 84.76870 | 0.15000 | 1.553890 | 38.09 |
| 7 | 73.93750 | 1.20000 | 1.834807 | 42.72 |
| 8 | 17.03670 | 6.46970 | | |
| 9 | −49.48220 | 1.00000 | 1.816000 | 46.62 |
| 10 | 52.14060 | 0.15000 | | |
| 11 | 31.61490 | 5.45080 | 1.761820 | 26.56 |
| 12 | −44.44820 | 1.19350 | | |
| 13 | −25.13580 | 1.00000 | 1.816000 | 46.62 |
| 14 | 64.50360 | 2.42190 | 1.808090 | 22.79 |
| 15 | −166.54310 | (d15) | | |
| 16 | ∞ | 1.00000 | Aperture Stop S | |
| 17 | 63.10220 | 3.49130 | 1.593190 | 67.87 |
| 18 | −50.22150 | 0.10000 | | |
| 19 | 58.68260 | 2.72200 | 1.487490 | 70.41 |
| 20 | −121.43450 | 0.10000 | | |
| 21 | 48.64320 | 4.10420 | 1.487490 | 70.41 |
| 22 | −34.50080 | 1.00000 | 1.808090 | 22.79 |
| 23 | −205.15990 | (d23) | | |
| 24* | −66.96860 | 1.00000 | 1.693501 | 53.20 |
| 25 | 26.57120 | 2.15810 | 1.761820 | 26.56 |
| 26 | 63.33840 | 4.78730 | | |
| 27 | −24.70410 | 1.00000 | 1.729157 | 54.66 |
| 28 | −74.86360 | (d28) | | |
| 29* | −569.79420 | 3.96090 | 1.589130 | 61.16 |
| 30 | −23.53500 | 0.10000 | | |
| 31 | 37.14850 | 5.00600 | 1.487490 | 70.41 |
| 32 | −45.19690 | 1.71640 | | |

TABLE 4-continued

| | | | | |
|---|---|---|---|---|
| 33 | −107.03630 | 1.00000 | 1.882997 | 40.76 |
| 34 | 23.36210 | 4.50160 | 1.548141 | 45.79 |
| 35 | −637.55850 | (Bf) | | |
| I | ∞ | | | |

(Aspherical Surface Data)

Surface Number = 6

$\kappa$ = 1.0000  A4 = 3.61880E−06
A6 = −6.10680E−09  A8 = −4.67380E−12
A10 = 5.77660E−14

Surface Number = 24

$\kappa$ = 1.0000  A4 = 3.81940E−06
A6 = −1.72450E−09  A8 = 0.00000E+00
A10 = 0.00000E+00

Surface Number = 29

$\kappa$ = 1.0000  A4 = −1.63630E−05
A6 = 8.94380E−09  A8 = −2.98150E−11
A10 = 2.87630E−14

(Variable Distances)

| | W | M | T |
|---|---|---|---|
| d5 = | 2.14670 | 55.86030 | 80.53690 |
| d15 = | 34.33830 | 11.46250 | 2.00000 |
| d23 = | 3.38750 | 10.66930 | 11.83690 |
| d28 = | 9.44940 | 2.16760 | 1.00000 |
| Bf = | 39.15242 | 70.61280 | 82.77641 |

(Lens Group Data)

| Group | ST | Focal Length |
|---|---|---|
| 1 | 1 | 122.10406 |
| 2 | 6 | −15.86654 |
| 3 | 16 | 39.50539(W) |
| | | 33.18380(M) |
| | | 31.88175 (T) |
| 31 | 16 | 26.56694 |
| 32 | 24 | −24.00147 |
| 33 | 29 | 33.81791 |

(Values for Conditional Expressions)

| | |
|---|---|
| (2) | f1/fw = 6.579 |
| (3) | f1/ft = 0.419 |
| (4) | Δ1/f1 = 0.734 |
| (11) | ndN = 1.882997 (L11) |
| (12) | vdN = 40.76 (L11) |
| (14) | ndA' = 1.593190 (L31) |
| (15) | vdA' = 67.87 (L31) |
| (16) | f3A'/f3 = 1.207 (L31) (W) |
| (16) | f3A'/f3 = 1.437 (L31) (M) |
| (16) | f3A'/f3 = 1.496 (L31) (T) |
| (20) | vdB' = 91.20 (L12) |
| (21) | f31A'/f31 = 1.795 (L31) |

FIGS. 2A, 2B and 2C are graphs showing various aberrations of the zoom lens according to Example 4 of the second embodiment upon focusing on an infinitely distant object, in which FIG. 2A is a wide-angle end state, FIG. 2B is an intermediate focal length state, and FIG. 2C is a telephoto end state.

As is apparent from various graphs, the zoom lens according to Example 4 of the second embodiment shows superb optical performance as a result of good corrections to various aberrations.

FIG. 3 is a sectional view showing the lens configuration of the lens system seen from another point of view according to Example 4 of the second embodiment and is an explanatory view, in which light rays reflected from a first-ghost-generating surface are reflected by a second-ghost-generating surface. As shown in FIG. 3, when light rays BM from an object are incident on the zoom lens, the rays are reflected by the object side lens surface (a first-ghost-generating surface whose surface number is 9) of the double concave negative lens L22, and the reflected light rays are reflected again by the image plane I side lens surface (a second-ghost-generating surface whose surface number is 8) of the negative meniscus lens L21 to reach the image plane I with generating ghost images. Incidentally, the first-ghost-generating surface 9 is a concave surface seen from the object side, and the second-ghost-generating surface 8 is a concave surface seen from the aperture stop S. With forming an antireflection coating corresponding to a broad wavelength range to such lens surfaces, it becomes possible to effectively suppress ghost images and flare.

Example 5

FIG. 8 is a sectional view showing a lens configuration of a zoom lens according to Example 5 of the second embodiment of the present application.

As shown in FIG. 8, the zoom lens according to Example 5 of the second embodiment is composed of, in order from an object side along an optical axis, a first lens group G1 having positive refractive power, a second lens group G2 having negative refractive power, and a third lens group G3 having positive refractive power. The third lens group G3 is composed of, in order from the object side along the optical axis, a front lens group G31 having positive refractive power, and a rear lens group G32 having positive refractive power.

Upon zooming from a wide-angle end state to a telephoto end state, the first lens group G1 is moved monotonously to the object side, the second lens group G2 is moved at first to the image side and then to the object side, and the third lens group G3 is moved monotonously to the object side with respect to the image plane I such that a distance between the first lens group G1 and the second lens group G2 increases, and a distance between the second lens group G2 and the third lens group G3 decreases. Moreover, the front lens group G31, and the rear lens group G32 are moved monotonously to the object side with respect to the image plane I such that a distance between the front lens group G31 and the rear lens group G32 decreases.

An aperture stop S is disposed to the most object side of the third lens group G3, which is disposed to the image side of the second lens group G2, and formed in a body with the front lens group G31.

The first lens group G1 is composed of, in order from the object side along the optical axis, a cemented lens constructed by a negative meniscus lens L11 having a convex surface facing the object side cemented with a double convex positive lens L12, and a positive meniscus lens L13 having a convex surface facing the object side. The positive meniscus lens L13 is the positive lens A' satisfying conditional expressions (14) and (15).

The second lens group G2 is composed of, in order from the object side along the optical axis, a negative meniscus lens L21 having a convex surface facing the object side, a double concave negative lens L22, a double convex positive lens L23, and a cemented lens constructed by a negative meniscus lens L24 having a convex surface facing the image side cemented with a positive meniscus lens L25 having a convex surface facing the image side. The negative meniscus lens L21 disposed to the most object side of the second lens group G2 is a compound type aspherical lens whose object side lens surface is formed as an aspherical surface by applying a resin layer.

The front lens group G31 is composed of, in order from the object side along the optical axis, a double convex positive lens L31, a double convex positive lens L32, a cemented lens constructed by a double convex positive lens L33 cemented with a double concave negative lens L34, a cemented lens constructed by a double concave negative lens L35 cemented with a positive meniscus lens L36 having a convex surface facing the object side, and a negative meniscus lens L37 having a concave surface facing the object side. The double concave negative lens L35 is a glass mold type aspherical lens whose object side lens surface is formed as an aspherical surface. The double convex positive lens L31 is the positive lens A' satisfying conditional expressions (14) and (15).

The rear lens group G32 is composed of, in order from the object side along the optical axis, a double convex positive lens L41, and a cemented lens constructed by a double concave negative lens L42 cemented with a double convex positive lens L43. The double convex positive lens L41 disposed to the most object side of the rear lens group G32 is a glass mold type aspherical lens whose object side lens surface is an aspherical surface. Light rays come out from the double convex positive lens L43 form an image on the image plane I.

In the zoom lens seen from another point of view according to Example 5 of the second embodiment, an antireflection coating described later is applied to the object side lens surface of the positive meniscus lens L13 in the first lens group G1 and the image side lens surface of the double convex positive lens L23 in the second lens group G2.

Various values associated with the zoom lens according to Example 5 of the second embodiment are listed in Table 5.

TABLE 5

| (Specifications) zoom ratio = 15.696 | | | |
|---|---|---|---|
| | W | M | T |
| f = | 18.53979 | 104.99746 | 290.99204 |
| FNO = | 4.10702 | 5.39973 | 5.39939 |
| ω = | 38.99845 | 7.50128 | 2.73812 |
| Y = | 14.20 | 14.20 | 14.20 |
| TL = | 160.00885 | 218.99165 | 237.79997 |
| Bf = | 39.11693 | 89.39051 | 99.16649 |

| (Lens Data) | | | | |
|---|---|---|---|---|
| i | r | d | nd | νd |
| OP | ∞ | ∞ | | |
| 1 | 123.95945 | 2.00000 | 1.850260 | 32.35 |
| 2 | 65.81889 | 9.30000 | 1.497820 | 82.52 |
| 3 | −679.81898 | 0.10000 | | |
| 4 | 66.63494 | 6.20000 | 1.593190 | 67.87 |
| 5 | 419.93083 | (d5) | | |
| 6* | 162.32416 | 0.15000 | 1.553890 | 38.09 |
| 7 | 146.07537 | 1.00000 | 1.834807 | 42.72 |
| 8 | 16.13035 | 6.55000 | | |

TABLE 5-continued

| | | | | |
|---|---|---|---|---|
| 9 | −35.27597 | 1.00000 | 1.882997 | 40.76 |
| 10 | 60.44503 | 0.10000 | | |
| 11 | 37.37226 | 5.20000 | 1.846660 | 23.78 |
| 12 | −32.72792 | 0.82143 | | |
| 13 | −23.94628 | 1.00000 | 1.882997 | 40.76 |
| 14 | −252.41497 | 2.00000 | 1.808090 | 22.79 |
| 15 | −72.44788 | (d15) | | |
| 16 | ∞ | 1.00000 | Aperture stop S | |
| 17 | 36.72216 | 3.30000 | 1.593190 | 67.87 |
| 18 | −118.19629 | 0.10000 | | |
| 19 | 41.37679 | 3.15000 | 1.487490 | 70.41 |
| 20 | −92.34292 | 0.10000 | | |
| 21 | 42.34033 | 3.80000 | 1.487490 | 70.41 |
| 22 | −41.00357 | 1.00000 | 1.805181 | 25.43 |
| 23 | 259.36092 | 3.81909 | | |
| 24* | −63.64853 | 1.00000 | 1.806100 | 40.94 |
| 25 | 22.00000 | 2.90000 | 1.805181 | 25.43 |
| 26 | 150.57815 | 4.20000 | | |
| 27 | −45.82441 | 1.00000 | 1.882997 | 40.76 |
| 28 | −215.98952 | (d28) | | |
| 29* | 77.17936 | 3.15000 | 1.589130 | 61.16 |
| 30 | −37.11866 | 0.10000 | | |
| 31 | −261.29488 | 1.00000 | 1.882997 | 40.76 |
| 32 | 39.98076 | 4.40000 | 1.518229 | 58.93 |
| 33 | −48.52092 | (Bf) | | |
| I | ∞ | | | |

(Aspherical Surface Data)

Surface Number = 6

$\kappa = -5.7774$         A4 = 6.79980E−06
A6 = −2.52730E−08    A8 = 8.26150E−11
A10 = −1.02860E−13

Surface Number = 24

$\kappa = 2.8196$          A4 = 4.59750E−06
A6 = 4.28350E−09     A8 = 0.00000E+00
A10 = 0.00000E+00

Surface Number = 29

$\kappa = -6.5363$         A4 = −1.95310E−05
A6 = 1.79050E−08     A8 = −1.55070E−10
A10 = 4.13770E−13

(Variable Distances)

| | W | M | T |
|---|---|---|---|
| d5 = | 2.15153 | 45.02627 | 65.69297 |
| d15 = | 40.45482 | 13.14016 | 2.00000 |
| d28 = | 8.84506 | 1.99420 | 1.50000 |
| Bf = | 39.11693 | 89.39051 | 99.16649 |

(Lens Group Data)

| Group | ST | Focal Length |
|---|---|---|
| 1 | 1 | 103.25223 |
| 2 | 6 | −15.13084 |
| 3 | 16 | 39.55369(W) |
| | | 35.07124(M) |
| | | 34.78685 (T) |
| 31 | 16 | 44.76649 |
| 32 | 29 | 47.36030 |

(Values for Conditional Expressions)

| | | |
|---|---|---|
| (2) | f1/fw = 5.569 | |
| (3) | f1/ft = 0.355 | |
| (4) | Δ1/f1 = 0.753 | |
| (11) | ndN = 1.850260 (L11) | |
| (12) | vdN = 32.35 (L11) | |
| (14) | ndA' = 1.593190 (L13) | |
| (14) | ndA' = 1.593190 (L31) | |
| (15) | vdA' = 67.87 (L13) | |
| (15) | vdA' = 67.87 (L31) | |

TABLE 5-continued

| (16) | f3A'/f3 = 1.204 (L31) (W) |
| (16) | f3A'/f3 = 1.358 (L31) (M) |
| (16) | f3A'/f3 = 1.369 (L31) (T) |
| (17) | f1A'/f1 = 1.285 (L13) |
| (18) | φ1A'/fw = 2.918 (φ1A' = 54.10) (L13) |
| (19) | φ1A'/ft = 0.186 (φ1A' = 54.10) (L13) |
| (20) | vdB' = 82.52 (L12) |
| (21) | f31A'/f31 = 1.064 (L31) |

Figure 9A:
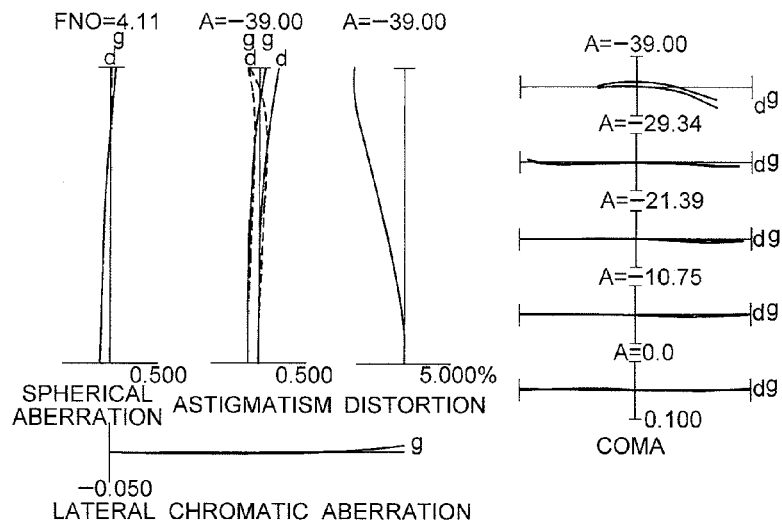
Figure 9B:
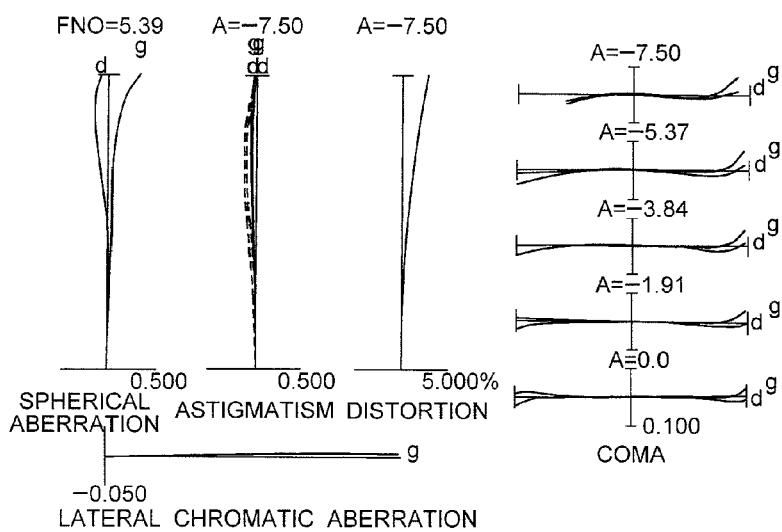
Figure 9C:
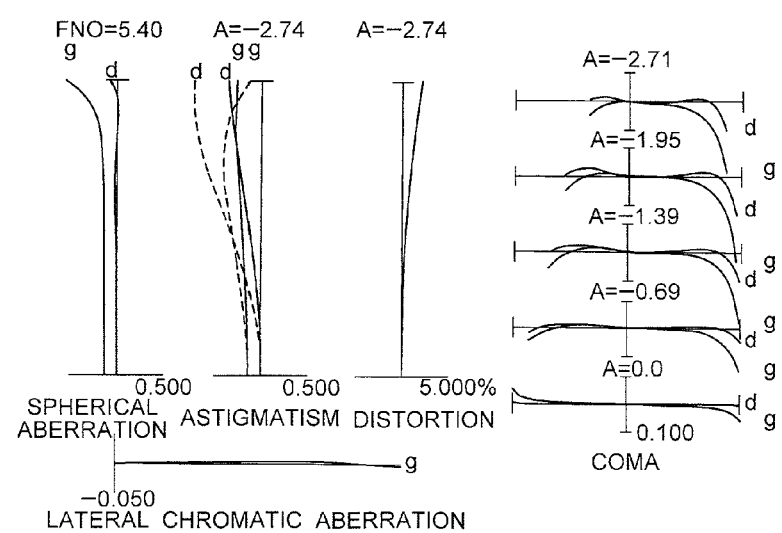

FIGS. 9A, 9B and 9C are graphs showing various aberrations of the zoom lens according to Example 5 of the second embodiment upon focusing on an infinitely distant object, in which FIG. 9A is a wide-angle end state, FIG. 9B is an intermediate focal length state, and FIG. 9C is a telephoto end state.

As is apparent from various graphs, the zoom lens according to Example 5 of the second embodiment shows superb optical performance as a result of good corrections to various aberrations.

Example 6

FIG. 10 is a sectional view showing a lens configuration of a zoom lens according to Example 6 of the second embodiment of the present application.

As shown in FIG. 10, the zoom lens according to Example 6 of the second embodiment is composed of, in order from an object side along an optical axis, a first lens group G1 having positive refractive power, a second lens group G2 having negative refractive power, and a third lens group G3 having positive refractive power. The third lens group G3 is composed of, in order from the object side along the optical axis, a front lens group G31 having positive refractive power, a middle lens group G32 having negative refractive power, and a rear lens group G33 having positive refractive power.

Upon zooming from a wide-angle end state W to a telephoto end state T, the first lens group G1 is moved monotonously to the object side, the second lens group G2 is moved at first to the image side and then to the object side, and the third lens group G3 is moved monotonously to the object side with respect to the image plane I such that a distance between the first lens group G1 and the second lens group G2 increases, and a distance between the second lens group G2 and the third lens group G3 decreases. Moreover, the front lens group G31, the middle lens group G32 and the rear lens group G33 are moved monotonously to the object side with respect to the image plane I such that a distance between the front lens group G31 and the middle lens group G32 increases, and a distance between the middle lens group G32 and the rear lens group G33 decreases.

An aperture stop S is disposed to the most object side of the third lens group G3, which is disposed to the image side of the second lens group G2, and formed in a body with the front lens group G31.

The first lens group G1 is composed of, in order from the object side along the optical axis, a cemented lens constructed by a negative meniscus lens L11 having a convex surface facing the object side cemented with a double convex positive lens L12, and a positive meniscus lens L13 having a convex surface facing the object side. The positive meniscus lens L13 is the positive lens A' satisfying conditional expressions (14) and (15).

The second lens group G2 is composed of, in order from the object side along the optical axis, a negative meniscus lens L21 having a convex surface facing the object side, a double concave negative lens L22, a double convex positive lens L23, and a cemented lens constructed by a double concave negative lens L24 cemented with a double convex positive lens L25. The negative meniscus lens L21 disposed to the most object side of the second lens group G2 is a compound type aspherical lens whose object side lens surface is formed as an aspherical surface by applying a resin layer.

The front lens group G31 is composed of, in order from the object side along the optical axis, a double convex positive lens L31, a double convex positive lens L32, and a cemented lens constructed by a double convex positive lens L33 cemented with a negative meniscus lens L34 having a concave surface facing the object side. The double convex positive lens L31 is the positive lens A' satisfying conditional expressions (14) and (15).

The middle lens group G32 is composed of, in order from the object side along the optical axis, a cemented lens constructed by a double concave negative lens L41 cemented with a positive meniscus lens L42 having a convex surface facing the object side, and a negative meniscus lens L43 having a concave surface facing the object side. The double concave negative lens L41 disposed to the most object side of the middle lens group G32 is a compound type aspherical lens whose object side lens surface is an aspherical surface formed by applying a resin layer.

The rear lens group G33 is composed of, in order from the object side along the optical axis, a double convex positive lens L51, a double convex positive lens L52, and a cemented lens constructed by a double concave negative lens L53 cemented with a double convex positive lens L54. The double convex positive lens L51 disposed to the most object side of the rear lens group G33 is a glass mold type aspherical lens whose object side lens surface is an aspherical surface. Light rays come out from the double convex positive lens L54 form an image on the image plane I.

In the zoom lens seen from another point of view according to Example 6 of the second embodiment, an antireflection coating described later is applied to the object side lens surface of the positive meniscus lens L13 in the first lens group G1 and the object side lens surface of the double concave negative lens L24 in the second lens group G2.

Various values associated with the zoom lens according to Example 6 of the second embodiment are listed in Table 6.

TABLE 6

| (Specifications) |
| --- |
| zoom ratio = 15.701 |

|  | W | M | T |
| --- | --- | --- | --- |
| f = | 18.56060 | 104.65150 | 291.42454 |
| FNO = | 3.57565 | 5.62482 | 5.81064 |
| ω = | 38.80191 | 7.44205 | 2.72113 |
| Y = | 14.20 | 14.20 | 14.20 |
| TL = | 164.76435 | 225.28899 | 250.61470 |
| Bf = | 38.84705 | 73.57929 | 86.64770 |

| (Lens Data) | | | | |
| --- | --- | --- | --- | --- |
| i | r | d | nd | νd |
| OP | ∞ | ∞ | | |
| 1 | 175.60560 | 2.20000 | 1.834000 | 37.16 |
| 2 | 67.43020 | 8.80000 | 1.497820 | 82.52 |
| 3 | −587.78480 | 0.10000 | | |
| 4 | 72.27100 | 6.45000 | 1.593190 | 67.87 |
| 5 | 1826.13880 | (d5) | | |
| 6* | 84.76870 | 0.10000 | 1.553890 | 38.09 |
| 7 | 73.93750 | 1.20000 | 1.834807 | 42.72 |
| 8 | 17.18730 | 6.95000 | | |
| 9 | −36.9822 | 1.00000 | 1.816000 | 46.62 |
| 10 | 77.92630 | 0.15000 | | |
| 11 | 36.63460 | 5.30000 | 1.784723 | 25.68 |
| 12 | −36.63460 | 0.80000 | | |
| 13 | −26.19910 | 1.00000 | 1.816000 | 46.62 |
| 14 | 63.73960 | 2.05000 | 1.808090 | 22.79 |
| 15 | −643.27060 | (d15) | | |
| 16 | ∞ | 1.00000 | Aperture Stop S | |
| 17 | 65.83650 | 3.40000 | 1.593190 | 67.87 |
| 18 | −50.15460 | 0.10000 | | |
| 19 | 65.68170 | 2.45000 | 1.487490 | 70.41 |
| 20 | −154.97430 | 0.10000 | | |
| 21 | 46.73330 | 4.20000 | 1.487490 | 70.41 |
| 22 | −35.78330 | 1.00000 | 1.808090 | 22.79 |
| 23 | −191.93180 | (d23) | | |
| 24* | −57.29660 | 0.20000 | 1.553890 | 38.09 |
| 25 | −59.72500 | 0.90000 | 1.696797 | 55.52 |
| 26 | 28.51000 | 2.15000 | 1.728250 | 28.46 |
| 27 | 91.99760 | 4.14020 | | |
| 28 | −32.89540 | 1.00000 | 1.729157 | 54.66 |
| 29 | −144.33150 | (d29) | 1.589130 | 61.18 |
| 30* | 6427.19190 | 4.65000 | | |
| 31 | −27.38180 | 0.10000 | 1.487490 | 70.41 |
| 32 | 31.47760 | 5.85000 | | |
| 33 | −43.75390 | 1.45000 | | |
| 34 | −113.58970 | 1.00000 | 1.882997 | 40.76 |
| 35 | 20.34810 | 5.30000 | 1.548141 | 45.79 |
| 36 | −709.14530 | (Bf) | | |
| I | ∞ | | | |

| (Aspherical Surface Data) |
| --- |
| Surface Number = 6 |

| κ = 1.0000 | A4 = 2.88220E−06 |
| --- | --- |
| A6 = −2.29350E−11 | A8 = −2.35280E−11 |
| A10 = 9.21570E−14 | |

| Surface Number = 24 |
| --- |

| κ = 1.0000 | A4 = 4.32780E−06 |
| --- | --- |
| A6 = 1.88460E−09 | A8 = 0.00000E+00 |
| A10 = 0.00000E+00 | |

| Surface Number = 30 |
| --- |

| κ = 1.0000 | A4 = −1.36170E−05 |
| --- | --- |
| A6 = −3.55860E−10 | A8 = 1.83080E−11 |
| A10 = −1.86790E−13 | |

| (Variable Distances) | | | |
| --- | --- | --- | --- |
|  | W | M | T |
| d5 = | 2.15700 | 53.01000 | 76.25220 |
| d15 = | 33.36360 | 11.30360 | 2.00000 |
| d23 = | 3.46820 | 9.64300 | 9.62460 |

TABLE 6-continued

| d29 = | 11.83830 | 2.66290 | 1.00000 |
|---|---|---|---|
| Bf = | 38.84705 | 73.57929 | 86.64770 |

(Lens Group Data)

| Group | ST | Focal Length |
|---|---|---|
| 1 | 1 | 117.72937 |
| 2 | 6 | −15.60945 |
| 3 | 16 | 40.44471(W) |
|  |  | 33.95695(M) |
|  |  | 32.70088 (T) |
| 31 | 16 | 27.35473 |
| 32 | 24 | −26.50041 |
| 33 | 30 | 35.20423 |

(Values for Conditional Expressions)

| (2) | f1/fw = 6.343 |
|---|---|
| (3) | f1/ft = 0.404 |
| (4) | Δ1/f1 = 0.729 |
| (11) | ndN = 1.834000 (L11) |
| (12) | vdN = 37.16 (L11) |
| (14) | ndA' = 1.593190 (L13) |
| (14) | ndA' = 1.593190 (L31) |
| (15) | vdA' = 67.87 (L13) |
| (15) | vdA' = 67.87 (L31) |
| (16) | f3A'/f3 = 1.200 (L31) (W) |
| (16) | f3A'/f3 = 1.429 (L31) (M) |
| (16) | f3A'/f3 = 1.484 (L31) (T) |
| (17) | f1A'/f1 = 1.076 (L13) |
| (18) | φ1A'/fw = 2.909 (φ1A' = 54.00) (L13) |
| (19) | φ1A'/ft = 0.185 (φ1A' = 54.00) (L13) |
| (20) | vdB' = 82.52 (L12) |
| (21) | f31A'/f31 = 1.774 (L31) |

Figure 11A:
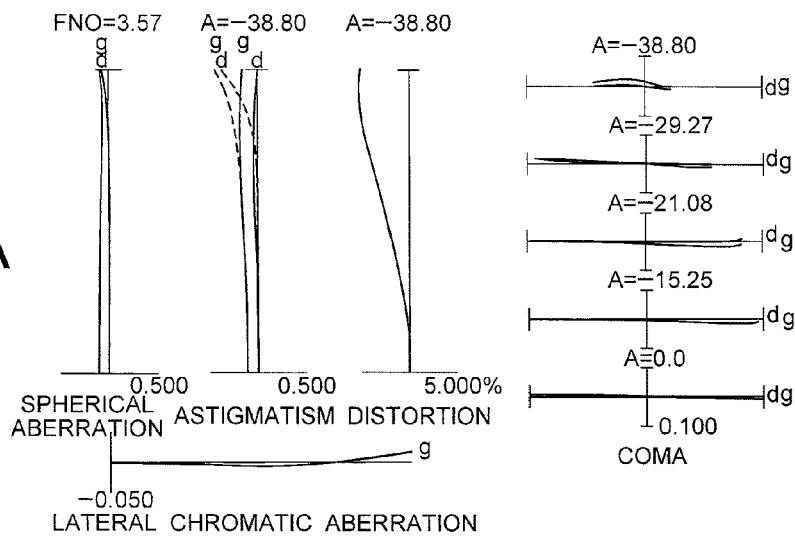
Figure 11B:
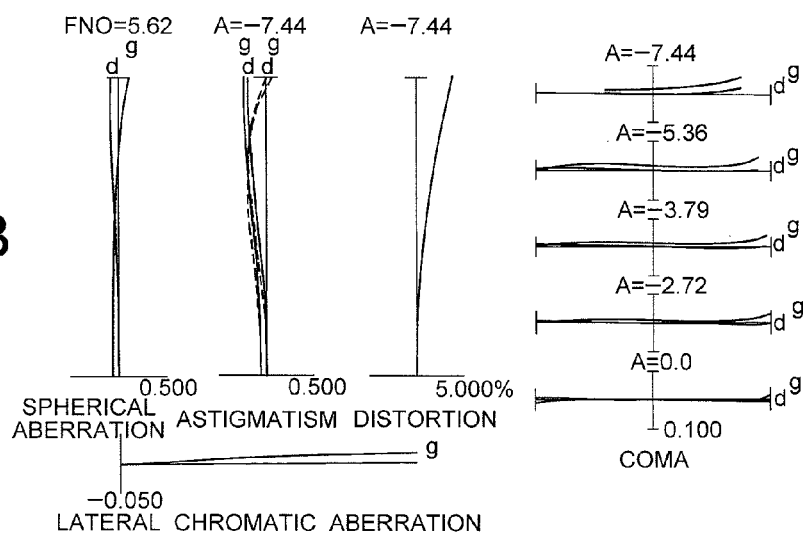
Figure 11C:
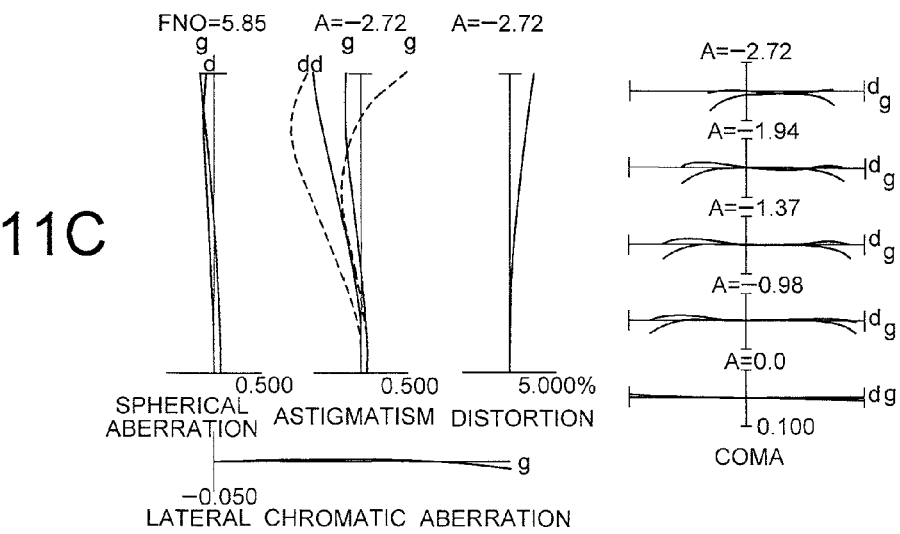

FIGS. 11A, 11B and 11C are graphs showing various aberrations of the zoom lens according to Example 6 of the second embodiment upon focusing on an infinitely distant object, in which FIG. 11A is a wide-angle end state, FIG. 11B is an intermediate focal length state, and FIG. 11C is a telephoto end state.

As is apparent from various graphs, the zoom lens according to Example 6 of the second embodiment shows superb optical performance as a result of good corrections to various aberrations.

Example 7

FIG. 12 is a sectional view showing a lens configuration of a zoom lens according to Example 7 of the second embodiment of the present application.

As shown in FIG. 12, the zoom lens according to Example 7 of the second embodiment is composed of, in order from an object side along an optical axis, a first lens group G1 having positive refractive power, a second lens group G2 having negative refractive power, and a third lens group G3 having positive refractive power. The third lens group G3 is composed of, in order from the object side along the optical axis, a front lens group G31 having positive refractive power, a middle lens group G32 having negative refractive power, and a rear lens group G33 having positive refractive power.

Upon zooming from a wide-angle end state W to a telephoto end state T, the first lens group G1 is moved monotonously to the object side, the second lens group G2 is moved at first to the image side and then to the object side, and the third lens group G3 is moved monotonously to the object side with respect to the image plane I such that a distance between the first lens group G1 and the second lens group G2 increases, and a distance between the second lens group G2 and the third lens group G3 decreases. Moreover, the front lens group G31, the middle lens group G32 and the rear lens group G33 are moved monotonously to the object side with respect to the image plane I such that a distance between the front lens group G31 and the middle lens group G32 increases, and a distance between the middle lens group G32 and the rear lens group G33 decreases.

An aperture stop S is disposed to the most object side of the third lens group G3, which is disposed to the image side of the second lens group G2, and formed in a body with the front lens group G31.

The first lens group G1 is composed of, in order from the object side along the optical axis, a cemented lens constructed by a negative meniscus lens L11 having a convex surface facing the object side cemented with a double convex positive lens L12, and a positive meniscus lens L13 having a convex surface facing the object side. The positive meniscus lens L13 is the positive lens A' satisfying conditional expressions (14) and (15).

The second lens group G2 is composed of, in order from the object side along the optical axis, a negative meniscus lens L21 having a convex surface facing the object side, a double concave negative lens L22, a double convex positive lens L23, and a cemented lens constructed by a double concave negative lens L24 cemented with a double convex positive lens L25. The negative meniscus lens L21 disposed to the most object side of the second lens group G2 is a compound type aspherical lens whose object side lens surface is formed as an aspherical surface by applying a resin layer.

The front lens group G31 is composed of, in order from the object side along the optical axis, a double convex positive lens L31, a double convex positive lens L32, and a cemented lens constructed by a double convex positive lens L33 cemented with a negative meniscus lens L34 having a concave surface facing the object side. The double convex positive lens L31 is the positive lens A' satisfying conditional expressions (14) and (15).

The middle lens group G32 is composed of, in order from the object side along the optical axis, a cemented lens constructed by a double concave negative lens L41 cemented with a positive meniscus lens L42 having a convex surface facing the object side, and a negative meniscus lens L43 having a concave surface facing the object side. The double concave negative lens L41 disposed to the most object side of the middle lens group G32 is a compound type aspherical lens whose object side lens surface is an aspherical surface by applying a resin layer.

The rear lens group G33 is composed of, in order from the object side along the optical axis, a positive meniscus lens L51 having a concave surface facing the object side, a double convex positive lens L52, and a cemented lens constructed by a double concave negative lens L53 cemented with a double convex positive lens L54. The positive meniscus lens L51 disposed to the most object side of the rear lens group G33 is a glass mold type aspherical lens whose object side lens surface is an aspherical surface. Light rays come out from the double convex positive lens L54 form an image on the image plane I.

In the zoom lens seen from another point of view according to Example 7 of the second embodiment, an antireflection coating described later is applied to the image side lens surface of the negative meniscus lens L21 in the second lens group G2 and the object side lens surface of the double concave negative lens L22 in the second lens group G2.

Various values associated with the zoom lens according to Example 7 of the second embodiment are listed in Table 7.

TABLE 7

(Specifications)
zoom ratio = 15.721

| | W | M | T |
|---|---|---|---|
| f = | 18.52363 | 104.52143 | 291.21725 |
| FNO = | 3.60558 | 5.69344 | 5.89616 |
| ω = | 38.89095 | 7.41882 | 2.71146 |
| Y = | 14.20 | 14.20 | 14.20 |
| TL = | 164.74420 | 225.48860 | 251.39424 |
| Bf = | 39.44250 | 71.57530 | 83.10134 |

(Lens Data)

| i | r | d | nd | vd |
|---|---|---|---|---|
| OP | ∞ | ∞ | | |
| 1 | 186.59960 | 2.20000 | 1.834000 | 37.17 |
| 2 | 69.08900 | 8.80000 | 1.497820 | 82.56 |
| 3 | −494.44545 | 0.10000 | | |
| 4 | 73.40222 | 6.45000 | 1.593190 | 67.87 |
| 5 | 2016.71160 | (d5) | | |
| 6* | 84.85000 | 0.10000 | 1.553890 | 38.09 |
| 7 | 74.02192 | 1.20000 | 1.834810 | 42.72 |
| 8 | 17.09747 | 6.95000 | | |
| 9 | −37.97970 | 1.00000 | 1.816000 | 46.63 |
| 10 | 77.67127 | 0.15000 | | |
| 11 | 36.26557 | 5.30000 | 1.784720 | 25.68 |
| 12 | −36.26557 | 0.80000 | | |
| 13 | −25.69642 | 1.00000 | 1.816000 | 46.63 |
| 14 | 66.08300 | 2.05000 | 1.808090 | 22.79 |
| 15 | −666.70366 | (d15) | | |
| 16 | ∞ | 1.00000 | Aperture Stop S | |
| 17 | 68.30727 | 3.40000 | 1.593190 | 67.87 |
| 18 | −47.99596 | 0.10000 | | |
| 19 | 68.52367 | 2.45000 | 1.487490 | 70.45 |
| 20 | −136.98392 | 0.10000 | | |
| 21 | 46.52671 | 4.20000 | 1.487490 | 70.45 |
| 22 | −36.16400 | 1.00000 | 1.808090 | 22.79 |
| 23 | −202.95328 | (d23) | | |
| 24* | −55.09840 | 0.20000 | 1.553890 | 38.09 |
| 25 | −57.24715 | 0.90000 | 1.696800 | 55.52 |
| 26 | 28.15100 | 2.15000 | 1.728250 | 28.46 |
| 27 | 87.70856 | 4.35000 | | |
| 28 | −26.69877 | 1.00000 | 1.729160 | 54.66 |
| 29 | −76.47707 | (d29) | | |
| 30* | −333.89500 | 4.65000 | 1.589130 | 61.18 |
| 31 | −24.64395 | 0.10000 | | |
| 32 | 31.19625 | 5.85000 | 1.487490 | 70.45 |
| 33 | −43.38887 | 1.45000 | | |

TABLE 7-continued

| 34 | −109.71645 | 1.00000 | 1.883000 | 40.77 |
| 35 | 20.29920 | 5.30000 | 1.548140 | 45.79 |
| 36 | −808.81321 | (Bf) | | |
| I | ∞ | | | |

(Aspherical Surface Data)

Surface Number = 6

κ = 1.0000          A4 = 3.13350E−06
A6 = 4.73080E−10    A8 = −3.40500E−11
A10 = 1.16620E−13

Surface Number = 24

κ = 1.0000          A4 = 5.24030E−06
A6 = −2.00730E−09   A8 = 0.00000E+00
A10 = 0.00000E+00

Surface Number = 30

κ = 1.0000          A4 = −1.54020E−05
A6 = 1.69500E−09    A8 = 1.34490E−11
A10 = −2.07220E−13

(Variable Distances)

| | W | M | T |
|---|---|---|---|
| d5 = | 2.15700 | 53.25650 | 76.94960 |
| d15 = | 33.80140 | 11.31350 | 2.00000 |
| d23 = | 3.45650 | 11.60170 | 13.04330 |
| d29 = | 10.58680 | 2.44160 | 1.00000 |
| Bf = | 39.44250 | 71.57530 | 83.10134 |

(Lens Group Data)

| Group | ST | Focal Length |
|---|---|---|
| 1 | 1 | 118.96910 |
| 2 | 6 | −15.62542 |
| 3 | 16 | 40.08868(W) |
| | | 33.90635(M) |
| | | 32.38356 (T) |
| 31 | 16 | 27.17463 |
| 32 | 24 | −25.41506 |
| 33 | 30 | 34.39022 |

(Values for Conditional Expressions)

| (2) | f1/fw = 6.423 |
| (3) | f1/ft = 0.409 |
| (4) | Δ1/f1 = 0.728 |
| (11) | ndN = 1.834000 (L11) |
| (12) | vdN = 37.17 (L11) |
| (14) | ndA' = 1.593190 (L13) |
| (14) | ndA' = 1.593190 (L31) |
| (15) | vdA' = 67.87 (L13) |
| (15) | vdA' = 67.87 (L31) |
| (16) | f3A'/f3 = 1.198 (L31) (W) |
| (16) | f3A'/f3 = 1.417 (L31) (M) |
| (16) | f3A'/f3 = 1.484 (L31) (T) |
| (17) | f1A'/f1 = 1.078 (L13) |
| (18) | φ1A'/fw = 2.915 (φ1A' = 54.00) (L13) |
| (19) | φ1A'/ft = 0.185 (φ1A' = 54.00) (L13) |
| (20) | vdB' = 82.52 (L12) |
| (21) | f31A'/f31 = 1.768 (L31) |

Figure 13A:
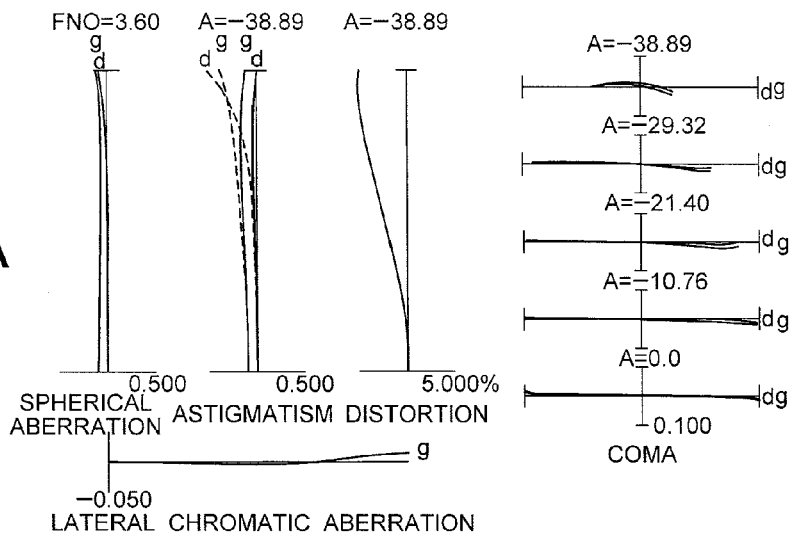
Figure 13B:
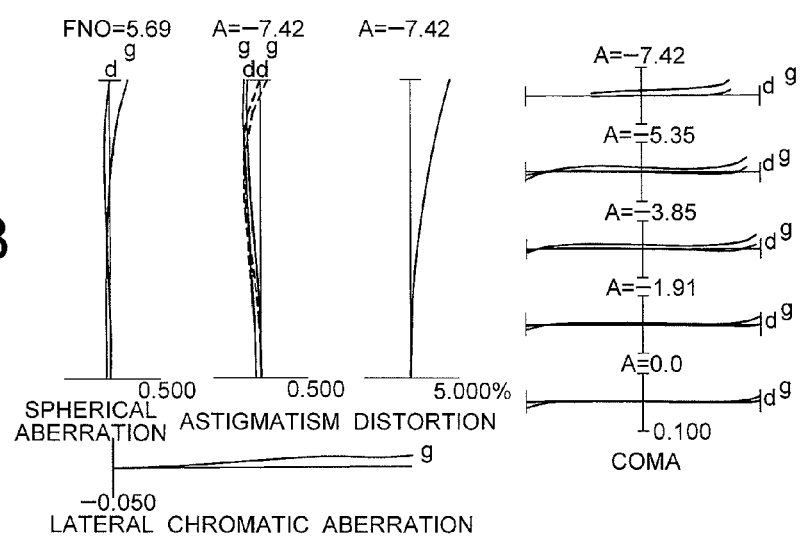
Figure 13C:
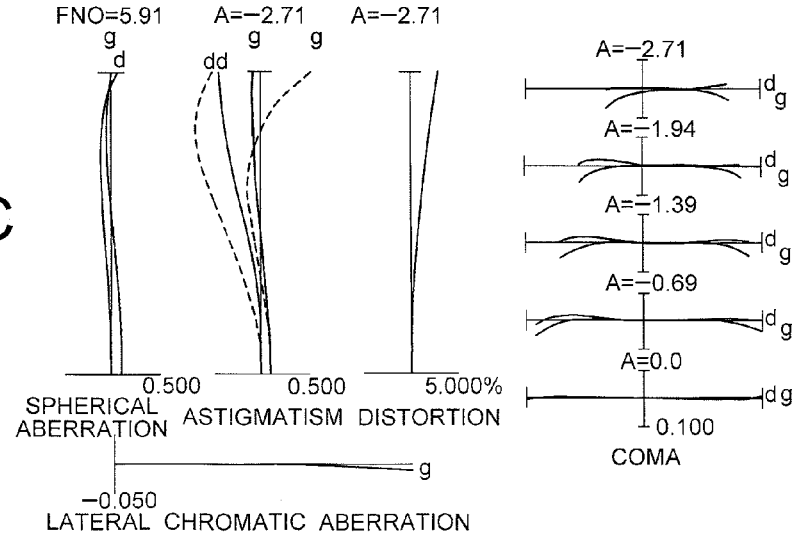

FIGS. 13A, 13B and 13C are graphs showing various aberrations of the zoom lens according to Example 7 of the second embodiment upon focusing on an infinitely distant object, in which FIG. 13A is a wide-angle end state, FIG. 13B is an intermediate focal length state, and FIG. 13C is a telephoto end state.

As is apparent from various graphs, the zoom lens according to Example 7 of the second embodiment shows superb optical performance as a result of good corrections to various aberrations.

Example 8

FIG. 6 is a sectional view showing a lens configuration of a zoom lens according to Example 8 of the second embodiment of the present application.

As shown in FIG. 6, the zoom lens according to Example 8 of the second embodiment is composed of, in order from an object side along an optical axis, a first lens group G1 having positive refractive power, a second lens group G2 having negative refractive power, and a third lens group G3 having positive refractive power. The third lens group G3 is composed of, in order from the object side along the optical axis, a front lens group G31 having positive refractive power, a middle lens group G32 having negative refractive power, and a rear lens group G33 having positive refractive power.

Upon zooming from a wide-angle end state W to a telephoto end state T, the first lens group G1 is moved monotonously to the object side, the second lens group G2 is moved at first to the image side and then to the object side, and the third lens group G3 is moved monotonously to the object side with respect to the image plane I such that a distance between the first lens group G1 and the second lens group G2 increases, and a distance between the second lens group G2 and the third lens group G3 decreases. Moreover, the front lens group G31, the middle lens group G32 and the rear lens group G33 are moved monotonously to the object side with respect to the image plane I such that a distance between the front lens group G31 and the middle lens group G32 increases, and a distance between the middle lens group G32 and the rear lens group G33 decreases.

An aperture stop S is disposed to the most object side of the third lens group G3, which is disposed to the image side of the second lens group G2, and formed in a body with the front lens group G31.

The first lens group G1 is composed of, in order from the object side along the optical axis, a cemented lens constructed by a negative meniscus lens L11 having a convex surface facing the object side cemented with a double convex positive lens L12, and a double convex positive lens L13.

The second lens group G2 is composed of, in order from the object side along the optical axis, a negative meniscus lens L21 having a convex surface facing the object side, a double concave negative lens L22, a double convex positive lens L23, and a cemented lens constructed by a double concave negative lens L24 cemented with a double convex positive lens L25. The negative meniscus lens L21 disposed to the most object side of the second lens group G2 is a compound type aspherical lens whose object side lens surface is formed as an aspherical surface by applying a resin layer.

The front lens group G31 is composed of, in order from the object side along the optical axis, a double convex positive lens L31, a double convex positive lens L32, and a cemented lens constructed by a double convex positive lens L33 cemented with a negative meniscus lens L34 having a concave surface facing the object side. The double convex positive lens L31 is the positive lens A' satisfying conditional expressions (14) and (15).

The middle lens group G32 is composed of, in order from the object side along the optical axis, a cemented lens constructed by a double concave negative lens L41 cemented with a positive meniscus lens L42 having a convex surface facing the object side, and a negative meniscus lens L43 having a concave surface facing the object side. The double concave negative lens L41 disposed to the most object side of the middle lens group G32 is a glass mold type aspherical lens whose object side lens surface is an aspherical surface.

The rear lens group G33 is composed of, in order from the object side along the optical axis, a positive meniscus lens L51 having a concave surface facing the object side, a double convex positive lens L52, and a cemented lens constructed by a double concave negative lens L53 cemented with a double convex positive lens L54. The positive meniscus lens L51 disposed to the most object side of the rear lens group G33 is a glass mold type aspherical lens whose object side lens surface is an aspherical surface.

Light rays come out from the double convex positive lens L54 form an image on the image plane I.

In the zoom lens seen from another point of view according to Example 8 of the second embodiment, an antireflection coating described later is applied to the image side lens surface of the double convex positive lens L12 in the first lens group G1 and the object side lens surface of the double concave negative lens L24 in the second lens group G2.

Various values associated with the zoom lens according to Example 8 of the second embodiment are listed in Table 8.

TABLE 8

(Specifications)
zoom ratio = 15.714

|  | W | M | T |
|---|---|---|---|
| f = | 18.55566 | 103.95947 | 291.57591 |
| FNO = | 3.63338 | 5.62730 | 5.88308 |
| ω = | 38.94112 | 7.46798 | 2.71133 |
| Y = | 14.20 | 14.20 | 14.20 |
| TL = | 163.38092 | 225.17861 | 252.25324 |
| Bf = | 39.17162 | 70.49651 | 82.47674 |

(Lens Data)

| i | r | d | nd | νd |
|---|---|---|---|---|
| OP | ∞ | ∞ | | |
| 1 | 193.38060 | 2.00000 | 1.883000 | 40.77 |
| 2 | 66.83560 | 9.23080 | 1.437000 | 95.00 |
| 3 | −341.14920 | 0.10000 | | |
| 4 | 68.78950 | 6.98760 | 1.603000 | 65.47 |
| 5 | −2649.89320 | (d5) | | |
| 6* | 84.76870 | 0.15000 | 1.553890 | 38.09 |
| 7 | 73.93750 | 1.20000 | 1.834810 | 42.72 |
| 8 | 16.94820 | 6.42970 | | |
| 9 | −53.17850 | 1.00000 | 1.816000 | 46.63 |
| 10 | 46.70940 | 0.15000 | | |
| 11 | 30.63920 | 5.37880 | 1.761820 | 26.56 |
| 12 | −48.96880 | 1.39690 | | |
| 13 | −24.42250 | 1.00000 | 1.816000 | 46.63 |
| 14 | 69.10450 | 2.52380 | 1.808090 | 22.79 |
| 15 | −121.94360 | (d15) | | |
| 16 | ∞ | 1.00000 | Aperture Stop S | |
| 17 | 66.08180 | 3.43590 | 1.592820 | 68.69 |
| 18 | −50.37120 | 0.10000 | | |
| 19 | 59.42650 | 2.78060 | 1.487490 | 70.45 |
| 20 | −108.47870 | 0.10000 | | |
| 21 | 49.67940 | 4.11660 | 1.487490 | 70.45 |
| 22 | −33.83640 | 1.00000 | 1.808090 | 22.79 |
| 23 | −167.67900 | (d23) | | |
| 24* | −64.89240 | 1.00000 | 1.693500 | 53.22 |
| 25 | 27.12400 | 2.14440 | 1.761820 | 26.56 |
| 26 | 65.84410 | 4.73170 | | |
| 27 | −25.14850 | 1.00000 | 1.729160 | 54.66 |
| 28 | −73.72860 | (d28) | | |
| 29* | −448.31420 | 3.90050 | 1.589130 | 61.18 |
| 30 | −23.64180 | 0.10000 | | |
| 31 | 37.43750 | 4.98090 | 1.487490 | 70.45 |
| 32 | −44.96410 | 1.73250 | | |
| 33 | −102.62990 | 1.00000 | 1.883000 | 40.77 |
| 34 | 23.17730 | 4.51170 | 1.548140 | 45.79 |
| 35 | −619.02620 | (Bf) | | |
| I | ∞ | | | |

(Aspherical Surface Data)

Surface Number = 6

κ = 1.0000  A4 = 4.16398E−06
A6 = −7.55222E−09  A8 = −2.91689E−12
A10 = 5.62106E−14

Surface Number = 24

κ = 1.0000  A4 = 3.83569E−06
A6 = −1.03578E−09  A8 = 0.00000E+00

TABLE 8-continued

A10 = 0.00000E+00

Surface Number = 29

κ = 1.0000               A4 = −1.60868E−05
A6 = 8.16360E−09         A8 = −3.55020E−11
A10 = 7.60058E−14

(Variable Distances)

|       | W        | M        | T        |
|-------|----------|----------|----------|
| d5 =  | 2.12700  | 55.32280 | 79.77200 |
| d15 = | 34.07780 | 11.35470 | 2.00000  |
| d23 = | 3.36200  | 10.67670 | 11.82210 |
| d2 =  | 9.46010  | 2.14550  | 1.00000  |
| Bf =  | 39.17162 | 70.49651 | 82.47674 |

(Lens Group Data)

| Group | ST | Focal Length |
|-------|----|--------------|
| 1     | 1  | 120.77885    |
| 2     | 6  | −15.59572    |
| 3     | 16 | 39.12629(W)  |
|       |    | 32.72813(M)  |
|       |    | 31.47773 (T) |
| 31    | 16 | 26.38558     |
| 32    | 24 | −24.49396    |
| 33    | 29 | 34.76717     |

(Values for Conditional Expressions)

| (2)  | f1/fw = 6.509           |
|------|-------------------------|
| (3)  | f1/ft = 0.414           |
| (4)  | A1/f1 = 0.736           |
| (11) | ndN = 1.883000 (L11)    |
| (12) | vdN = 40.77 (L11)       |
| (14) | ndA' = 1.592820 (L31)   |
| (15) | vdA' = 68.69 (L31)      |
| (16) | f3A'/f3 = 1.246 (L31) (W) |
| (16) | f3A'/f3 = 1.490 (L31) (M) |
| (16) | f3A'/f3 = 1.549 (L31) (T) |
| (20) | vdB' = 95.00 (L12)      |
| (21) | f31A'/f31 = 1.848 (L31) |

FIGS. 7A, 7B and 7C are graphs showing various aberrations of the zoom lens according to Example 8 of the second embodiment upon focusing on an infinitely distant object, in which FIG. 7A is a wide-angle end state, FIG. 7B is an intermediate focal length state, and FIG. 7C is a telephoto end state.

As is apparent from various graphs, the zoom lens according to Example 8 of the second embodiment shows superb optical performance as a result of good corrections to various aberrations.

Then, an outline of a method for manufacturing a zoom lens according to the second embodiment is explained.

Figure 25:
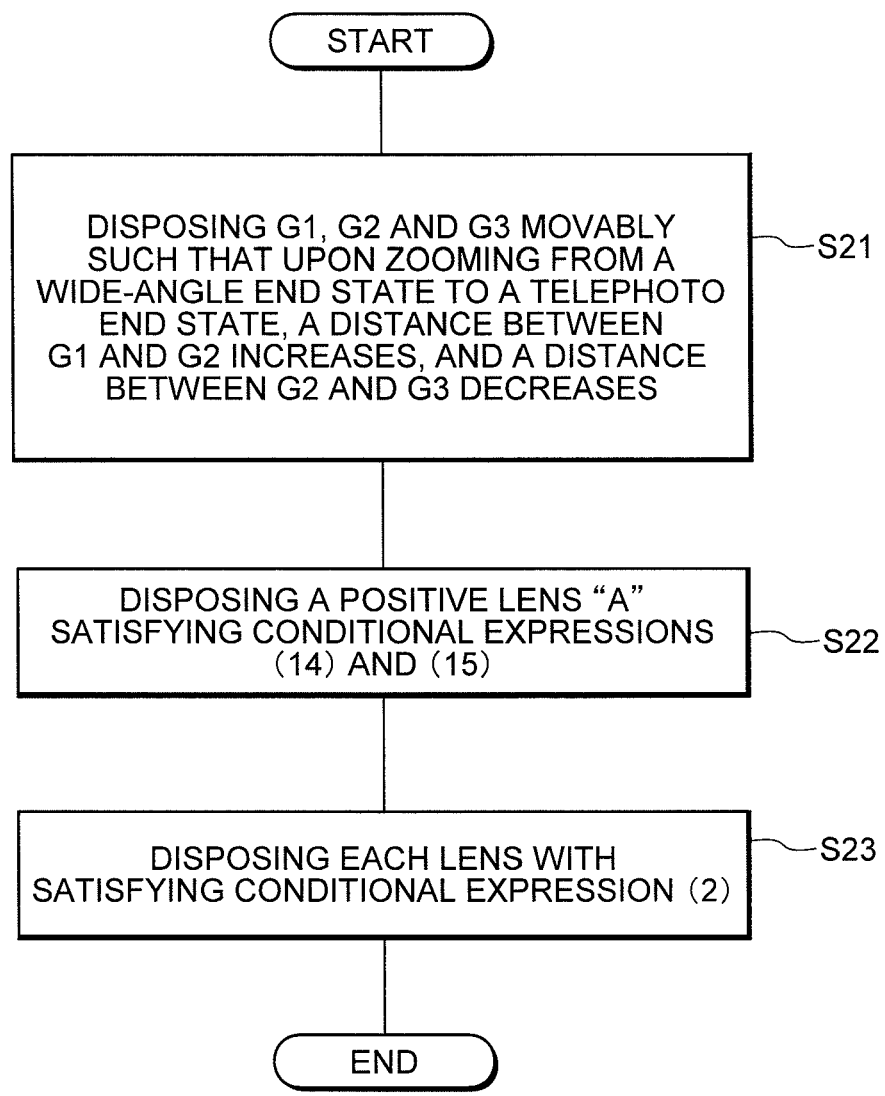
FIG. 25 is a flowchart schematically explaining a method for manufacturing the zoom lens according to the second embodiment.

FIG. 25 is a flowchart schematically explaining a method for manufacturing the zoom lens according to the second embodiment.

The method for manufacturing a zoom lens according to the second embodiment is a method for manufacturing a zoom lens including, in order from an object side along an optical axis, a first lens group G1 having positive refractive power, a second lens group G2 having negative refractive power, and a third lens group G3 having positive refractive power, and being constructed such that at least one optical surface in the first lens group and the second lens group is applied with an antireflection coating, and the antireflection coating includes at least one layer that is formed by a wet process, the method including steps S21 through S23 shown in FIG. 25.

Step S21: disposing the first lens group G1, the second lens group G2 and the third lens group G3 movably such that upon zooming from a wide-angle end state to a telephoto end state, a distance between the first lens group and the second lens group increases, and a distance between the second lens group and the third lens group decreases.

Step S22: disposing a positive lens A' satisfying the following conditional expressions (14) and (15):

$$1.540 < ndA' \quad (14)$$

$$66.5 < vdA' \quad (15)$$

where ndA' denotes a refractive index at d-line (wavelength λ=587.6 nm) of a material of the positive lens A', and vdA' denotes an Abbe number at d-line (wavelength λ=587.6 nm) of a material of the positive lens A'.

Step S23: disposing each lens with satisfying the following conditional expression (2):

$$3.90 < f1/fw < 11.00 \quad (2)$$

where fw denotes a focal length of the zoom lens in the wide-angle end state, and f1 denotes a focal length of the first lens group.

With this method for manufacturing a zoom lens according to the second embodiment, it becomes possible to manufacture a zoom lens having excellent optical performance with suppressing variations in aberrations and ghost images and flare.

Third Embodiment

A zoom lens according to a third embodiment of the present application is explained below.

A zoom lens according to the third embodiment of the present application includes, in order from an object side along an optical axis, a first lens group having positive refractive power, a second lens group having negative refractive power, and a third lens group having positive refractive power. Upon zooming from a wide-angle end state to a telephoto end state, a distance between the first lens group and the second lens group increases, and a distance between the second lens group and the third lens group decreases. With this configuration, it becomes possible to realize a zoom lens, and, at the same time, suppress variation in distortion generated upon zooming.

In a zoom lens according to the third embodiment, the first lens group includes a plurality of positive lenses that satisfy the following conditional expressions (22) and (23), and satisfies the following conditional expression (3):

$$66.5 < vdA'' \text{ when } 1.540 \leq ndA''$$

$$75.0 < vdA'' \text{ when } ndA'' < 1.540 \quad (22)$$

$$4.75 < f1/fw < 11.00 \quad (23)$$

$$0.28 < f1/ft < 0.52 \quad (3)$$

where ndA'' denotes a refractive index at d-line (wavelength λ=587.6 nm) of a material of each of a plurality of positive lenses in the first lens group, vdA'' denotes an Abbe number at d-line (wavelength λ=587.6 nm) of a material of each of a plurality of positive lenses in the first lens group, fw denotes a focal length of the zoom lens in the wide-angle end state, ft denotes a focal length of the zoom lens in the telephoto end state, and f1 denotes a focal length of the first lens group.

Conditional expression (22) defines an optimum Abbe number of the material of each of the plurality of positive lenses in the first lens group, and is for realizing high optical performance with suppressing variations in longitudinal chromatic aberration and lateral chromatic aberration generated upon zooming from the wide-angle end state to the telephoto end state.

When the value vdA" is equal to or falls below the lower limit of conditional expression (22), it becomes difficult to suppress variations in longitudinal chromatic aberration and lateral chromatic aberration. The material becomes a one having small anomalous dispersion, so that variation in secondary order of chromatic aberration becomes difficult to be suppressed. In addition, longitudinal chromatic aberration and lateral chromatic aberration in visible light range become large in the telephoto end state, so that high optical performance cannot be obtained.

In order to secure the effect of the third embodiment, it is preferable to set the lower limit of conditional expression (22) to 67.5 when 1.540≤ndA". In order to secure the effect of the third embodiment, it is preferable to set the lower limit of conditional expression (22) to 80.5 when ndA"<1.540.

Conditional expression (23) defines an optimum range of the focal length of the first lens group, and is for realizing high optical performance with suppressing variations in chromatic aberration and off-axis aberrations generated upon zooming from the wide-angle end state to the telephoto end state.

When the ratio f1/fw is equal to or falls below the lower limit of conditional expression (23), refractive power of the first lens group becomes strong, so that it becomes difficult to suppress variation in lateral chromatic aberration and off-axis aberrations, in particular, astigmatism. As a result, high optical performance cannot be realized.

On the other hand, when the ratio f1/fw is equal to or exceeds the upper limit of conditional expression (23), refractive power of the first lens group becomes weak, so that in order to obtain a given zoom ratio, a moving amount of the first lens group with respect to the image plane has to be large. Accordingly, variation in the height from the optical axis of the off-axis ray becomes large. As a result, variations in lateral chromatic aberration and off-axis aberrations, in particular, astigmatism cannot be suppressed, so that high optical performance cannot be realized.

In order to secure the effect of the third embodiment, it is preferable to set the lower limit of conditional expression (23) to 5.10.

In order to secure the effect of the third embodiment, it is preferable to set the upper limit of conditional expression (23) to 8.80. In order to further secure the effect of the third embodiment, it is most preferable to set the upper limit of conditional expression (23) to 7.60.

Conditional expression (3) defines an appropriate range of an optimum focal length of the first lens group, and is for realizing high optical performance with suppressing variations in chromatic aberration and off-axis aberrations generated upon zooming from the wide-angle end state to the telephoto end state. However, conditional expression (3) has already been explained above, so that duplicated explanations are omitted.

In a zoom lens according to the third embodiment, the following conditional expression (4) is preferably satisfied:

$$0.25 < \Delta 1/f1 < 1.10 \quad (4)$$

where Δ1 denotes a moving amount of the first lens group with respect to the image plane upon zooming from the wide-angle end state to the telephoto end state.

Conditional expression (4) defines an optimum moving amount of the first lens group with respect to the image plane upon zooming from the wide-angle end state to the telephoto end state, and is for realizing high optical performance with suppressing variations in chromatic aberration and off-axis aberrations generated upon zooming. However, conditional expression (4) has already been explained above, so that duplicated explanations are omitted.

In a zoom lens according to the third embodiment, the following conditional expression (24) is preferably satisfied:

$$0.65 < f1A''/f1 < 1.75 \quad (24)$$

where f1A" denotes a focal length of each of the plurality of positive lenses in the first lens group.

Conditional expression (24) defines optimum focal length of each of the plurality of positive lenses in the first lens group, and is for realizing high optical performance with suppressing variations in chromatic aberration and off-axis aberrations generated upon zooming.

When the ratio f1A"/f1 is equal to or falls below the lower limit of conditional expression (24), refractive power of each of the plurality of positive lens becomes strong, so that upon zooming from the wide-angle end state to the telephoto end state, variation in refractive power in accordance with variation in the height from the optical axis of the off-axis ray passing through the first lens group becomes large. As a result, it becomes difficult to suppress variations in lateral chromatic aberration and off-axis aberrations, in particular, astigmatism, so that high optical performance cannot be realized.

On the other hand, when the ratio f1A"/f1 is equal to or exceeds the upper limit of conditional expression (24), refractive power of each of the plurality of positive lens becomes weak, so that it becomes difficult to suppress variations in chromatic aberration and off-axis aberrations, in particular, astigmatism. Accordingly, high optical performance cannot be realized.

In order to secure the effect of the third embodiment, it is preferable to set the lower limit of conditional expression (24) to 0.80.

In order to secure the effect of the third embodiment, it is preferable to set the upper limit of conditional expression (24) to 1.35.

In a zoom lens according to the third embodiment, the following conditional expression (25) is preferably satisfied:

$$1.75 < \phi 1A''/fw < 4.50 \quad (25)$$

where φ1A" denotes an effective diameter of each of the plurality of positive lenses in the first lens group.

Conditional expression (25) defines an optimum effective diameter of each of the plurality of positive lenses in the first lens group, and is for realizing high optical performance with suppressing variations in chromatic aberration and off-axis aberrations generated upon zooming.

When the ratio φ1A"/fw is equal to or falls below the lower limit of conditional expression (25), upon zooming from the wide-angle end state to the telephoto end state, variation in the height from the optical axis of the off-axis ray passing through the plurality of positive lenses in the first lens group becomes small, so that it becomes difficult to suppress variations in off-axis aberrations, in particular, astigmatism. Accordingly, high optical performance cannot be realized.

On the other hand, when the ratio φ1A"/fw is equal to or exceeds the upper limit of conditional expression (25), upon zooming from the wide-angle end state to the telephoto end state, variation in the height from the optical axis of the off-axis ray passing through the plurality of positive lenses in the first lens group becomes large, so that it becomes difficult to suppress variations in lateral chromatic aberration and off-axis aberrations, in particular, astigmatism. Accordingly, high optical performance cannot be realized.

In order to secure the effect of the third embodiment, it is preferable to set the lower limit of conditional expression (25) to 2.45.

In order to secure the effect of the third embodiment, it is preferable to set the upper limit of conditional expression (25) to 3.80.

In a zoom lens according to the third embodiment, the number of the plurality of positive lenses in the first lens group is preferably two.

With this configuration, it becomes possible to suppress the thickness of the first lens group, so that it becomes possible to suppress variation in the height from the optical axis of the off-axis ray passing through the most object side surface of the first lens group. As a result, it becomes possible to suppress variations in off-axis aberrations, in particular, astigmatism, so that high optical performance can be realized.

In a zoom lens according to the third embodiment, the first lens group preferably include a negative lens that satisfies the following conditional expressions (11) and (12):

$$1.750 < ndN \tag{11}$$

$$28.0 < vdN < 50.0 \tag{12}$$

where ndN denotes a refractive index at d-line (wavelength λ=587.6 nm) of a material of a negative lens in the first lens group, and vdN denotes an Abbe number at d-line (wavelength λ=587.6 nm) of the material of the negative lens in the first lens group.

Conditional expression (11) defines an optimum range of the refractive index in the negative lens in the first lens group, and is for realizing high optical performance with suppressing variations in off-axis aberrations generated upon zooming from the wide-angle end state to the telephoto end state. However, conditional expression (11) has already been explained above, so that duplicated explanations are omitted.

Conditional expression (12) defines an optimum Abbe number of the material of the negative lens in the first lens group, and is for realizing high optical performance with suppressing variation in chromatic aberration generated upon zooming from the wide-angle end state to the telephoto end state. However, conditional expression (12) has already been explained above, so that duplicated explanations are omitted.

In a zoom lens according to the third embodiment, the number of the negative lens in the first lens group is preferably one.

With this configuration, it becomes possible to suppress the thickness of the first lens group, so that upon zooming from the wide-angle end state to the telephoto end state, variation in the height from the optical axis of the off-axis ray passing through the most object side surface of the first lens group can be suppressed. Variations in off-axis aberrations, in particular, astigmatism can be suppressed, so that high optical performance can be realized.

In a zoom lens according to the third embodiment, the third lens group preferably satisfies the following conditional expression (26):

$$65.5 < vd3 \tag{26}$$

where vd3 denotes an Abbe number at d-line (wavelength λ=587.6 nm) of the material of the positive lens in the third lens group.

Conditional expression (26) defines an optimum Abbe number of the material of the positive lens in the third lens group, and for realizing high optical performance with suppressing variation in chromatic aberration generated upon zooming from the wide-angle end state to the telephoto end state.

When the value vd3 is equal to or falls below the lower limit of conditional expression (26), it becomes difficult to suppress variations in longitudinal chromatic aberration and lateral chromatic aberration. The material becomes a one having small anomalous dispersion, so that variation in secondary order of chromatic aberration becomes difficult to be suppressed. In addition, longitudinal chromatic aberration and lateral chromatic aberration in visible light range become large in the telephoto end state, so that high optical performance cannot be obtained.

In a zoom lens according to the third embodiment, it is preferable that the third lens group includes, in order from the object side, a front lens group having positive refractive power and a rear lens group having positive refractive power, and a distance between the front lens group and the rear lens group decreases upon zooming from the wide-angle end state to the telephoto end state.

With this configuration, zooming efficiency of the third lens group can be enhanced better than a configuration that the third lens group is moved in a body upon zooming. Moreover, high optical performance can be realized with suppressing variations in spherical aberration, coma and astigmatism.

In a zoom lens according to the third embodiment, it is preferable that the third lens group includes, in order from the object side, a front lens group having positive refractive power, a middle lens group having negative refractive power, and a rear lens group having positive refractive power, and a distance between the front lens group and the middle lens group varies, and a distance between the middle lens group and the rear lens group varies upon zooming from the wide-angle end state to the telephoto end state.

With this configuration, variations in aberrations generated in the third lens group can be suppressed better than a configuration that the third lens group is moved in a body upon zooming, so that high optical performance can be realized with suppressing in particular spherical aberration, coma and astigmatism.

In a zoom lens according to the third embodiment, it is preferable that a distance between the front lens group and the middle lens group increases, and a distance between the middle lens group and the rear lens group decreases.

With this configuration, zooming efficiency of the third lens group can be enhanced, so that high optical performance can be realized with suppressing variations in spherical aberration, coma and astigmatism.

Then, a zoom lens seen from another point of view according to the third embodiment of the present application is explained below.

A zoom lens seen from another point of view according to the third embodiment of the present application includes, in order from an object side along an optical axis, a first lens group having positive refractive power, a second lens group having negative refractive power, and a third lens group having positive refractive power. Upon zooming from a wide-angle end state to a telephoto end state, a distance between the first lens group and the second lens group increases, and a distance between the second lens group and the third lens group decreases. With this configuration, it becomes possible to realize a zoom lens, and, at the same time, suppress variation in distortion generated upon zooming.

In a zoom lens seen from another point of view according to the third embodiment, the first lens group includes a plurality of positive lenses that satisfy the following conditional expressions (22) and (23), and satisfies the following conditional expression (3):

$$66.5 < vdA'' \text{ when } 1.540 \leq ndA''$$

$$75.0 < vdA'' \text{ when } ndA'' < 1.540 \tag{22}$$

$$4.75 < f1/fw < 11.00 \tag{23}$$

$$0.28 < f1/ft < 0.52 \tag{3}$$

where ndA" denotes a refractive index at d-line (wavelength λ=587.6 nm) of a material of each of a plurality of positive lenses in the first lens group, vdA" denotes an Abbe number at d-line (wavelength λ=587.6 nm) of a material of each of a plurality of positive lenses in the first lens group, fw denotes a focal length of the zoom lens in the wide-angle end state, ft denotes a focal length of the zoom lens in the telephoto end state, and f1 denotes a focal length of the first lens group.

Conditional expression (22) defines an optimum Abbe number of the material of each of the plurality of positive lenses in the first lens group, and is for realizing high optical performance with suppressing variations in longitudinal chromatic aberration and lateral chromatic aberration generated upon zooming from the wide-angle end state to the telephoto end state. However, conditional expression (22) has already been explained above, so that duplicated explanations are omitted.

Conditional expression (23) defines an optimum range of the focal length of the first lens group, and is for realizing high optical performance with suppressing variations in chromatic aberration and off-axis aberrations generated upon zooming from the wide-angle end state to the telephoto end state. However, conditional expression (23) has already been explained above, so that duplicated explanations are omitted.

Conditional expression (3) defines an appropriate range of an optimum focal length of the first lens group, and is for realizing high optical performance with suppressing variations in chromatic aberration and off-axis aberrations generated upon zooming from the wide-angle end state to the telephoto end state. However, conditional expression (3) has already been explained above, so that duplicated explanations are omitted.

In a zoom lens seen from another point of view according to the third embodiment of the present application, at least one optical surface among the first lens group and the second lens group is applied with an antireflection coating, and the antireflection coating includes at least one layer that is formed by a wet process. With this configuration, a zoom lens seen from another point of view according to the third embodiment of the present application makes it possible to suppress ghost images and flare generated by the light rays from the object reflected from the optical surfaces, thereby realizing excellent optical performance.

Moreover, in a zoom lens seen from another point of view according to the third embodiment of the present application, the antireflection coating is a multilayer film, and the layer formed by the wet process is preferably the outermost layer among the layers composing the multilayer film. With this configuration, since difference in refractive index with respect to the air can be small, reflection of light can be small, so that ghost images and flare can further be suppressed.

In a zoom lens seen from another point of view according to the third embodiment of the present application, when a refractive index at d-line of the layer formed by the wet process is denoted by nd, the refractive index nd is preferably 1.30 or less. With this configuration, since difference in refractive index with respect to the air can be small, reflection of light can be small, so that ghost images and flare can further be suppressed.

Moreover, in a zoom lens seen from another point of view according to the third embodiment of the present application, the optical surface on which the antireflection coating is formed is preferably a concave surface seen from an aperture stop. Since reflection light rays are liable to be generated on a concave surface seen from the aperture stop among optical surfaces in the first lens group and the second lens group, with applying the antireflection coating on such an optical surface, ghost images and flare can effectively be suppressed.

In a zoom lens seen from another point of view according to the third embodiment, it is desirable that, the concave surface on which the antireflection coating is applied as seen from the aperture stop is an image side lens surface. Since the image side concave surface as seen from the aperture stop among optical surfaces in the first lens group and the second lens group tends to generate reflection light, with applying the antireflection coating on such an optical surface, ghost images and flare can effectively be suppressed.

In a zoom lens seen from another point of view according to the third embodiment, it is desirable that, the concave surface on which the antireflection coating is applied as seen from the aperture stop is an object side lens surface. Since the object side concave surface as seen from the aperture stop among optical surfaces in the first lens group and the second lens group tends to generate reflection light, with applying the antireflection coating on such an optical surface, ghost images and flare can effectively be suppressed.

Moreover, in a zoom lens seen from another point of view according to the third embodiment of the present application, the optical surface on which the antireflection coating is formed is preferably a concave surface seen from an object side. Since reflection light rays are liable to be generated on a concave surface seen from the object among optical surfaces in the first lens group and the second lens group, with applying the antireflection coating on such an optical surface, ghost images and flare can effectively be suppressed.

Moreover, in a zoom lens seen from another point of view according to the third embodiment of the present application, the concave optical surface seen from the object on which the antireflection coating is formed is preferably an image side lens surface of the image side second lens from the most object side lens in the first lens group. Since reflection light rays are liable to be generated on the image side lens surface of the image side second lens from the most object side lens in the first lens group, with applying the antireflection coating on such an optical surface, ghost images and flare can effectively be suppressed.

Moreover, in a zoom lens seen from another point of view according to the third embodiment of the present application, the concave optical surface seen from the object on which the antireflection coating is formed is preferably an object side lens surface of the image side second lens from the most object side lens in the second lens group. Since reflection light rays are liable to be generated on the object side lens surface of the image side second lens from the most object side lens in the second lens group, with applying the antireflection coating on such an optical surface, ghost images and flare can effectively be suppressed.

Moreover, in a zoom lens seen from another point of view according to the third embodiment of the present application, the concave optical surface seen from the object on which the antireflection coating is formed is preferably an image side lens surface of the image side third lens from the most object side lens in the second lens group. Since reflection light rays are liable to be generated on the image side lens surface of the image side third lens from the most object side lens in the second lens group, with applying the antireflection coating on such an optical surface, ghost images and flare can effectively be suppressed.

Moreover, in a zoom lens seen from another point of view according to the third embodiment of the present application, the concave optical surface seen from the object on which the antireflection coating is formed is preferably an object side lens surface of the image side fourth lens from the most object side lens in the second lens group. Since reflection light rays are liable to be generated on the object side lens surface of the image side fourth lens from the most object side lens in the second lens group, with applying the antireflection coating on such an optical surface, ghost images and flare can effectively be suppressed.

In a zoom lens seen from another point of view according to the third embodiment, the antireflection coating may also be formed by a dry process etc without being limited to the wet process. On this occasion, it is preferable that the antireflection coating contains at least one layer of which the refractive index is equal to 1.30 or less. Thus, the same effects as in the case of using the wet process can be obtained by forming the antireflection coating based on the dry process etc. Note that at this time the layer of which the refractive index is equal to 1.30 or less is preferably the layer of the outermost surface of the layers composing the multi layer film.

In a zoom lens seen from another point of view according to the third embodiment, the following conditional expression (4) is preferably satisfied:

$$0.25 < \Delta 1/f1 < 1.10 \quad (4)$$

where $\Delta 1$ denotes a moving amount of the first lens group with respect to the image plane upon zooming from the wide-angle end state to the telephoto end state.

Conditional expression (4) defines an optimum moving amount of the first lens group with respect to the image plane upon zooming from the wide-angle end state to the telephoto end state. However, conditional expression (4) has already been explained above, so that duplicated explanations are omitted.

In a zoom lens seen from another point of view according to the third embodiment, the following conditional expression (24) is preferably satisfied:

$$0.65 < f1A''/f1 < 1.75 \quad (24)$$

where f1A" denotes a focal length of each of the plurality of positive lenses in the first lens group.

Conditional expression (24) defines optimum focal length of each of the plurality of positive lenses in the first lens group, and is for realizing high optical performance with suppressing variations in chromatic aberration and off-axis aberrations generated upon zooming. However, conditional expression (24) has already been explained above, so that duplicated explanations are omitted.

In a zoom lens seen from another point of view according to the third embodiment, the following conditional expression (25) is preferably satisfied:

$$1.75 < \phi 1A''/fw < 4.50 \quad (25)$$

where $\phi 1A''$ denotes an effective diameter of each of the plurality of positive lenses in the first lens group.

Conditional expression (25) defines an optimum effective diameter of each of the plurality of positive lenses in the first lens group, and is for realizing high optical performance with suppressing variations in chromatic aberration and off-axis aberrations generated upon zooming. However, conditional expression (25) has already been explained above, so that duplicated explanations are omitted.

In a zoom lens seen from another point of view according to the third embodiment, the number of the plurality of positive lenses in the first lens group is preferably two.

With this configuration, it becomes possible to suppress the thickness of the first lens group, so that it becomes possible to suppress variation in the height from the optical axis of the off-axis ray passing through the most object side surface of the first lens group. As a result, it becomes possible to suppress variations in off-axis aberrations, in particular, astigmatism, so that high optical performance can be realized.

In a zoom lens seen from another point of view according to the third embodiment, the first lens group preferably include a negative lens that satisfies the following conditional expressions (11) and (12):

$$1.750 < ndN \quad (11)$$

$$28.0 < vdN < 50.0 \quad (12)$$

where ndN denotes a refractive index at d-line (wavelength $\lambda=587.6$ nm) of a material of a negative lens in the first lens group, and vdN denotes an Abbe number at d-line (wavelength $\lambda=587.6$ nm) of the material of the negative lens in the first lens group.

Conditional expression (11) defines an optimum range of the refractive index in the negative lens in the first lens group, and is for realizing high optical performance with suppressing variations in off-axis aberrations generated upon zooming from the wide-angle end state to the telephoto end state. However, conditional expression (11) has already been explained above, so that duplicated explanations are omitted.

Conditional expression (12) defines an optimum Abbe number of the material of the negative lens in the first lens group, and is for realizing high optical performance with suppressing variation in chromatic aberration generated upon zooming from the wide-angle end state to the telephoto end state. However, conditional expression (12) has already been explained above, so that duplicated explanations are omitted.

In a zoom lens seen from another point of view according to the third embodiment, the number of the negative lens in the first lens group is preferably one.

With this configuration, it becomes possible to suppress the thickness of the first lens group, so that upon zooming from a wide-angle end state to a telephoto end state it becomes possible to suppress variation in the height from the optical axis of the off-axis ray passing through the most object side surface of the first lens group. As a result, it becomes possible to suppress variations in off-axis aberrations, in particular, astigmatism, so that high optical performance can be realized.

In a zoom lens seen from another point of view according to the third embodiment, the third lens group preferably satisfies the following conditional expression (26):

$$65.5 < vd3 \qquad (26)$$

where vd3 denotes an Abbe number at d-line (wavelength λ=587.6 nm) of the material of the positive lens in the third lens group.

Conditional expression (26) defines an optimum Abbe number of the material of the positive lens in the third lens group, and for realizing high optical performance with suppressing variation in chromatic aberration generated upon zooming from the wide-angle end state to the telephoto end state. However, conditional expression (26) has already been explained above, so that duplicated explanations are omitted.

In a zoom lens seen from another point of view according to the third embodiment, it is preferable that the third lens group includes, in order from the object side, a front lens group having positive refractive power and a rear lens group having positive refractive power, and a distance between the front lens group and the rear lens group decreases upon zooming from the wide-angle end state to the telephoto end state.

With this configuration, zooming efficiency of the third lens group can be enhanced better than a configuration that the third lens group is moved in a body upon zooming. Moreover, high optical performance can be realized with suppressing variations in spherical aberration, coma and astigmatism.

In a zoom lens seen from another point of view according to the third embodiment, it is preferable that the third lens group includes, in order from the object side, a front lens group having positive refractive power, a middle lens group having negative refractive power, and a rear lens group having positive refractive power, and a distance between the front lens group and the middle lens group varies, and a distance between the middle lens group and the rear lens group varies upon zooming from the wide-angle end state to the telephoto end state.

With this configuration, variations in aberrations generated in the third lens group can be suppressed better than a configuration that the third lens group is moved in a body upon zooming, so that high optical performance can be realized with suppressing in particular spherical aberration, coma and astigmatism.

In a zoom lens seen from another point of view according to the third embodiment, it is preferable that upon zooming from a wide-angle end state to a telephoto end state a distance between the front lens group and the middle lens group increases, and a distance between the middle lens group and the rear lens group decreases.

With this configuration, zooming efficiency of the third lens group can be enhanced, so that high optical performance can be realized with suppressing variations in spherical aberration, coma and astigmatism.

Then, a zoom lens according to each Example of the third embodiment is explained below with reference to accompanying drawings. Incidentally, detailed explanation of an antireflection coating will be explained separately after Example 12 of the third embodiment.

Example 9

FIG. 12 is a sectional view showing a lens configuration of a zoom lens according to Example 9 of the third embodiment of the present application.

As shown in FIG. 12, the zoom lens according to Example 9 of the third embodiment is composed of, in order from an object side along an optical axis, a first lens group G1 having positive refractive power, a second lens group G2 having negative refractive power, and a third lens group G3 having positive refractive power. The third lens group G3 is composed of, in order from the object side along the optical axis, a front lens group G31 having positive refractive power, a middle lens group G32 having negative refractive power, and a rear lens group G33 having positive refractive power.

Upon zooming from a wide-angle end state W to a telephoto end state T, the first lens group G1 is moved monotonously to the object side, the second lens group G2 is moved at first to the image side and then to the object side, and the third lens group G3 is moved monotonously to the object side with respect to the image plane I such that a distance between the first lens group G1 and the second lens group G2 increases, and a distance between the second lens group G2 and the third lens group G3 decreases. Moreover, the front lens group G31, the middle lens group G32 and the rear lens group G33 are moved monotonously to the object side with respect to the image plane I such that a distance between the front lens group G31 and the middle lens group G32 increases, and a distance between the middle lens group G32 and the rear lens group G33 decreases.

An aperture stop S is disposed to the most object side of the third lens group G3, which is disposed to the image side of the second lens group G2, and formed in a body with the front lens group G31.

The first lens group G1 is composed of, in order from the object side along the optical axis, a cemented lens constructed by a negative meniscus lens L11 having a convex surface facing the object side cemented with a double convex positive lens L12, and a positive meniscus lens L13 having a convex surface facing the object side.

The second lens group G2 is composed of, in order from the object side along the optical axis, a negative meniscus lens L21 having a convex surface facing the object side, a double concave negative lens L22, a double convex positive lens L23, and a cemented lens constructed by a double concave negative lens L24 cemented with a double convex positive lens L25. The negative meniscus lens L21 disposed to the most object side of the second lens group G2 is a compound type aspherical lens whose object side lens surface is formed as an aspherical surface by applying a resin layer.

The front lens group G31 is composed of, in order from the object side along the optical axis, a double convex positive lens L31, a double convex positive lens L32, and a cemented lens constructed by a double convex positive lens L33 cemented with a negative meniscus lens L34 having a concave surface facing the object side.

The middle lens group G32 is composed of, in order from the object side along the optical axis, a cemented lens constructed by a double concave negative lens L41 cemented with a positive meniscus lens L42 having a convex surface facing the object side, and a negative meniscus lens L43 having a concave surface facing the object side. The double concave negative lens L41 disposed to the most object side of the middle lens group G32 is a compound type aspherical lens whose object side lens surface is an aspherical surface by applying a resin layer.

The rear lens group G33 is composed of, in order from the object side along the optical axis, a positive meniscus lens L51 having a concave surface facing the object side, a double convex positive lens L52, and a cemented lens constructed by a double concave negative lens L53 cemented with a double convex positive lens L54. The positive meniscus lens L51 disposed to the most object side of the rear lens group G33 is a glass mold type aspherical lens whose object side lens surface is an aspherical surface.

Light rays come out from the double convex positive lens L54 form an image on the image plane I.

In the zoom lens seen from another point of view according to Example 9 of the third embodiment, an antireflection coating described later is applied to the image side lens surface of the negative meniscus lens L21 in the second lens group G2 and the object side lens surface of the double concave negative lens L22 in the second lens group G2.

Various values associated with the zoom lens according to Example 9 of the third embodiment are listed in Table 9.

TABLE 9

(Specifications)
zoom ratio = 15.721

|  | W | M | T |
|---|---|---|---|
| f = | 18.52363 | 104.52143 | 291.21725 |
| FNO = | 3.60558 | 5.69344 | 5.89616 |
| ω = | 38.89095 | 7.41882 | 2.71146 |
| Y = | 14.20 | 14.20 | 14.20 |
| TL = | 164.74420 | 225.48860 | 251.39424 |
| Bf = | 39.44250 | 71.57530 | 83.10134 |

(Lens Data)

| i | r | d | nd | νd |
|---|---|---|---|---|
| OP | ∞ | ∞ |  |  |
| 1 | 186.59960 | 2.20000 | 1.834000 | 37.17 |
| 2 | 69.08900 | 8.80000 | 1.497820 | 82.56 |
| 3 | −494.44545 | 0.10000 |  |  |
| 4 | 73.40222 | 6.45000 | 1.593190 | 67.87 |
| 5 | 2016.71160 | (d5) |  |  |
| 6* | 84.85000 | 0.10000 | 1.553890 | 38.09 |
| 7 | 74.02192 | 1.20000 | 1.834810 | 42.72 |
| 8 | 17.09747 | 6.95000 |  |  |
| 9 | −37.97970 | 1.00000 | 1.816000 | 46.63 |
| 10 | 77.67127 | 0.15000 |  |  |
| 11 | 36.26557 | 5.30000 | 1.784720 | 25.68 |
| 12 | −36.26557 | 0.80000 |  |  |
| 13 | −25.69642 | 1.00000 | 1.816000 | 46.63 |
| 14 | 66.08300 | 2.05000 | 1.808090 | 22.79 |
| 15 | −666.70366 | (d15) |  |  |
| 16 | ∞ | 1.00000 | Aperture Stop S | |
| 17 | 68.30727 | 3.40000 | 1.593190 | 67.87 |
| 18 | −47.99596 | 0.10000 |  |  |
| 19 | 68.52367 | 2.45000 | 1.487490 | 70.45 |
| 20 | −136.98392 | 0.10000 |  |  |
| 21 | 46.52671 | 4.20000 | 1.487490 | 70.45 |
| 22 | −36.16400 | 1.00000 | 1.808090 | 22.79 |
| 23 | −202.95328 | (d23) |  |  |
| 24* | −55.09840 | 0.20000 | 1.553890 | 38.09 |
| 25 | −57.24715 | 0.90000 | 1.696800 | 55.52 |
| 26 | 28.15100 | 2.15000 | 1.728250 | 28.46 |
| 27 | 87.70856 | 4.35000 |  |  |
| 28 | −26.69877 | 1.00000 | 1.729160 | 54.66 |
| 29 | −76.47707 | (d29) |  |  |
| 30* | −333.89500 | 4.65000 | 1.589130 | 61.18 |
| 31 | −24.64395 | 0.10000 |  |  |
| 32 | 31.19625 | 5.85000 | 1.487490 | 70.45 |
| 33 | −43.38887 | 1.45000 |  |  |

TABLE 9-continued

| 34 | −109.71645 | 1.00000 | 1.883000 | 40.77 |
|---|---|---|---|---|
| 35 | 20.29920 | 5.30000 | 1.548140 | 45.79 |
| 36 | −808.81321 | (Bf) | | |
| I | ∞ | | | |

(Aspherical Surface Data)

Surface Number = 6

κ = 1.0000    A4 = 3.13350E−06
A6 = 4.73080E−10    A8 = −3.40500E−11
A10 = 1.16620E−13

Surface Number = 24

κ = 1.0000    A4 = 5.24030E−06
A6 = −2.00730E−09    A8 = 0.00000E+00
A10 = 0.00000E+00

Surface Number = 30

κ = 1.0000    A4 = −1.54020E−05
A6 = 1.69500E−09    A8 = 1.34490E−11
A10 = −2.07220E−13

(Variable Distances)

| | W | M | T |
|---|---|---|---|
| d5 = | 2.15700 | 53.25650 | 76.94960 |
| d15 = | 33.80140 | 11.31350 | 2.00000 |
| d23 = | 3.45650 | 11.60170 | 13.04330 |
| d29 = | 10.58680 | 2.44160 | 1.00000 |
| Bf = | 39.44250 | 71.57530 | 83.10134 |

(Lens Group Data)

| Group | ST | Focal Length |
|---|---|---|
| 1 | 1 | 118.96910 |
| 2 | 6 | −15.62542 |
| 3 | 16 | 40.08868(W) |
| | | 33.90635(M) |
| | | 32.38356 (T) |
| 31 | 16 | 27.17463 |
| 32 | 24 | −25.41506 |
| 33 | 30 | 34.39022 |

(Values for Conditional Expressions)

| (3) | f1/ft = 0.409 |
|---|---|
| (4) | Δ1/f1 = 0.728 |
| (11) | ndN = 1.834000 (L11) |
| (12) | vdN = 37.17 (L11) |
| (22) | ndA" = 1.497820 (L12) |
| | vdA" = 82.56 (L12) |
| (22) | ndA" = 1.593190 (L13) |
| | vdA" = 67.87 (L13) |
| (23) | f1/fw = 6.423 |
| (24) | f1A"/f1 = 1.029 (L12) |
| (24) | f1A"/f1 = 1.078 (L13) |
| (25) | φ1A"/fw = 3.100 (φ1A" = 57.42) (L12) |
| (25) | φ1A"/fw = 2.915 (φ1A" = 54.00) (L13) |
| (26) | vd3 = 67.87 (L31) |

FIGS. 13A, 13B and 13C are graphs showing various aberrations of the zoom lens according to Example 9 of the third embodiment upon focusing on an infinitely distant object, in which FIG. 13A is a wide-angle end state, FIG. 13B is an intermediate focal length state, and FIG. 13C is a telephoto end state.

As is apparent from various graphs, the zoom lens according to Example 9 of the second embodiment shows superb optical performance as a result of good corrections to various aberrations.

Figure 14:
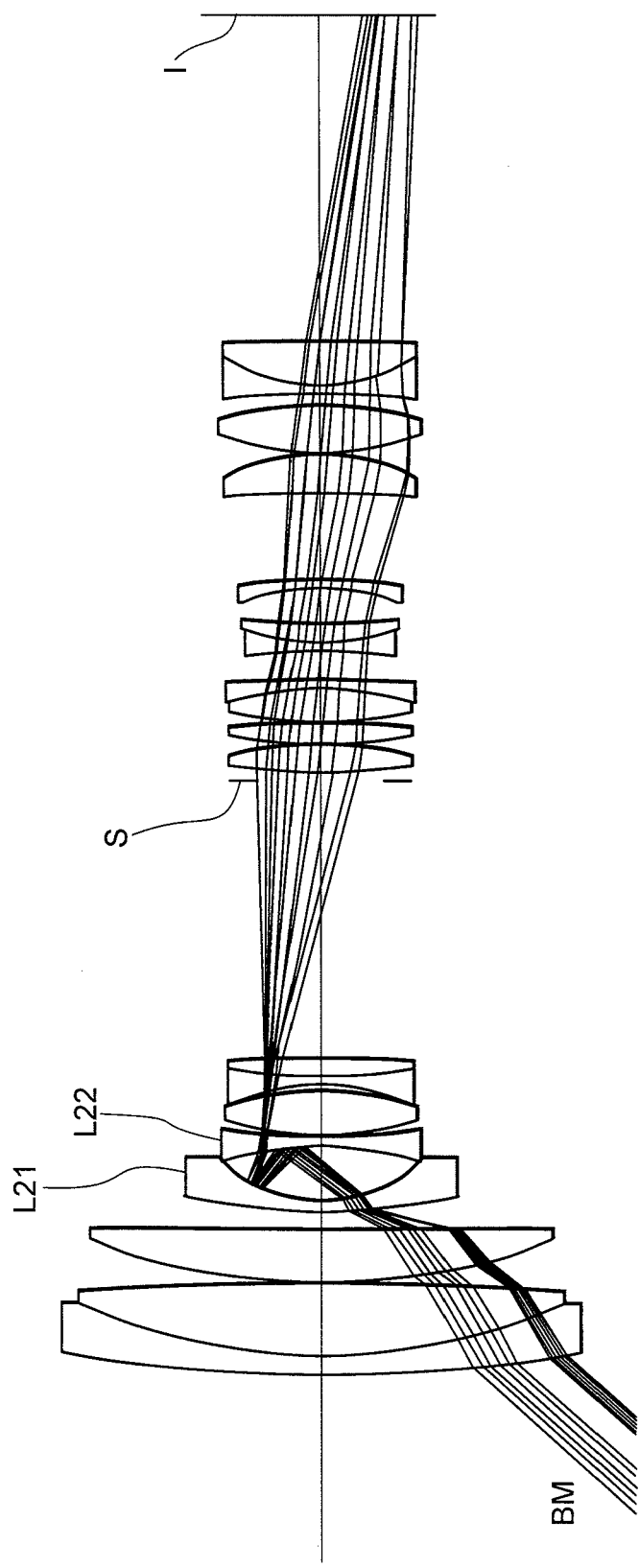
FIG. 14 is a sectional view showing the lens configuration of the lens system according to Example 9 of the third embodiment and is an explanatory view, in which light rays reflected from a first-ghost-generating surface are reflected by a second-ghost-generating surface.

FIG. 14 is a sectional view showing the lens configuration of the lens system seen from another point of view according to Example 9 of the third embodiment and is an explanatory view, in which light rays reflected from a first-ghost-generating surface are reflected by a second-ghost-generating surface.

As shown in FIG. 14, when light rays BM from an object are incident on the zoom lens, the rays are reflected by the object side lens surface (a first-ghost-generating surface whose surface number is 9) of the double concave negative lens L22, and the reflected light rays are reflected again by the image plane I side lens surface (a second-ghost-generating surface whose surface number is 8) of the negative meniscus lens L21 to reach the image plane I with generating ghost images. Incidentally, the first-ghost-generating surface 9 is a concave surface seen from the object side, and the second-ghost-generating surface 8 is a concave surface seen from the aperture stop S. With forming an antireflection coating corresponding to a broad wavelength range to such lens surfaces, it becomes possible to effectively suppress ghost images and flare.

Example 10

FIG. 8 is a sectional view showing a lens configuration of a zoom lens according to Example 10 of the third embodiment of the present application.

As shown in FIG. 8, the zoom lens according to Example 10 of the third embodiment is composed of, in order from an object side along an optical axis, a first lens group G1 having positive refractive power, a second lens group G2 having negative refractive power, and a third lens group G3 having positive refractive power. The third lens group G3 is composed of, in order from the object side along the optical axis, a front lens group G31 having positive refractive power, and a rear lens group G32 having positive refractive power.

Upon zooming from a wide-angle end state to a telephoto end state, the first lens group G1 is moved monotonously to the object side, the second lens group G2 is moved at first to the image side and then to the object side, and the third lens group G3 is moved monotonously to the object side with respect to the image plane I such that a distance between the first lens group G1 and the second lens group G2 increases, and a distance between the second lens group G2 and the third lens group G3 decreases. Moreover, the front lens group G31, and the rear lens group G32 are moved monotonously to the object side with respect to the image plane I such that a distance between the front lens group G31 and the rear lens group G32 decreases.

An aperture stop S is disposed to the most object side of the third lens group G3, which is disposed to the image side of the second lens group G2, and formed in a body with the front lens group G31.

The first lens group G1 is composed of, in order from the object side along the optical axis, a cemented lens constructed by a negative meniscus lens L11 having a convex surface facing the object side cemented with a double convex positive lens L12, and a positive meniscus lens L13 having a convex surface facing the object side.

The second lens group G2 is composed of, in order from the object side along the optical axis, a negative meniscus lens L21 having a convex surface facing the object side, a double concave negative lens L22, a double convex positive lens L23, and a cemented lens constructed by a negative meniscus lens L24 having a convex surface facing the image side cemented with a positive meniscus lens L25 having a convex surface facing the image side. The negative meniscus lens L21 disposed to the most object side of the second lens group G2 is a compound type aspherical lens whose object side lens surface is formed as an aspherical surface by applying a resin layer.

The front lens group G31 is composed of, in order from the object side along the optical axis, a double convex positive lens L31, a double convex positive lens L32, a cemented lens constructed by a double convex positive lens L33 cemented with a double concave negative lens L34, a cemented lens constructed by a double concave negative lens L35 cemented with a positive meniscus lens L36 having a convex surface facing the object side, and a negative meniscus lens L37 having a concave surface facing the object side. The double concave negative lens L35 is a glass mold type aspherical lens whose object side lens surface is formed as an aspherical surface.

The rear lens group G32 is composed of, in order from the object side along the optical axis, a double convex positive lens L41, and a cemented lens constructed by a double concave negative lens L42 cemented with a double convex positive lens L43. The double convex positive lens L41 disposed to the most object side of the rear lens group G32 is a glass mold type aspherical lens whose object side lens surface is an aspherical surface. Light rays come out from the double convex positive lens L43 form an image on the image plane I.

In the zoom lens seen from another point of view according to Example 10 of the third embodiment, an antireflection coating described later is applied to the object side lens surface of the positive meniscus lens L13 in the first lens group G1 and the image side lens surface of the double convex positive lens L23 in the second lens group G2.

Various values associated with the zoom lens according to Example 10 of the third embodiment are listed in Table 10.

TABLE 10

| (Specifications) zoom ratio = 15.696 | | | |
|---|---|---|---|
| | W | M | T |
| f = | 18.53979 | 104.99746 | 290.99204 |
| FNO = | 4.10702 | 5.39973 | 5.39939 |
| ω = | 38.99845 | 7.50128 | 2.73812 |
| Y = | 14.20 | 14.20 | 14.20 |
| TL = | 160.00885 | 218.99165 | 237.79997 |
| Bf = | 39.11693 | 89.39051 | 99.16649 |

| (Lens Data) | | | | |
|---|---|---|---|---|
| i | r | d | nd | vd |
| OP | ∞ | ∞ | | |
| 1 | 123.95945 | 2.00000 | 1.850260 | 32.35 |
| 2 | 65.81889 | 9.30000 | 1.497820 | 82.52 |
| 3 | −679.81898 | 0.10000 | | |
| 4 | 66.63494 | 6.20000 | 1.593190 | 67.87 |
| 5 | 419.93083 | (d5) | | |
| 6* | 162.32416 | 0.15000 | 1.553890 | 38.09 |
| 7 | 146.07537 | 1.00000 | 1.834807 | 42.72 |
| 8 | 16.13035 | 6.55000 | | |

TABLE 10-continued

| | | | | |
|---|---|---|---|---|
| 9 | −35.27597 | 1.00000 | 1.8882997 | 40.76 |
| 10 | 60.44503 | 0.10000 | | |
| 11 | 37.37226 | 5.20000 | 1.846660 | 23.78 |
| 12 | −32.72792 | 0.82143 | | |
| 13 | −23.94628 | 1.00000 | 1.882997 | 40.76 |
| 14 | −252.41497 | 2.00000 | 1.808090 | 22.79 |
| 15 | −72.44788 | (d15) | | |
| 16 | ∞ | 1.00000 | Aperture stop S | |
| 17 | 36.72216 | 3.30000 | 1.593190 | 67.87 |
| 18 | −118.19629 | 0.10000 | | |
| 19 | 41.37679 | 3.15000 | 1.487490 | 70.41 |
| 20 | −92.34292 | 0.10000 | | |
| 21 | 42.34033 | 3.80000 | 1.487490 | 70.41 |
| 22 | −41.00357 | 1.00000 | 1.805181 | 25.43 |
| 23 | 259.36092 | 3.81909 | | |
| 24* | −63.64853 | 1.00000 | 1.806100 | 40.94 |
| 25 | 22.0000 | 2.90000 | 1.805181 | 25.43 |
| 26 | 150.57815 | 4.20000 | | |
| 27 | −45.82441 | 1.00000 | 1.882997 | 40.76 |
| 28 | −215.98952 | (d28) | | |
| 29* | 77.17936 | 3.15000 | 1.589130 | 61.16 |
| 30 | −37.11866 | 0.10000 | | |
| 31 | −261.29488 | 1.00000 | 1.882997 | 40.76 |
| 32 | 39.98076 | 4.40000 | 1.518229 | 58.93 |
| 33 | −48.52092 | (Bf) | | |
| I | ∞ | | | |

(Aspherical Surface Data)

Surface Number = 6

$\kappa = -5.7774$         $A4 = 6.79980E-06$
$A6 = 2.52730E-08$         $A8 = 8.26150E-11$
$A10 = -1.02860E-13$ Surface Number = 24

$\kappa = 2.8196$         $A4 = 4.59750E-06$
$A6 = 4.28350E-09$         $A8 = 0.00000E+00$
$A10 = 0.00000E+00$ Surface Number = 29

$\kappa = -6.5363$         $A4 = -1.95310E-05$
$A6 = 1.79050E-08$         $A8 = -1.55070E-10$
$A10 = 4.13770E-13$ (Variable Distances)

| | W | M | T |
|---|---|---|---|
| d5 = | 2.15153 | 45.02627 | 65.69297 |
| d15 = | 40.45482 | 13.14016 | 2.00000 |
| d28 = | 8.84506 | 1.99420 | 1.50000 |
| Bf = | 39.11693 | 89.39051 | 99.16649 |

(Lens Group Data)

| Group | ST | Focal Length |
|---|---|---|
| 1 | 1 | 103.25223 |
| 2 | 6 | −15.13084 |
| 3 | 16 | 39.55369(W) |
| | | 35.07124(M) |
| | | 34.78685 (T) |
| 31 | 16 | 44.76649 |
| 32 | 29 | 47.36030 |

(Values for Conditional Expressions)

| | | |
|---|---|---|
| (3) | f1/ft = 0.355 | |
| (4) | Δ1/f1 = 0.753 | |
| (11) | ndN = 1.850260 (L11) | |
| (12) | vdN = 32.35 (L11) | |
| (22) | ndA″ = 1.497820 (L12) | |
| | vdA″ = 82.52 (L12) | |
| (22) | ndA″ = 1.593190 (L13) | |
| | vdA″ = 67.87 (L13) | |
| (23) | f1/fw = 5.569 | |
| (24) | f1A″/f1 = 1.172 (L12) | |
| (24) | f1A″/f1 = 1.285 (L13) | |
| (25) | φ1A″/fw = 2.999 (φ1A″ = 55.60) (L12) | |

TABLE 10-continued

| | | |
|---|---|---|
| (25) | φ1A"/fw = 2.918 (φ1A" = 54.10) (L13) | |
| (26) | vd3 = 67.87 (L31) | |

FIGS. 9A, 9B and 9C are graphs showing various aberrations of the zoom lens according to Example 10 of the third embodiment upon focusing on an infinitely distant object, in which FIG. 9A is a wide-angle end state, FIG. 9B is an intermediate focal length state, and FIG. 9C is a telephoto end state.

As is apparent from various graphs, the zoom lens according to Example 10 of the third embodiment shows superb optical performance as a result of good corrections to various aberrations.

Example 11

FIG. 10 is a sectional view showing a lens configuration of a zoom lens according to Example 11 of the third embodiment of the present application.

As shown in FIG. 10, the zoom lens according to Example 11 of the third embodiment is composed of, in order from an object side along an optical axis, a first lens group G1 having positive refractive power, a second lens group G2 having negative refractive power, and a third lens group G3 having positive refractive power. The third lens group G3 is composed of, in order from the object side along the optical axis, a front lens group G31 having positive refractive power, a middle lens group G32 having negative refractive power, and a rear lens group G33 having positive refractive power.

Upon zooming from a wide-angle end state W to a telephoto end state T, the first lens group G1 is moved monotonously to the object side, the second lens group G2 is moved at first to the image side and then to the object side, and the third lens group G3 is moved monotonously to the object side with respect to the image plane I such that a distance between the first lens group G1 and the second lens group G2 increases, and a distance between the second lens group G2 and the third lens group G3 decreases. Moreover, the front lens group G31, the middle lens group G32 and the rear lens group G33 are moved monotonously to the object side with respect to the image plane I such that a distance between the front lens group G31 and the middle lens group G32 increases, and a distance between the middle lens group G32 and the rear lens group G33 decreases.

An aperture stop S is disposed to the most object side of the third lens group G3, which is disposed to the image side of the second lens group G2, and formed in a body with the front lens group G31.

The first lens group G1 is composed of, in order from the object side along the optical axis, a cemented lens constructed by a negative meniscus lens L11 having a convex surface facing the object side cemented with a double convex positive lens L12, and a positive meniscus lens L13 having a convex surface facing the object side.

The second lens group G2 is composed of, in order from the object side along the optical axis, a negative meniscus lens L21 having a convex surface facing the object side, a double concave negative lens L22, a double convex positive lens L23, and a cemented lens constructed by a double concave negative lens L24 cemented with a double convex positive lens L25. The negative meniscus lens L21 disposed to the most object side of the second lens group G2 is a compound type aspherical lens whose object side lens surface is formed as an aspherical surface by applying a resin layer.

The front lens group G31 is composed of, in order from the object side along the optical axis, a double convex positive lens L31, a double convex positive lens L32, and a cemented lens constructed by a double convex positive lens L33 cemented with a negative meniscus lens L34 having a concave surface facing the object side.

The middle lens group G32 is composed of, in order from the object side along the optical axis, a cemented lens constructed by a double concave negative lens L41 cemented with a positive meniscus lens L42 having a convex surface facing the object side, and a negative meniscus lens L43 having a concave surface facing the object side. The double concave negative lens L41 disposed to the most object side of the middle lens group G32 is a compound type aspherical lens whose object side lens surface is an aspherical surface formed by applying a resin layer.

The rear lens group G33 is composed of, in order from the object side along the optical axis, a double convex positive lens L51, a double convex positive lens L52, and a cemented lens constructed by a double concave negative lens L53 cemented with a double convex positive lens L54. The double convex positive lens L51 disposed to the most object side of the rear lens group G33 is a glass mold type aspherical lens whose object side lens surface is an aspherical surface. Light rays come out from the double convex positive lens L54 form an image on the image plane I.

In the zoom lens seen from another point of view according to Example 11 of the third embodiment, an antireflection coating described later is applied to the object side lens surface of the positive meniscus lens L13 in the first lens group G1 and the object side lens surface of the double concave negative lens L24 in the second lens group G2.

Various values associated with the zoom lens according to Example 11 of the third embodiment are listed in Table 11.

TABLE 11

(Specifications)
zoom ratio = 15.701

| | W | M | T |
|---|---|---|---|
| f = | 18.56060 | 104.65150 | 291.42454 |
| FNO = | 3.57565 | 5.62482 | 5.81064 |
| ω = | 38.80191 | 7.44205 | 2.72113 |
| Y = | 14.20 | 14.20 | 14.20 |

TABLE 11-continued

| | | | | |
|---|---|---|---|---|
| TL = | 164.76435 | 225.28899 | 250.61470 | |
| Bf = | 38.84705 | 73.57929 | 86.64770 | |

(Lens Data)

| i | r | d | nd | vd |
|---|---|---|---|---|
| OP | ∞ | ∞ | | |
| 1 | 175.60560 | 2.20000 | 1.834000 | 37.16 |
| 2 | 67.43020 | 8.80000 | 1.497820 | 82.52 |
| 3 | −587.78480 | 0.10000 | | |
| 4 | 72.27100 | 6.45000 | 1.593190 | 67.87 |
| 5 | 1826.13880 | (d5) | | |
| 6* | 84.76870 | 0.10000 | 1.553890 | 38.09 |
| 7 | 73.93750 | 1.20000 | 1.834807 | 42.72 |
| 8 | 17.18730 | 6.95000 | | |
| 9 | −36.98220 | 1.00000 | 1.816000 | 46.62 |
| 10 | 77.92630 | 0.10000 | | |
| 11 | 36.63460 | 5.30000 | 1.784723 | 25.68 |
| 12 | −36.63460 | 0.80000 | | |
| 13 | −26.19910 | 1.00000 | 1.816000 | 46.62 |
| 14 | 63.73960 | 2.05000 | 1.808090 | 22.79 |
| 15 | −643.27060 | (d15) | | |
| 16 | ∞ | 1.00000 | Aperture stop S | |
| 17 | 65.83650 | 3.40000 | 1.593190 | 67.87 |
| 18 | −50.15460 | 0.10000 | | |
| 19 | 65.68170 | 2.45000 | 1.487490 | 70.41 |
| 20 | −154.97430 | 0.10000 | | |
| 21 | 46.73330 | 4.20000 | 1.487490 | 70.41 |
| 22 | −35.78330 | 1.00000 | 1.808090 | 22.79 |
| 23 | −191.93180 | (d23) | | |
| 24* | −57.29660 | 0.20000 | 1.553890 | 38.09 |
| 25 | −59.72500 | 0.90000 | 1.696797 | 55.52 |
| 26 | 28.51000 | 2.15000 | 1.728250 | 28.46 |
| 27 | 91.99760 | 4.14020 | | |
| 28 | −32.89540 | 1.00000 | 1.729157 | 54.66 |
| 29 | −144.33150 | (d29) | | |
| 30* | 6427.19190 | 4.65000 | 1.589130 | 61.18 |
| 31 | −27.38180 | 0.10000 | | |
| 32 | 31.47760 | 5.85000 | 1.487490 | 70.41 |
| 33 | −43.75390 | 1.45000 | | |
| 34 | −113.58970 | 1.00000 | 1.882997 | 40.76 |
| 35 | 20.34810 | 5.30000 | 1.548141 | 45.79 |
| 36 | −709.14530 | (Bf) | | |
| I | ∞ | | | |

(Aspherical Surface Data)

Surface Number = 6

κ = 1.0000  A4 = 2.88220E−06
A6 = −2.29350E−11  A8 = −2.35280E−11
A10 = 9.21570E−14

Surface Number = 24

κ = 1.0000  A4 = 4.32780E−06
A6 = 1.88460E−09  A8 = 0.00000E+00
A10 = 0.00000E+00

Surface Number = 30

κ = 1.0000  A4 = −1.36170E−05
A6 = −3.55860E−10  A8 = 1.83080E−11
A10 = −1.86790E−13

(Variable Distances)

| | W | M | T |
|---|---|---|---|
| d5 = | 2.15700 | 53.01000 | 76.25220 |
| d15 = | 33.36360 | 11.30360 | 2.00000 |
| d23 = | 3.46820 | 9.64300 | 9.62460 |
| d29 = | 11.83830 | 2.66290 | 1.00000 |
| Bf = | 38.84705 | 73.57929 | 86.64770 |

(Lens Group Data)

| Group | ST | Focal Length |
|---|---|---|
| 1 | 1 | 117.72937 |
| 2 | 6 | −15.60945 |

TABLE 11-continued

| 3  | 16 | 40.44471(W) |
|----|----|----|
|    |    | 33.95695(M) |
|    |    | 32.70088 (T) |
| 31 | 16 | 27.35473 |
| 32 | 24 | −26.50041 |
| 33 | 30 | 35.20423 |

(Values for Conditional Expressions)

| (3)  | f1/ft = 0.404 |
|------|---------------|
| (4)  | Δ1/f1 = 0.729 |
| (11) | ndN = 1.834000 (L11) |
| (12) | vdN = 37.16 (L11) |
| (22) | ndA″ = 1.497820 (L12) |
|      | vdA″ = 82.52 (L12) |
| (22) | ndA″ = 1.593190 (L13) |
|      | vdA″ = 67.87 (L13) |
| (23) | f1/fw = 6.343 |
| (24) | f1A″/f1 = 1.037 (L12) |
| (24) | f1A″/f1 = 1.076 (L13) |
| (25) | φ1A″/fw = 3.081 (φ1A″ = 57.16) (L12) |
| (25) | φ1A″/fw = 2.909 (φ1A″ = 54.00) (L13) |
| (26) | vd3 = 67.87 (L31) |

FIGS. 11A, 11B and 11C are graphs showing various aberrations of the zoom lens according to Example 11 of the third embodiment upon focusing on an infinitely distant object, in which FIG. 11A is a wide-angle end state, FIG. 11B is an intermediate focal length state, and FIG. 11C is a telephoto end state.

As is apparent from various graphs, the zoom lens according to Example 11 of the third embodiment shows superb optical performance as a result of good corrections to various aberrations.

Example 12

FIG. 15 is a sectional view showing a lens configuration of a zoom lens according to Example 12 of the third embodiment of the present application.

As shown in FIG. 15, the zoom lens according to Example 12 of the third embodiment is composed of, in order from an object side along an optical axis, a first lens group G1 having positive refractive power, a second lens group G2 having negative refractive power, and a third lens group G3 having positive refractive power. The third lens group G3 is composed of, in order from the object side along the optical axis, a front lens group G31 having positive refractive power, and a rear lens group G32 having positive refractive power.

Upon zooming from a wide-angle end state to a telephoto end state, the first lens group G1 is moved monotonously to the object side, the second lens group G2 is moved at first to the image side and then to the object side, and the third lens group G3 is moved monotonously to the object side with respect to the image plane I such that a distance between the first lens group G1 and the second lens group G2 increases, and a distance between the second lens group G2 and the third lens group G3 decreases. Moreover, the front lens group G31, and the rear lens group G32 are moved monotonously to the object side with respect to the image plane I such that a distance between the front lens group G31 and the rear lens group G32 decreases.

An aperture stop S is disposed to the most object side of the third lens group G3, which is disposed to the image side of the second lens group G2, and formed in a body with the front lens group G31.

The first lens group G1 is composed of, in order from the object side along the optical axis, a cemented lens constructed by a negative meniscus lens L11 having a convex surface facing the object side cemented with a double convex positive lens L12, and a positive meniscus lens L13 having a convex surface facing the object side.

The second lens group G2 is composed of, in order from the object side along the optical axis, a negative meniscus lens L21 having a convex surface facing the object side, a double concave negative lens L22, a double convex positive lens L23, and a cemented lens constructed by a negative meniscus lens L24 having a convex surface facing the image side cemented with a positive meniscus lens L25 having a convex surface facing the image side. The negative meniscus lens L21 disposed to the most object side of the second lens group G2 is a compound type aspherical lens whose object side lens surface is formed as an aspherical surface by applying a resin layer.

The front lens group G31 is composed of, in order from the object side along the optical axis, a double convex positive lens L31, a double convex positive lens L32, a cemented lens constructed by a double convex positive lens L33 cemented with a double concave negative lens L34, a cemented lens constructed by a double concave negative lens L35 cemented with a double convex positive lens L36, and a negative meniscus lens L37 having a concave surface facing the object side. The double concave negative lens L35 is a glass mold type aspherical lens whose object side lens surface is formed as an aspherical surface.

The rear lens group G32 is composed of, in order from the object side along the optical axis, a double convex positive lens L41, and a cemented lens constructed by a negative meniscus lens L42 having a convex surface facing the object side cemented with a double convex positive lens L43. The double convex positive lens L41 disposed to the most object side of the rear lens group G32 is a glass mold type aspherical lens whose object side lens surface is an aspherical surface. Light rays come out from the double convex positive lens L43 form an image on the image plane I.

In the zoom lens seen from another point of view according to Example 12 of the third embodiment, an antireflection coating described later is applied to the image side lens surface of the double convex positive lens L12 in the first lens group G1 and the image side lens surface of the negative meniscus lens L21 in the second lens group G2.

Various values associated with the zoom lens according to Example 12 of the third embodiment are listed in Table 12.

TABLE 12

| (Specifications) zoom ratio = 15.698 | | | |
|---|---|---|---|
| | W | M | T |
| f = | 18.53928 | 105.00169 | 291.02949 |
| FNO = | 3.60631 | 5.76130 | 5.78825 |
| ω = | 39.00856 | 7.48510 | 2.73699 |
| Y = | 14.20 | 14.20 | 14.20 |
| TL = | 148.79923 | 217.34659 | 242.82932 |
| Bf = | 39.00067 | 91.11965 | 105.34665 |

| (Lens Data) | | | | |
|---|---|---|---|---|
| i | r | d | nd | νd |
| OP | ∞ | ∞ | | |
| 1 | 127.94447 | 2.00000 | 1.850260 | 32.35 |
| 2 | 66.54596 | 7.85000 | 1.497820 | 82.52 |
| 3 | −596.23069 | 0.10000 | | |
| 4 | 67.44029 | 5.40000 | 1.593190 | 67.87 |
| 5 | 436.18989 | (d5) | | |
| 6* | 135.29609 | 0.15000 | 1.553890 | 38.09 |
| 7 | 107.25966 | 1.00000 | 1.804000 | 46.58 |
| 8 | 15.26261 | 6.70000 | | |
| 9 | −34.54986 | 1.00000 | 1.834807 | 42.72 |
| 10 | 51.89897 | 0.10000 | | |
| 11 | 34.09670 | 4.50000 | 1.784723 | 25.68 |
| 12 | −32.12451 | 0.90000 | | |
| 13 | −21.11569 | 1.00000 | 1.882997 | 40.76 |
| 14 | −2390.20620 | 2.10000 | 1.922860 | 20.50 |
| 15 | −67.61249 | (d15) | | |
| 16 | ∞ | 1.00000 | Aperture stop S | |
| 17 | 31.61335 | 3.65000 | 1.593190 | 67.87 |
| 18 | −218.55454 | 0.10000 | | |
| 19 | 49.13044 | 3.20000 | 1.487490 | 70.41 |
| 20 | −63.62105 | 0.10000 | | |
| 21 | 35.35729 | 4.25000 | 1.487490 | 70.41 |
| 22 | −34.07826 | 1.00000 | 1.846660 | 23.78 |
| 23 | 659.96058 | 3.90000 | | |
| 24* | −35.03665 | 1.00000 | 1.756998 | 47.82 |
| 25 | 17.58221 | 3.90000 | 1.698947 | 30.13 |
| 26 | −95.26227 | 3.35000 | | |
| 27 | −55.52002 | 1.00000 | 1.882997 | 40.76 |
| 28 | −585.51718 | (d28) | | |
| 29* | 439.79346 | 2.20000 | 1.589130 | 61.16 |
| 30 | −53.20688 | 0.10000 | | |
| 31 | 65.13402 | 1.00000 | 1.834000 | 37.16 |
| 32 | 27.72956 | 4.10000 | 1.487490 | 70.41 |
| 33 | −58.13289 | (Bf) | | |
| I | ∞ | | | |

| (Aspherical Surface Data) |
|---|

| Surface Number = 6 | |
|---|---|
| κ = 4.3350 | A4 = 9.45630E−06 |
| A6 = −1.51470E−08 | A8 = −1.16860E−12 |
| A10 = 1.65790E−13 | |

| Surface Number = 24 | |
|---|---|
| κ = −0.3009 | A4 = 6.23810E−06 |
| A6 = 8.96820E−09 | A8 = 0.00000E+00 |
| A10 = 0.00000E+00 | |

| Surface Number = 29 | |
|---|---|
| κ = −20.0000 | A4 = −1.92960E−05 |
| A6 = 5.96200E−09 | A8 = −1.65600E−10 |
| A10 = 4.18100E−13 | |

| (Variable Distances) | | | |
|---|---|---|---|
| | W | M | T |
| d5 = | 2.10000 | 46.65937 | 67.33267 |
| d15 = | 33.50310 | 10.98454 | 2.00000 |

TABLE 12-continued

| d28 = | 7.54546 | 1.93303 | 1.50000 |
|---|---|---|---|
| Bf = | 39.00067 | 91.11965 | 105.34665 |

(Lens Group Data)

| Group | ST | Focal Length |
|---|---|---|
| 1 | 1 | 104.30654 |
| 2 | 6 | −13.81152 |
| 3 | 16 | 36.15068(W) |
|   |   | 32.66171(M) |
|   |   | 32.42030 (T) |
| 31 | 16 | 39.54020 |
| 32 | 29 | 48.03635 |

(Values for Conditional Expressions)

| (3) | f1/ft = 0.358 |
|---|---|
| (4) | Δ1/f1 = 0.901 |
| (11) | ndN = 1.850260 (L11) |
| (12) | vdN = 32.35 (L11) |
| (22) | ndA″ = 1.497820 (L12) |
|   | vdA″ = 82.52 (L12) |
| (22) | ndA″ = 1.593190 (L13) |
|   | vdA″ = 67.87 (L13) |
| (23) | f1/fw = 5.626 |
| (24) | f1A″/f1 = 1.157 (L12) |
| (24) | f1A″/f1 = 1.282 (L13) |
| (25) | φ1A″/fw = 2.982 (φ1A″ = 55.29) (L12) |
| (25) | φ1A″/fw = 2.919 (φ1A″ = 54.12) (L13) |
| (26) | vd3 = 67.87 (L31) |

Figure 16A:
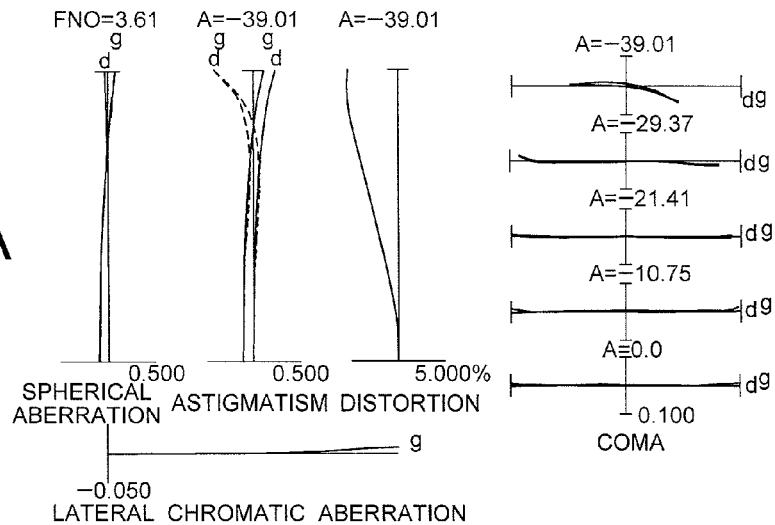
Figure 16B:
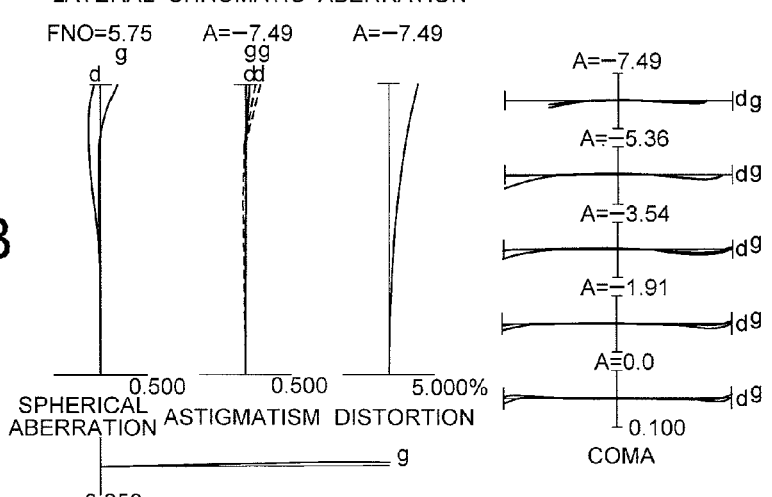
Figure 16C:
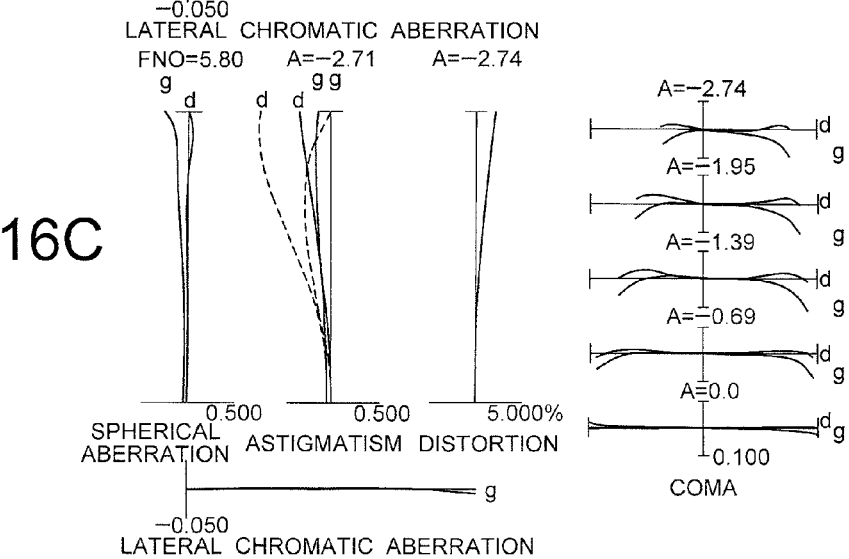

FIGS. 16A, 16B and 16C are graphs showing various aberrations of the zoom lens according to Example 12 of the third embodiment upon focusing on an infinitely distant object, in which FIG. 16A is a wide-angle end state, FIG. 16B is an intermediate focal length state, and FIG. 16C is a telephoto end state.

As is apparent from various graphs, the zoom lens according to Example 12 of the third embodiment shows superb optical performance as a result of good corrections to various aberrations.

Then, an outline of a method for manufacturing a zoom lens according to the third embodiment is explained.

Figure 26:
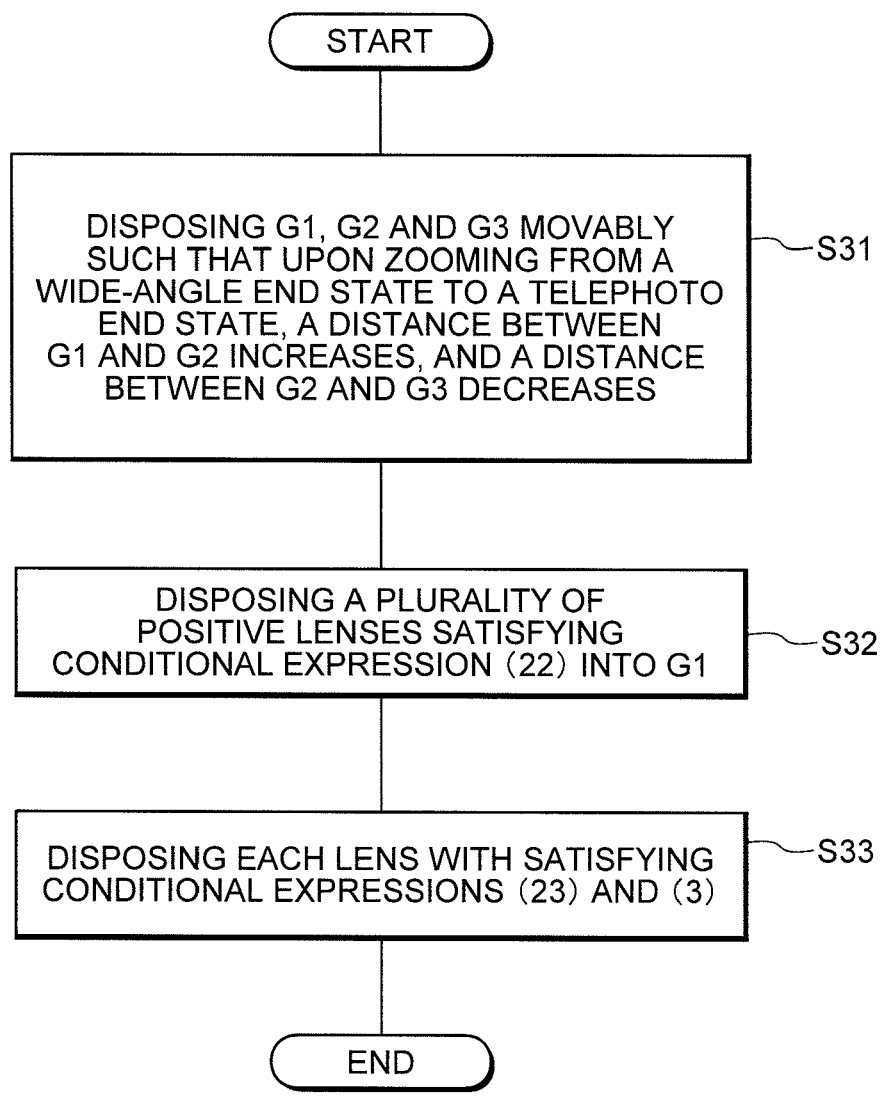
FIG. 26 is a flowchart schematically explaining a method for manufacturing the zoom lens according to the third embodiment.

FIG. 26 is a flowchart schematically explaining a method for manufacturing the zoom lens according to the third embodiment.

The method for manufacturing a zoom lens according to the third embodiment is a method for manufacturing a zoom lens including, in order from an object side along an optical axis, a first lens group G1 having positive refractive power, a second lens group G2 having negative refractive power, and a third lens group G3 having positive refractive power, and being constructed such that at least one optical surface in the first lens group and the second lens group is applied with an antireflection coating, and the antireflection coating includes at least one layer that is formed by a wet process, the method including steps S31 through S33 shown in FIG. 26.

Step S31: disposing the first lens group G1, the second lens group G2 and the third lens group G3 movably such that upon zooming from a wide-angle end state to a telephoto end state, a distance between the first lens group and the second lens group increases, and a distance between the second lens group and the third lens group decreases.

Step S32: disposing a plurality of positive lenses satisfying the following conditional expression (22) into the first lens group:

$$66.5 < vdA'' \text{ when } 1.540 \leq ndA''$$

$$75.0 < vdA'' \text{ when } ndA'' < 1.540 \tag{22}$$

where ndA″ denotes a refractive index at d-line (wavelength λ=587.6 nm) of a material of each of a plurality of positive lenses in the first lens group, and vdA″ denotes an Abbe number at d-line (wavelength λ=587.6 nm) of a material of each of a plurality of positive lenses in the first lens group.

Step S33: disposing each lens with satisfying the following conditional expressions (23) and (3):

$$4.75 < f1/fw < 11.00 \tag{23}$$

$$0.28 < f1/ft < 0.52 \tag{3}$$

where fw denotes a focal length of the zoom lens in the wide-angle end state, ft denotes a focal length of the zoom lens in the telephoto end state, and f1 denotes a focal length of the first lens group.

With this method for manufacturing a zoom lens according to the third embodiment, it becomes possible to manufacture a zoom lens having excellent optical performance with suppressing variations in aberrations and ghost images and flare.

Then, an antireflection coating used in the zoom lens seen from another point of view according to each Example of the first through third embodiments is explained.

Figure 17:
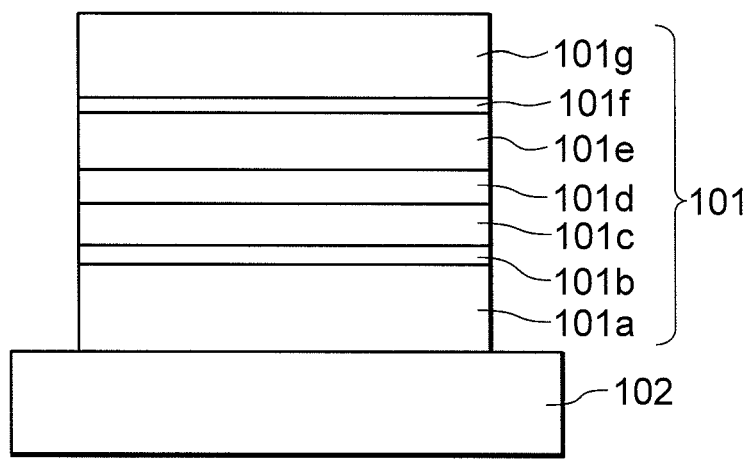
FIG. 17 is an explanatory view showing a configuration of an antireflection coating according to the present application.

FIG. 17 is an explanatory view showing a configuration of an antireflection coating (which is also referred to as a multilayer broadband antireflection coating) used in the zoom lens according to the present embodiment. The antireflection coating 101 is composed of seven layers and is formed on an optical surface of an optical member 102 such as a lens. A first layer 101a is formed with aluminum oxide by means of a vacuum evaporation method. On the first layer 101a, a second layer 101b formed with mixture of titanium oxide and zirconium oxide by means of a vacuum evaporation method is formed. Moreover, on the second layer 101b, a third layer 101c formed with aluminum oxide by means of vacuum evaporation method is formed. Moreover, on the third layer 101c, a fourth layer 101f formed with a mixture of titanium oxide and zirconium oxide by means of a vacuum evaporation method is formed. Furthermore, on the fourth layer 101d, a fifth layer 101e formed with aluminum oxide by means of vacuum evaporation method is formed. On the fifth layer 101e, a sixth layer 101f formed with mixture of titanium oxide and zirconium oxide by means of a vacuum evaporation method is formed.

Then, on the sixth layer 101f formed in this manner, a seventh layer 101g formed with a mixture of silica and magnesium fluoride is formed by means of a wet process to form the antireflection coating according to the present embodiment. In order to form the seventh layer 101g, a sol-gel process, which is a kind of wet process, is used. The sol-gel process is a process of transforming a sol acquired by mixing a material into a gel having no fluidity through hydrolyzing condensation polymerization reaction and acquiring a product by heat-decomposing this gel. In manufacturing an optical thin film, the film may be generated by coating a material sol of the optical thin film over the optical surface of the optical member and dry-solidifying the sol into a gel film. Note that the wet process may involve using, without being limited to the sol-gel process, a process of acquiring a solid-state film through none of the gel state.

In this manner, the first layer 101a through the sixth layer 101f are formed by electron beam evaporation, which is a dry process, and the seventh layer 101g, which is the uppermost layer, is formed by a following wet-process using sol liquid prepared by a hydrofluoric acid/magnesium acetate method. At first, an aluminum oxide layer, which becomes a first layer 101a, a mixture of titanium oxide and zirconium oxide layer, which becomes a second layer 101b, an aluminum oxide layer, which becomes a third layer 101a, a mixture of titanium oxide and zirconium oxide layer, which becomes a fourth layer 101b, an aluminum oxide layer, which becomes a fifth layer 101a, and a mixture of titanium oxide and zirconium oxide layer, which becomes a sixth layer 101b are formed on a film-forming surface (the above-mentioned optical surface of the optical member 102) in this order by a vacuum evaporation equipment. Then, after being took out from the vacuum evaporation equipment, the optical member 102 is applied with a sol liquid prepared by the hydrofluoric acid/magnesium acetate method by means of a spin coat method, so that a layer formed by a mixture of silica and magnesium fluoride, which becomes a seventh layer 101g, is formed. A reaction formula prepared by the hydrofluoric acid/magnesium acetate method is shown by expression (a):

$$2HF+Mg(CH_3COO)_2 \rightarrow MgF_2+2CH_3COOH \quad (a).$$

The sol liquid is used for forming the film after mixing ingredients with undergoing high temperature, high pressure maturing process at 140° C., 24 hours by means of an autoclave. After completion of forming the seventh layer 101g, the optical member 102 is processed with heating treatment at 160° C. in atmospheric pressure for 1 hour to be completed. With using such a sol gel method, atoms or molecules are built up from several to several tens to become particles of several nanometers to several tens of nanometers, and several these particles are built up to form secondary particles. As a result, the secondary particles are piled up to form the seventh layer 101g.

Optical performance of the optical member including the thus-formed antireflection coating 101 will hereinafter be described by using spectral characteristics shown in FIG. 18.

The optical member (lens) including the antireflection coating according to each of the first through third embodiments is formed under the conditions shown in the following Table 13. Herein, the Table 13 shows respective optical film thicknesses of the layers 101a (the first layer) through 101g (the seventh layer) of the antireflection coating 101, which are obtained under such conditions that λ denotes a reference wavelength and the refractive index of the substrate (optical member) is set to 1.62, 1.74 and 1.85. Note that the Table 13 shows Al2O3 expressed as the aluminum oxide, ZrO2+TiO2 expressed as the mixture of titanium oxide and zirconium oxide and MgF2+SiO2 expressed as the mixture of magnesium fluoride and silica.

TABLE 13

| layer | material | n | thicknesses of layers | | |
|---|---|---|---|---|---|
| | medium air | 1 | | | |
| 7 | MgF2 + SiO2 | 1.26 | 0.268λ | 0.271λ | 0.269λ |
| 6 | ZrO2 + TiO2 | 2.12 | 0.057λ | 0.054λ | 0.059λ |
| 5 | Al2O3 | 1.65 | 0.171λ | 0.178λ | 0.162λ |
| 4 | ZrO2 + TiO2 | 2.12 | 0.127λ | 0.13λ | 0.158λ |
| 3 | Al2O3 | 1.65 | 0.122λ | 0.107λ | 0.08λ |
| 2 | ZrO2 + TiO2 | 2.12 | 0.059λ | 0.075λ | 0.105λ |
| 1 | Al2O3 | 1.65 | 0.257λ | 0.03λ | 0.03λ |
| | n (substrate) | | 1.62 | 1.74 | 1.85 |

Figure 18:
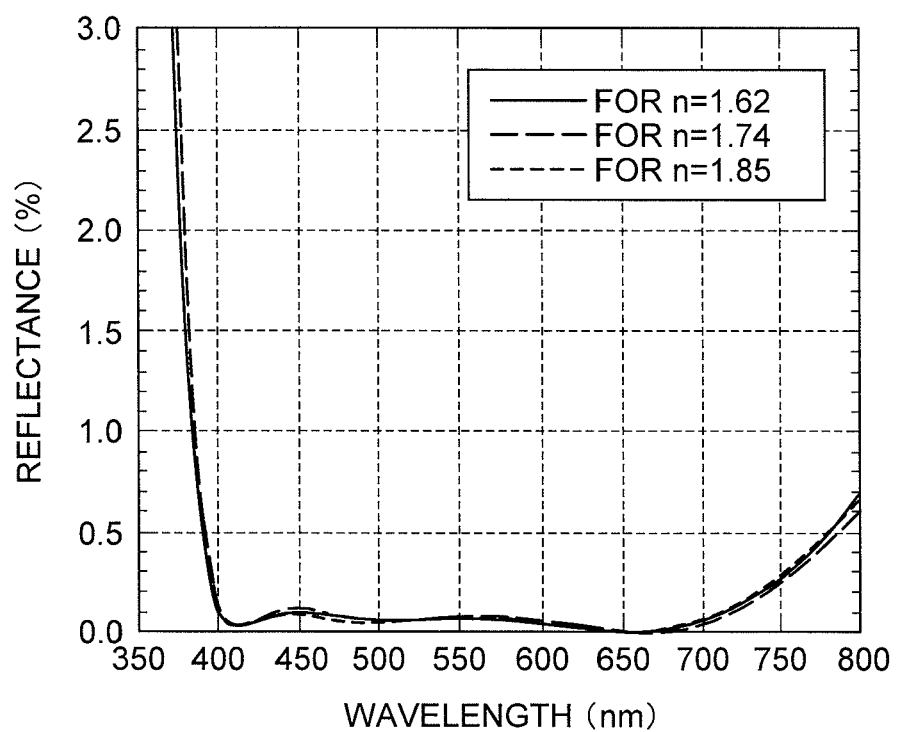
FIG. 18 is a graph showing spectral reflectance of an antireflection coating according to the present embodiment.

FIG. 18 shows the spectral characteristics when the light beams vertically are incident on the optical member in which the optical film thickness of each of the layers of the antireflection coating 101 is designed, with the reference wavelength λ set to 550 nm in Table 13.

It is understood from FIG. 18 that the optical member including the antireflection coating 101 designed with the reference wavelength λ set to 550 nm can restrain the reflectance down to 0.2% or less over the entire range in which the wavelengths of the light beams are 420 nm through 720 nm. Further, in the Table 13, even the optical member including the antireflection coating 101, in which each optical film thickness is designed with the reference wavelength λ set to the d-line (wavelength 587.6 nm), has substantially the same spectral characteristics as in the case where the reference wavelength λ shown in FIG. 18 is 550 nm in a way that affects substantially none of the spectral characteristics thereof.

Next, a modified example of the antireflection coating will be explained. The antireflection coating is a 5-layered film, and, similarly to the Table 13, the optical film thickness of each layer with respect to the reference wavelength λ is designed under conditions shown in the following Table 14. In this modified example, the formation of the fifth layer involves using the sol-gel process described above.

TABLE 14

| layer | material | n | thicknesses of layers | |
|---|---|---|---|---|
| | medium air | 1 | | |
| 5 | MgF2 + SiO2 | 1.26 | 0.275λ | 0.269λ |
| 4 | ZrO2 + TiO2 | 2.12 | 0.045λ | 0.043λ |
| 3 | Al2O3 | 1.65 | 0.212λ | 0.217λ |
| 2 | ZrO2 + TiO2 | 2.12 | 0.077λ | 0.066λ |
| 1 | Al2O3 | 1.65 | 0.288λ | 0.290λ |
| | n (substrate) | | 1.46 | 1.52 |

Figure 19:
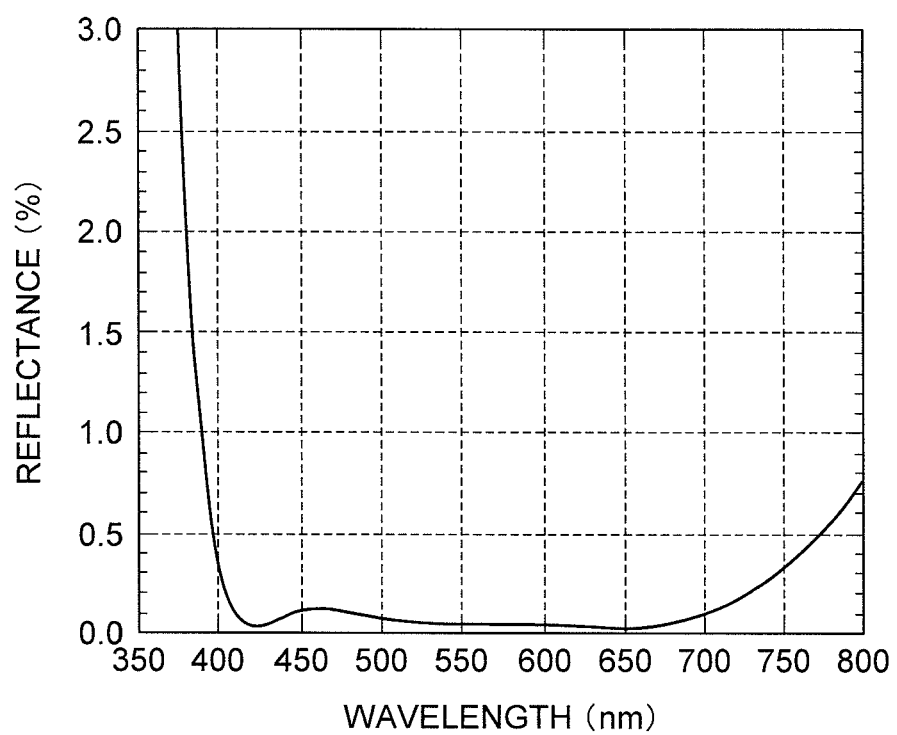
FIG. 19 is a graph showing spectral reflectance of an antireflection coating according to a variation of the present application.

FIG. 19 shows the spectral characteristics when the light beams vertically are incident on the optical member in which the optical film thickness of each of the layers is designed, with the substrate refractive index set to 1.52 and the reference wavelength λ set to 550 nm in the Table 14. It is understood from FIG. 19 that the antireflection coating in the modified example can restrain the reflectance down to 0.2% or under over the entire range in which the wavelengths of the light beams are 420 nm-720 nm. Note that in the Table 14, even the optical member including the antireflection coating, in which each optical film thickness is designed with the reference wavelength λ set to the d-line (wavelength 587.6 nm), has substantially the same spectral characteristics as the spectral characteristics shown in FIG. 19 in a way that affects substantially none of the spectral characteristics thereof.

Figure 20:
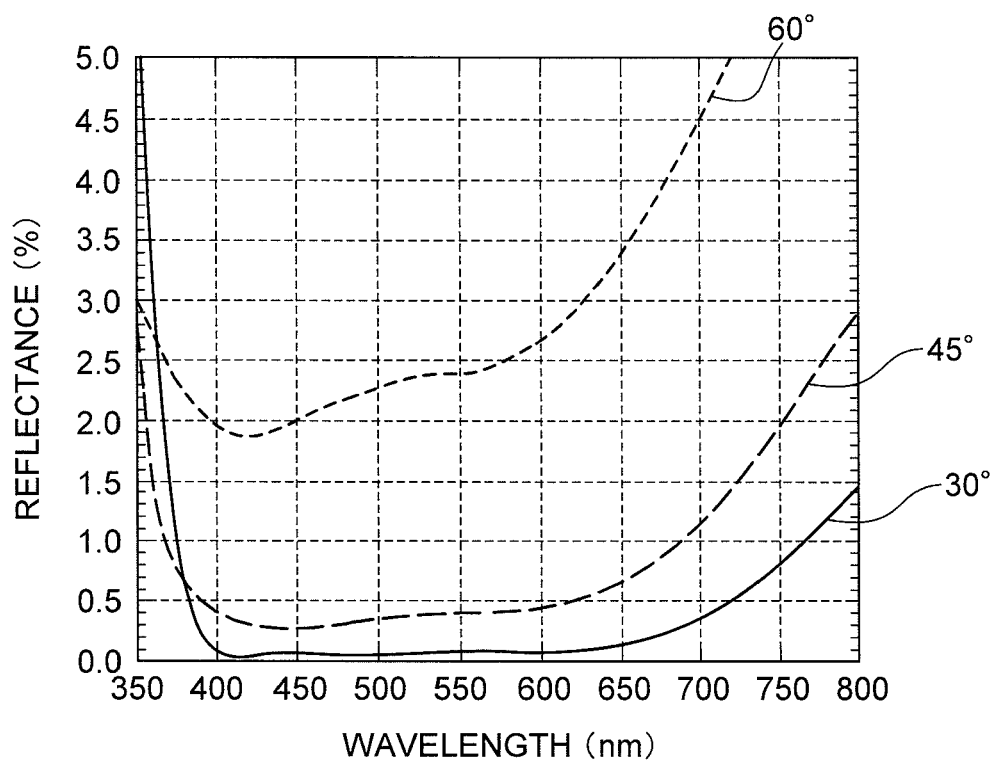
FIG. 20 is a graph showing incident angle dependency of spectral reflectance of the antireflection coating according to the variation.

FIG. 20 shows the spectral characteristics in such a case that the incident angles of the light beams upon the optical member having the spectral characteristics shown in FIG. 19 are 30 degrees, 45 degrees and 60 degrees, respectively. Note that FIGS. 19 and 20 do not illustrate the spectral characteristics of the optical member including the antireflection coating in which the substrate refractive index is 1.46 shown in Table 14, however, it is understood that the optical member has substantially the same spectral characteristics such as the substrate refractive index being 1.52.

Figure 21:
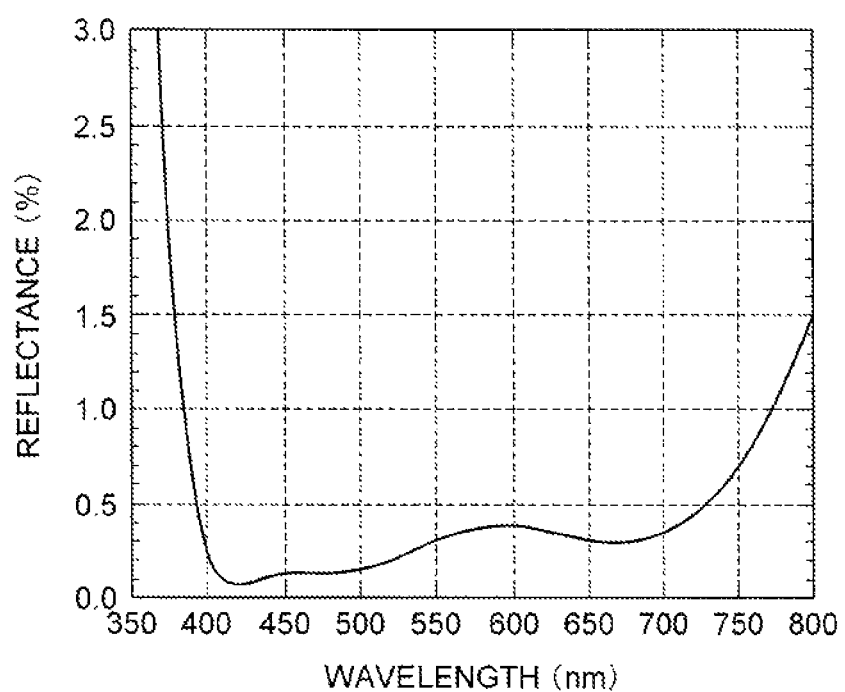
FIG. 21 is a graph showing spectral reflectance of an antireflection coating according to a conventional example.

Furthermore, FIG. 21 shows one example of the antireflection coating grown by only the dry process such as the conventional vacuum evaporation method by way of a comparison. FIG. 21 shows the spectral characteristics when the light beams are incident on the optical member in which to design the antireflection coating structured under the conditions shown in the following Table 13, with the substrate refractive index set to 1.52 in the same way as in the Table 12. Moreover, FIG. 22 shows the spectral characteristics in such a case that the incident angles of the light beams upon the optical member having the spectral characteristics shown in FIG. 21 are 30 degrees, 45 degrees and 60 degrees, respectively.

TABLE 15

| layer | material | n | thicknesses of layers |
|---|---|---|---|
|  | medium air | 1 |  |
| 7 | MgF2 | 1.39 | 0.243λ |
| 6 | ZrO2 + TiO2 | 2.12 | 0.119λ |
| 5 | Al2O3 | 1.65 | 0.057λ |
| 4 | ZrO2 + TiO2 | 2.12 | 0.220λ |
| 3 | Al2O3 | 1.65 | 0.064λ |
| 2 | ZrO2 + TiO2 | 2.12 | 0.057λ |
| 1 | Al2O3 | 1.65 | 0.193λ |
|  | refractive index of substrate |  | 1.52 |

Figure 22:
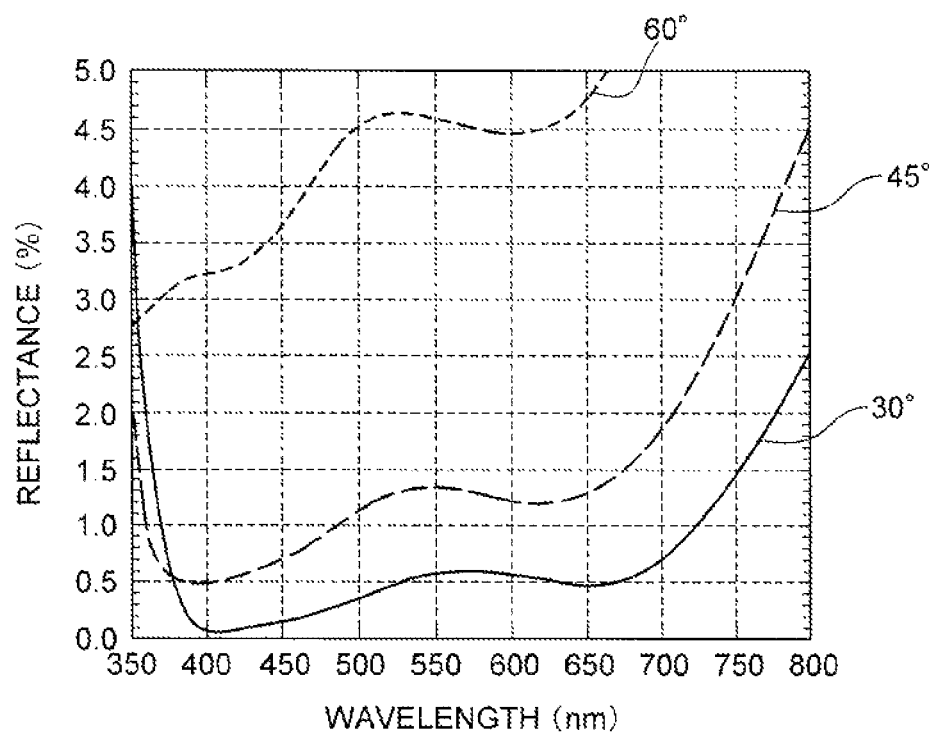
FIG. 22 is a graph showing incident angle dependency of spectral reflectance of the antireflection coating according to the conventional example.

To compare the spectral characteristics of the optical member including the antireflection coating according to the present embodiment illustrated in FIGS. 18 through 20 with the spectral characteristics in the conventional examples shown in FIGS. 21 and 22, it is well understood that the present antireflection coating has the much lower reflectance at any incident angles and, besides, has the low reflectance in the broader band.

Then, an example of applying the antireflection coating shown in the Table 13 to Examples 1 of the first embodiment through Example 12 of the third embodiment discussed above is explained.

In the zoom lens seen from another point of view according to Example 1 of the first embodiment, as shown in the Table 1, the refractive index nd of the negative meniscus lens L21 of the second lens group G2 is 1.834807 (nd=1.834807), and the refractive index nd of the double concave negative lens L22 of the second lens group G2 is 1.816000 (nd=1.816000), whereby it is feasible to reduce the reflected light from each lens surface and to reduce ghost images and flare as well by applying the antireflection coating 101 (see Table 13) corresponding to 1.85 as the substrate refractive index to the image side lens surface of the negative meniscus lens L21 and applying the antireflection coating (see Table 13) corresponding to 1.85 as the substrate refractive index to the object side lens surface of the double concave negative lens L22.

In the zoom lens seen from another point of view according to Example 2 of the first embodiment, as shown in the Table 2, the refractive index nd of the positive meniscus lens L13 of the first lens group G1 is 1.603001 (nd=1.603001), and the refractive index nd of the double convex positive lens L23 of the second lens group G2 is 1.846660 (nd=1.846660), whereby it is feasible to reduce the reflected light from each lens surface and to reduce ghost images and flare as well by applying the antireflection coating 101 (see Table 13) corresponding to 1.62 as the substrate refractive index to the object side lens surface of the positive meniscus lens L13 and applying the antireflection coating (see Table 13) corresponding to 1.85 as the substrate refractive index to the image side lens surface of the double convex positive lens L23.

In the zoom lens seen from another point of view according to Example 3 of the first embodiment, as shown in the Table 3, the refractive index nd of the double convex positive lens L12 of the first lens group G1 is 1.437000 (nd=1.437000), and the refractive index nd of the double concave negative lens L24 of the second lens group G2 is 1.816000 (nd=1.816000), whereby it is feasible to reduce the reflected light from each lens surface and to reduce ghost images and flare as well by applying the antireflection coating 101 (see Table 14) corresponding to 1.46 as the substrate refractive index to the image side lens surface of the double convex positive lens L12 and applying the antireflection coating (see Table 13) corresponding to 1.85 as the substrate refractive index to the object side lens surface of the double concave negative lens L24.

In the zoom lens seen from another point of view according to Example 4 of the second embodiment, as shown in the Table 4, the refractive index nd of the negative meniscus lens L21 of the second lens group G2 is 1.834807 (nd=1.834807), and the refractive index nd of the double concave negative lens L22 of the second lens group G2 is 1.816000 (nd=1.816000), whereby it is feasible to reduce the reflected light from each lens surface and to reduce ghost images and flare as well by applying the antireflection coating 101 (see Table 13) corresponding to 1.85 as the substrate refractive index to the image side lens surface of the negative meniscus lens L21 and applying the antireflection coating (see Table 13) corresponding to 1.85 as the substrate refractive index to the object side lens surface of the double concave negative lens L22.

In the zoom lens seen from another point of view according to Example 5 of the second embodiment, as shown in the Table 5, the refractive index nd of the positive meniscus lens L13 of the first lens group G1 is 1.593190 (nd=1.593190), and the refractive index nd of the double convex positive lens L23 of the second lens group G2 is 1.846660 (nd=1.846660), whereby it is feasible to reduce the reflected light from each lens surface and to reduce ghost images and flare as well by applying the antireflection coating 101 (see Table 13) corresponding to 1.62 as the substrate refractive index to the object side lens surface of the positive meniscus lens L13 and applying the antireflection coating (see Table 13) corresponding to 1.85 as the substrate refractive index to the image side lens surface of the double convex positive lens L23.

In the zoom lens seen from another point of view according to Example 6 of the second embodiment, as shown in the Table 6, the refractive index nd of the positive meniscus lens L13 of the first lens group G1 is 1.593190 (nd=1.593190), and the refractive index nd of the double concave negative lens L24 of the second lens group G2 is 1.816000 (nd=1.816000), whereby it is feasible to reduce the reflected light from each lens surface and to reduce ghost images and flare as well by applying the antireflection coating 101 (see Table 13) corresponding to 1.62 as the substrate refractive index to the object side lens surface of the positive meniscus lens L13 and applying the antireflection coating (see Table 13) corresponding to 1.85 as the substrate refractive index to the object side lens surface of the double concave negative lens L24.

In the zoom lens seen from another point of view according to Example 7 of the second embodiment, as shown in the Table 7, the refractive index nd of the negative meniscus lens L21 of the second lens group G2 is 1.834810 (nd=1.834810), and the refractive index nd of the double concave negative lens L22 of the second lens group G2 is 1.816000 (nd=1.816000), whereby it is feasible to reduce the reflected light from each lens surface and to reduce ghost images and flare as well by applying the antireflection coating 101 (see Table 13) corresponding to 1.85 as the substrate refractive index to the image side lens surface of the negative meniscus lens L21 and applying the antireflection coating (see Table 13) corresponding to 1.85 as the substrate refractive index to the object side lens surface of the double concave negative lens L22.

In the zoom lens seen from another point of view according to Example 8 of the second embodiment, as shown in the Table 8, the refractive index nd of the double convex positive lens L12 of the first lens group G1 is 1.437000 (nd=1.437000), and the refractive index nd of the double concave negative lens L24 of the second lens group G2 is 1.816000 (nd=1.816000), whereby it is feasible to reduce the reflected light from each lens surface and to reduce ghost images and flare as well by applying the antireflection coating 101 (see Table 14) corresponding to 1.46 as the substrate refractive index to the image side lens surface of the double convex positive lens L12 and applying the antireflection coating (see Table 13) corresponding to 1.85 as the substrate refractive index to the object side lens surface of the double concave negative lens L24.

In the zoom lens seen from another point of view according to Example 9 of the third embodiment, as shown in the Table 9, the refractive index nd of the negative meniscus lens L21 of the second lens group G2 is 1.834810 (nd=1.834810), and the refractive index nd of the double concave negative lens L22 of the second lens group G2 is 1.816000 (nd=1.816000), whereby it is feasible to reduce the reflected light from each lens surface and to reduce ghost images and flare as well by applying the antireflection coating 101 (see Table 13) corresponding to 1.85 as the substrate refractive index to the image side lens surface of the negative meniscus lens L21 and applying the antireflection coating (see Table 13) corresponding to 1.85 as the substrate refractive index to the object side lens surface of the double concave negative lens L22.

In the zoom lens seen from another point of view according to Example 10 of the third embodiment, as shown in the Table 10, the refractive index nd of the positive meniscus lens L13 of the first lens group G1 is 1.593190 (nd=1.593190), and the refractive index nd of the double convex positive lens L23 of the second lens group G2 is 1.846660 (nd=1.846660), whereby it is feasible to reduce the reflected light from each lens surface and to reduce ghost images and flare as well by applying the antireflection coating 101 (see Table 13) corresponding to 1.62 as the substrate refractive index to the object side lens surface of the positive meniscus lens L13 and applying the antireflection coating (see Table 13) corresponding to 1.85 as the substrate refractive index to the image side lens surface of the double convex positive lens L23.

In the zoom lens seen from another point of view according to Example 11 of the third embodiment, as shown in the Table 11, the refractive index nd of the positive meniscus lens L13 of the first lens group G1 is 1.593190 (nd=1.593190), and the refractive index nd of the double concave negative lens L24 of the second lens group G2 is 1.816000 (nd=1.816000), whereby it is feasible to reduce the reflected light from each lens surface and to reduce ghost images and flare as well by applying the antireflection coating 101 (see Table 13) corresponding to 1.62 as the substrate refractive index to the object side lens surface of the positive meniscus lens L13 and applying the antireflection coating (see Table 13) corresponding to 1.85 as the substrate refractive index to the object side lens surface of the double concave negative lens L24.

In the zoom lens seen from another point of view according to Example 12 of the third embodiment, as shown in the Table 12, the refractive index nd of the double convex positive lens L12 of the first lens group G1 is 1.497820 (nd=1.497820), and the refractive index nd of the negative meniscus lens L21 of the second lens group G2 is 1.804000 (nd=1.804000), whereby it is feasible to reduce the reflected light from each lens surface and to reduce ghost images and flare as well by applying the antireflection coating 101 (see Table 13) corresponding to 1.52 as the substrate refractive index to the image side lens surface of the double convex positive lens L12 and applying the antireflection coating (see Table 13) corresponding to 1.85 as the substrate refractive index to the image side lens surface of the negative meniscus lens L21.

As described above, the first embodiment through the third embodiment make it possible to provide a zoom lens having high optical performance with suppressing variations in aberrations.

Then, a camera, which is an optical apparatus equipped with the zoom lens according to the first embodiment, is explained. Although a case that the zoom lens according to Example 1 of the first embodiment is installed is explained, the same result can be obtained by a zoom lens according to any other Examples according to first embodiment through the third embodiment.

Figure 23:
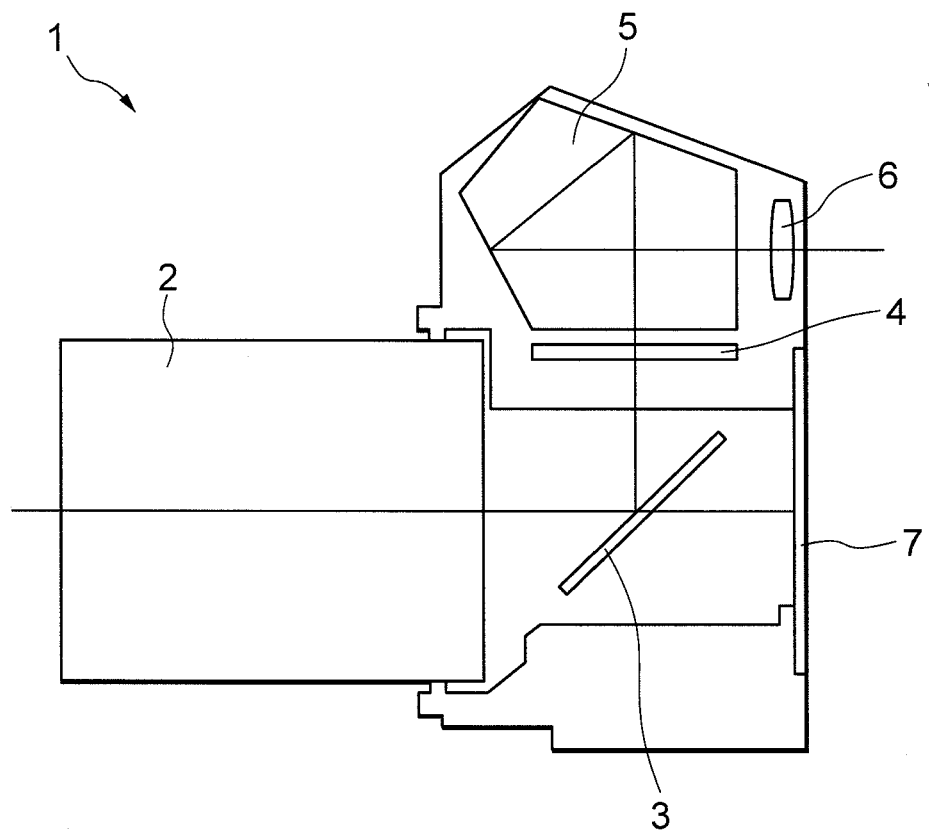
FIG. 23 is a diagram showing a construction of a camera equipped with the zoom lens according to Example 1 of the first embodiment.

FIG. 23 is a sectional view showing a single-lens reflex digital camera equipped with the zoom lens according to Example 1 of the first embodiment.

In FIG. 23, the camera 1 is a single-lens reflex digital camera 1 equipped with the zoom lens according to Example 1 of the first embodiment as an imaging lens 2. In the camera 1, light rays emitted from an unillustrated object are converged by the imaging lens 2, reflected by a quick return mirror 3, and focused on a focusing screen 4. The light rays focused on the focusing screen 4 are reflected a plurality of times in a pentagonal roof prism 5, and led to an eyepiece 6. Accordingly, a photographer can observe the object image as an erected image through the eyepiece 6.

When the photographer presses an unillustrated release button all the way down, the quick return mirror 3 is retracted from the optical path, the light rays from the unillustrated object are formed an object image on an imaging device 7. Accordingly, the light rays emitted from the object are captured by the imaging device 7, and stored in an unillustrated memory as a photographed image of the object. In this manner, the photographer can take a picture of an object by the camera 1.

With installing the zoom lens according to Example 1 of the first embodiment as an imaging lens 2 into the camera 1, it becomes possible to realize a camera having high optical performance.

Incidentally, the same effect as the above described camera 1 can be obtained by a camera including none of the quick return mirror 3.

Incidentally, the following description may suitably be applied within limits that do not deteriorate optical performance.

In the above described explanations and Examples, although zoom lenses having a three-lens-group configuration have been shown, the present application can be applied to other lens configurations such as a four-lens-group configuration. Specifically, a lens configuration in which a lens or a lens group is added to the most object side, or the most image side of the zoom lens is possible. Incidentally, a lens group is defined as a portion including at least one lens separated by air spaces that vary upon zooming.

In a zoom lens according to the present application, in order to vary focusing from infinitely distant object to a close object, a portion of a lens group, a single lens group, or a plurality of lens groups may be moved along the optical axis as a focusing lens group. In this case, the focusing lens group can be used for auto focus, and suitable for being driven by a motor such as an ultrasonic motor. It is particularly preferable that at least a portion of the second lens group is moved as the focusing lens group.

Moreover, in a zoom lens according to the present application, a lens group or a portion of a lens group may be moved as a vibration reduction lens group in a direction including a component perpendicular to the optical axis, or tilted (swayed) in a direction including the optical axis thereby correcting an image blur caused by a camera shake. In particular, at least a portion of the third lens group is preferably made as the vibration reduction lens group.

In a zoom lens according to the present application, any lens surface may be a spherical surface, a plane surface, or an aspherical surface.

When a lens surface is a spherical surface or a plane surface, lens processing, assembling and adjustment become easy, and deterioration in optical performance caused by lens processing, assembling and adjustment errors can be prevented, so that it is preferable. Moreover, even if the image plane is shifted, deterioration in optical performance is little, so that it is preferable.

When a lens surface is an aspherical surface, the aspherical surface may be fabricated by a fine grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index type lens (GRIN lens) or a plastic lens.

In a zoom lens according to the present application, the zoom ratio is about 7 to 25.

In a zoom lens according to the present application, the first lens group preferably includes two positive lens components. The first lens group preferably disposes these lens components, in order from the object side, positive-positive with disposing an air space between them.

Moreover, the second lens group preferably includes one positive lens component and three negative lens components. The second lens group preferably disposes these lens components, in order from the object side, negative-negative-positive-negative with disposing air spaces between them.

Moreover, the third lens group preferably includes at least three positive lens components and at least one negative lens component.

Moreover, the third lens group preferably includes six or seven positive lens components and three or four negative lens components.

The above described Examples of each embodiment of the present application only show a specific example for the purpose of better understanding of the present application. Accordingly, it is needless to say that the present application in its broader aspect is not limited to the specific details and representative devices.

What is claimed is:

1. A zoom lens comprising, in order from an object along an optical axis:
    a first lens group having positive refractive power;
    a second lens group having negative refractive power; and
    a third lens group having positive refractive power,
    upon zooming from a wide-angle end state to a telephoto end state, a distance between the first lens group and the second lens group increasing, and a distance between the second lens group and third lens group decreasing,
    the first lens group including a positive lens A that satisfies the following conditional expression:

$$85.0 < vdA \quad (1)$$

where vdA denotes an Abbe number at d-line of a material of the positive lens A in the first lens group, and
    the following conditional expressions being satisfied:

$$4.75 \leq f1/fw < 11.00,$$

$$0.25 < \Delta 1/f1 < 1.10$$

where fw denotes a focal length of the zoom lens in the wide-angle end state, f1 denotes a focal length of the first lens group, and $\Delta 1$ denotes a moving amount of the first lens group with respect to an image plane from the wide-angle end state to the telephoto end state,
    wherein the first lens group includes a positive lens B that satisfies the following conditional expression:

$$1.580 < ndB \quad (7)$$

where ndB denotes a refractive index of a material of the positive lens B in the first lens group, and
    the following conditional expression is satisfied:

$$1.75 < \phi 1B/fw < 4.50$$

where $\phi 1B$ denotes an effective diameter of the positive lens B in the first lens group.

2. The zoom lens according to claim 1, wherein the following conditional expression is satisfied:

$$0.28 < f1/ft < 0.52$$

where ft denotes a focal length of the zoom lens in the telephoto end state.

3. The zoom lens according to claim 1, wherein the following conditional expression is satisfied:

0.65<f1A/f1<1.75 where f1A denotes a focal length of the positive lens A in the first lens group.

4. The zoom lens according to claim 1, wherein the following conditional expression is satisfied:

1.75<φ1A/fw<4.50 where φ1A denotes an effective diameter of the positive lens A in the first lens group.

5. The zoom lens according to claim 1, wherein the first lens group includes a positive lens B that satisfies the following conditional expression:

40.0<vdB<66.5 where vdB denotes an Abbe number at d-line of a material of the positive lens B in the first lens group.

6. The zoom lens according to claim 1, wherein the following conditional expression is satisfied:

0.65<f1B/f1<1.75 where f1B denotes a focal length of the positive lens B in the first lens group.

7. The zoom lens according to claim 1, wherein the first lens group includes a negative lens that satisfies the following conditional expressions:

1.750<ndN 28.0<vdN<50.0 where ndN denotes a refractive index at d-line of a material of the negative lens in the first lens group, and vdN denotes an Abbe number at d-line of the material of the negative lens in the first lens group.

8. The zoom lens according to claim 1, wherein the first lens group comprises one negative lens and two positive lenses.

9. The zoom lens according to claim 1, wherein the third lens group includes a positive lens that satisfies the following conditional expressions:

65.5<vd3 when 1.540≤nd3

75.0<vd3 when nd3<1.540 where nd3 denotes a refractive index at d-line of a material of the positive lens in the third lens group, and vd3 denotes an Abbe number at d-line of the material of the positive lens in the third lens group.

10. The zoom lens according to claim 1, wherein the third lens group includes, in order from the object side along the optical axis, a front lens group having positive refractive power, and a rear lens group having positive refractive power, and upon zooming from the wide-angle end state to the telephoto end state, a distance between the front lens group and the rear lens group decreases.

11. The zoom lens according to claim 1, wherein the third lens group includes, in order from the object side along the optical axis, a front lens group having positive refractive power, a middle lens group having negative refractive power, and a rear lens group having positive refractive power, and upon zooming from the wide-angle end state to the telephoto end state, a distance between the front lens group and the middle lens group varies, and a distance between the middle lens group and the rear lens group varies.

12. The zoom lens according to claim 11, wherein upon zooming from the wide-angle end state to the telephoto end state, a distance between the front lens group and the middle lens group increases, and a distance between the middle lens group and the rear lens group decreases.

13. The zoom lens according to claim 1, wherein an antireflection coating is on at least one optical surface of the first lens group and the second lens group, and the antireflection coating includes at least one layer that is formed by a wet process.

14. The zoom lens according to claim 13, wherein the antireflection coating is a multilayer film, and the layer formed by the wet process is the outermost layer among the layers composing the multilayer film.

15. The zoom lens according to claim 13, wherein when a refractive index at d-line of the layer formed by the wet process is denoted by nd, the refractive index nd is 1.30 or less.

16. The zoom lens according to claim 13, wherein an optical surface on which the antireflection coating is applied is a concave surface seen from an aperture stop.

17. The zoom lens according to claim 16, wherein the concave surface seen from the aperture stop on which the antireflection coating is applied is an image side lens surface.

18. The zoom lens according to claim 16, wherein the concave surface seen from the aperture stop on which the antireflection coating is applied is an object side lens surface.

19. The zoom lens according to claim 13, wherein an optical surface on which the antireflection coating is applied is a concave surface seen from an object side.

20. The zoom lens according to claim 19, wherein the concave optical surface seen from the object side is an image side lens surface of the image side second lens from the most object side lens in the first lens group.

21. The zoom lens according to claim 19, wherein the concave optical surface seen from the object side is an object side lens surface of the image side second lens from the most object side lens in the second lens group.

22. The zoom lens according to claim 19, wherein the concave optical surface seen from the object side is an image side lens surface of the image side third lens from the most object side lens in the second lens group.

23. The zoom lens according to claim 19, wherein the concave optical surface seen from the object side is an object side lens surface of the image side fourth lens from the most object side lens in the second lens group.

24. An optical apparatus equipped with the zoom lens according to claim 1.

25. A method for manufacturing a zoom lens including, in order from an object side along an optical axis, a first lens group having positive refractive power, a second lens group having negative refractive power, and a third lens group having positive refractive power, the method comprising steps of:

disposing the first lens group, the second lens group and the third lens group movably such that, upon zooming from a wide-angle end state to a telephoto end state, a distance between the first lens group and the second lens group increases, and a distance between the second lens group and the third lens group decreases;

disposing, in the first lens group, a positive lens A satisfying the following conditional expression:

85.0<vdA                (1)

where vdA denotes an Abbe number at d-line of a material of the positive lens A in the first lens group;

disposing, in the first lens group, a positive lens B that satisfies the following conditional expression:

$$1.580 < ndB \quad (7)$$

where ndB denotes a refractive index of a material of the positive lens B in the first lens group; and satisfying the following conditional expressions:

$$4.75 \leq f1/fw < 11.00$$

$$0.25 < \Delta 1/f1 < 1.10$$

$$1.75 < \phi 1B/fw < 4.50$$

where fw denotes a focal length of the zoom lens in the wide-angle end state, f1 denotes a focal length of the first lens group, Δ1 denotes a moving amount of the first lens group with respect to an image plane from the wide-angle end state to the telephoto end state, and φ1B denotes an effective diameter of the positive lens B in the first lens group.

26. The method according to claim 25, further comprising a step of:

satisfying the following conditional expression:

$$0.28 < f1/ft < 0.52$$

where ft denotes a focal length of the zoom lens in the telephoto end state.

27. The method according to claim 25, further comprising a step of:

satisfying the following conditional expression:

$$0.65 < f1A/f1 < 1.75$$

where f1A denotes a focal length of the positive lens A in the first lens group.

28. The method according to claim 25, further comprising a step of:

applying an antireflection coating on at least one optical surface of the first lens group and the second lens group, the antireflection coating including at least one layer that is formed by a wet process.

29. The method according to claim 28, wherein the layer formed by the wet process has a refractive index nd of 1.30 or less, where the refractive index at d-line of the layer formed by the wet process is denoted by nd.

30. The method according to claim 28, further comprising a step of:

applying the antireflection coating on an optical surface that is a concave surface seen from an aperture stop.

31. The method according to claim 28, further comprising a step of:

applying the antireflection coating on an optical surface that is a concave surface seen from an object side.

32. A zoom lens comprising, in order from an object along an optical axis:

a first lens group having positive refractive power;
a second lens group having negative refractive power; and
a third lens group having positive refractive power,
upon zooming from a wide-angle end state to a telephoto end state, a distance between the first lens group and the second lens group increasing, and a distance between the second lens group and third lens group decreasing,
the first lens group including a positive lens A that satisfies the following conditional expression:

$$85.0 < vdA \quad (1)$$

where vdA denotes an Abbe number at d-line of a material of the positive lens A in the first lens group, and
the following conditional expression being satisfied:

$$4.75 \leq f1/fw < 11.00,$$

where fw denotes a focal length of the zoom lens in the wide-angle end state, and f1 denotes a focal length of the first lens group, wherein the first lens group includes a negative lens that satisfies the following conditional expressions:

$$1.750 < ndN$$

$$28.0 < vdN < 50.0$$

where ndN denotes a refractive index at d-line of a material of the negative lens in the first lens group, and vdN denotes an Abbe number at d-line of the material of the negative lens in the first lens group, the first lens group includes a positive lens B that satisfies the following conditional expression:

$$1.580 < ndB \quad (7)$$

where ndB denotes a refractive index of a material of the positive lens B in the first lens group, and
the following conditional expression is satisfied:

$$1.75 < \phi 1B/fw < 4.50$$

where φ1B denotes an effective diameter of the positive lens B in the first lens group.

33. A zoom lens comprising, in order from an object along an optical axis:

a first lens group having positive refractive power;
a second lens group having negative refractive power; and
a third lens group having positive refractive power,
upon zooming from a wide-angle end state to a telephoto end state, a distance between the first lens group and the second lens group increasing, and a distance between the second lens group and third lens group decreasing,
the first lens group including a positive lens A that satisfies the following conditional expression:

$$85.0 < vdA \quad (1)$$

where vdA denotes an Abbe number at d-line of a material of the positive lens A in the first lens group, and
the following conditional expressions being satisfied:

$$4.75 \leq f1/fw < 11.00,$$

$$0.65 < f1A/f1 < 1.35$$

where fw denotes a focal length of the zoom lens in the wide-angle end state, f1 denotes a focal length of the first lens group, and f1A denotes a focal length of the positive lens A in the first lens group, wherein the first lens group includes a positive lens B that satisfies the following conditional expression:

$$1.580 < ndB \quad (7)$$

where ndB denotes a refractive index of a material of the positive lens B in the first lens group, and
the following conditional expression is satisfied:

$$1.75 < \phi 1B/fw < 4.50$$

where φ1B denotes an effective diameter of the positive lens B in the first lens group.

34. A method for manufacturing a zoom lens including, in order from an object side along an optical axis, a first lens group having positive refractive power, a second lens group having negative refractive power, and a third lens group having positive refractive power, the method comprising steps of:

disposing the first lens group, the second lens group and the third lens group movably such that, upon zooming from a wide-angle end state to a telephoto end state, a distance between the first lens group and the second lens group increases, and a distance between the second lens group and the third lens group decreases;

disposing, in the first lens group, a positive lens A satisfying the following conditional expression:

$$85.0 < vdA \quad (1)$$

where vdA denotes an Abbe number at d-line of a material of the positive lens A in the first lens group;

disposing, in the first lens group, a positive lens B that satisfies the following conditional expression:

$$1.580 < ndB \quad (7)$$

where ndB denotes a refractive index of a material of the positive lens B in the first lens group; and satisfying the following conditional expression:

$$4.75 \leq f1/fw < 11.00$$

where fw denotes a focal length of the zoom lens in the wide-angle end state, and f1 denotes a focal length of the first lens group, wherein the first lens group includes a negative lens that satisfies the following conditional expressions:

$$1.750 < ndN$$

$$28.0 < vdN < 50.0$$

where ndN denotes a refractive index at d-line of a material of the negative lens in the first lens group, and vdN denotes an Abbe number at d-line of the material of the negative lens in the first lens group, and the following conditional expression is satisfied:

$$1.75 < \phi1B/fw < 4.50$$

where ϕ1B denotes an effective diameter of the positive lens B in the first lens group.

35. A method for manufacturing a zoom lens including, in order from an object side along an optical axis, a first lens group having positive refractive power, a second lens group having negative refractive power, and a third lens group having positive refractive power, the method comprising steps of:

disposing the first lens group, the second lens group and the third lens group movably such that, upon zooming from a wide-angle end state to a telephoto end state, a distance between the first lens group and the second lens group increases, and a distance between the second lens group and the third lens group decreases;

disposing, in the first lens group, a positive lens A satisfying the following conditional expression:

$$85.0 < vdA \quad (1)$$

where vdA denotes an Abbe number at d-line of a material of the positive lens A in the first lens group;

disposing, in the first lens group, a positive lens B that satisfies the following conditional expression:

$$1.580 < ndB \quad (7)$$

where ndB denotes a refractive index of a material of the positive lens B in the first lens group; and satisfying the following conditional expressions:

$$4.75 \leq f1/fw < 11.00,$$

$$0.65 < f1A/f1 < 1.35$$

$$1.75 < \phi1B/fw < 4.50$$

where fw denotes a focal length of the zoom lens in the wide-angle end state, f1 denotes a focal length of the first lens group, f1A denotes a focal length of the positive lens A in the first lens group, and ϕ1B denotes an effective diameter of the positive lens B in the first lens group.

* * * * *